US012620619B2

(12) United States Patent
Kushida et al.

(10) Patent No.: US 12,620,619 B2
(45) Date of Patent: May 5, 2026

(54) INORGANIC SOLID ELECTROLYTE-CONTAINING COMPOSITION, SHEET FOR ALL-SOLID STATE SECONDARY BATTERY, AND ALL-SOLID STATE SECONDARY BATTERY, AND MANUFACTURING METHODS FOR SHEET FOR ALL-SOLID STATE SECONDARY BATTERY AND ALL-SOLID STATE SECONDARY BATTERY

(71) Applicant: FUJIFILM Corporation, Tokyo (JP)

(72) Inventors: Yo Kushida, Kanagawa (JP); Koji Yasuda, Kanagawa (JP); Yuzo Nagata, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 484 days.

(21) Appl. No.: 18/180,133

(22) Filed: Mar. 8, 2023

(65) Prior Publication Data

US 2023/0261257 A1 Aug. 17, 2023

Related U.S. Application Data

(63) Continuation of application No. PCT/JP2021/035331, filed on Sep. 27, 2021.

(30) Foreign Application Priority Data

Sep. 28, 2020 (JP) ................................ 2020-162143

(51) Int. Cl.
*H01M 10/0562* (2010.01)
*H01M 10/0525* (2010.01)

(52) U.S. Cl.
CPC ... *H01M 10/0562* (2013.01); *H01M 10/0525* (2013.01); *H01M 2300/0068* (2013.01)

(58) Field of Classification Search
None
See application file for complete search history.

(56) References Cited

U.S. PATENT DOCUMENTS 10,033,042 B2 7/2018 Fukumine et al.
10,644,349 B2 5/2020 Mimura et al.
(Continued)

FOREIGN PATENT DOCUMENTS

JP 2006236933 9/2006
JP 2018200889 12/2018
(Continued)

OTHER PUBLICATIONS

"International Search Report (Form PCT/ISA/210) of PCT/JP2021/035331," mailed on Dec. 14, 2021, with English translation thereof, pp. 1-5.

(Continued)

*Primary Examiner* — Colin W. Slifka
(74) *Attorney, Agent, or Firm* — JCIPRNET

(57) ABSTRACT

There are provided an inorganic solid electrolyte-containing composition including an inorganic solid electrolyte having an ion conductivity of a metal belonging to Group 1 or Group 2 in the periodic table, a polymer binder, and a dispersion medium, where the inorganic solid electrolyte-containing composition contains a polymer which has a constitutional component having a glass transition temperature ($Tg^{HP}$) of 50° C. or higher and an SP value of 20.0 $MPa^{1/2}$ or more in a case where the constitutional component is formed into a homopolymer and is dissolved in a dispersion medium. There are also provided a sheet for an all-solid state secondary battery and an all-solid state secondary battery, in which this inorganic solid electrolyte-containing composition is used, and manufacturing methods (Continued)

for a sheet for an all-solid state secondary battery, and an all-solid state secondary battery.

14 Claims, 1 Drawing Sheet

(56) References Cited

U.S. PATENT DOCUMENTS

| | | | |
|---|---|---|---|
| 2020/0235425 | A1 | 7/2020 | Mochizuki et al. |
| 2021/0328259 | A1 | 10/2021 | Matsumura |

FOREIGN PATENT DOCUMENTS

| | | |
|---|---|---|
| WO | 2016017758 | 2/2016 |
| WO | 2019098009 | 5/2019 |
| WO | 2020045306 | 3/2020 |

OTHER PUBLICATIONS

"International Preliminary Report on Patentability (Form PCT/IPEA/409) of PCT/JP2021/035331," completed on Oct. 3, 2022, with English translation thereof, pp. 1-6.

INORGANIC SOLID ELECTROLYTE-CONTAINING COMPOSITION, SHEET FOR ALL-SOLID STATE SECONDARY BATTERY, AND ALL-SOLID STATE SECONDARY BATTERY, AND MANUFACTURING METHODS FOR SHEET FOR ALL-SOLID STATE SECONDARY BATTERY AND ALL-SOLID STATE SECONDARY BATTERY

CROSS-REFERENCE TO RELATED APPLICATIONS

This application is a Continuation of PCT International Application No. PCT/JP2021/035331 filed on Sep. 27, 2021, which claims priority under 35 U.S.C. § 119 (a) to Japanese Patent Application No. 2020-162143 filed in Japan on Sep. 28, 2020. Each of the above applications is hereby expressly incorporated by reference, in its entirety, into the present application.

BACKGROUND OF THE INVENTION

1. Field of the Invention

The present invention relates to an inorganic solid electrolyte-containing composition, a sheet for an all-solid state secondary battery, and an all-solid state secondary battery, and manufacturing methods for a sheet for an all-solid state secondary battery and an all-solid state secondary battery.

2. Description of the Related Art

A secondary battery is a storage battery that includes a negative electrode, a positive electrode, and an electrolyte between the negative electrode and the positive electrode and enables charging and discharging by the reciprocal migration of specific metal ions such as lithium ions between both electrodes.

Examples of the representative secondary battery include a secondary battery in which a non-aqueous electrolyte such as an organic electrolytic solution is filled between a negative electrode active material layer and a positive electrode active material layer. This non-aqueous electrolyte secondary battery exhibits relatively high battery performance and thus is used in a wide range of use applications. Such a non-aqueous electrolyte secondary battery is manufactured by various methods. For example, the negative electrode active material layer and the positive electrode active material layer are generally formed of a material containing an active material and a binder. For example, JP2018-200889A proposes a positive electrode slurry for a secondary battery which is a positive electrode slurry for a secondary battery, containing a positive electrode active material, a conductive agent, a binder, and a dispersion medium, where the binder contains "a first polymer that is a fluorine-containing polymer" and "a second polymer that has a polymerization unit having a nitrile group, a polymerization unit having a hydrophilic group, a (meth)acrylic acid ester polymerization unit, and a linear alkylene polymerization unit having 4 or more carbon atoms" at a specific mass ratio.

In the above-described non-aqueous electrolyte secondary battery, the non-aqueous electrolyte which is an organic electrolytic solution generally leakages easily, and a short circuit easily occurs in the inside of the battery due to overcharging or overdischarging. As a result, there is a demand for additional improvement in safety and reliability.

Under these circumstances, an all-solid state secondary battery in which an inorganic solid electrolyte is used instead of the organic electrolytic solution has attracted attention. In this all-solid state secondary battery, since all of the negative electrode, the electrolyte, and the positive electrode are solid, safety and reliability which are considered as a problem of the non-aqueous electrolyte secondary battery can be significantly improved. It is also said to be capable of extending the battery life. Furthermore, all-solid state secondary batteries can be provided with a structure in which the electrodes and the electrolyte are directly disposed in series. As a result, it becomes possible to increase the energy density to be high as compared with a secondary battery in which an organic electrolytic solution is used, and thus the application to electric vehicles, large-sized storage batteries, and the like is anticipated.

In such an all-solid state secondary battery, examples of substances that form constitutional layers (a solid electrolyte layer, a negative electrode active material layer, a positive electrode active material layer, and the like) include an inorganic solid electrolyte and an active material. In recent years, this inorganic solid electrolyte, particularly an oxide-based inorganic solid electrolyte or a sulfide-based inorganic solid electrolyte is expected as an electrolyte material having a high ion conductivity comparable to that of the organic electrolytic solution. In consideration of the improvement in productivity, a constitutional layer using such an inorganic solid electrolyte is generally formed of a material (a constitutional layer forming material) containing an inorganic solid electrolyte and a binder. As such a constitutional layer forming material, WO2016/017758A1 discloses, for example, a solid electrolyte composition that contains an inorganic solid electrolyte having a conductivity of an ion of a metal belonging to Group 1 or Group 2 of the periodic table and a binder composed of a polymeric compound in which (i) a linking structure of the main chain is composed of carbon atoms, (ii) a repeating unit represented by a specific formula is provided, and (iii) at least one of a specific group of (a) of functional groups.

SUMMARY OF THE INVENTION

A constitutional layer forming material used for manufacturing an all-solid state secondary battery is required to have a characteristic (dispersion stability) of stably maintaining the excellent dispersibility of solid particles immediately after preparation. This is because, in a case of using a constitutional layer forming material having excellent dispersion stability, a uniform constitutional layer having no coating unevenness can be formed, and thus the battery performance (for example, the ion conductivity) of a secondary battery can be improved.

By the way, since a constitutional layer of an all-solid state secondary battery is formed of solid particles (an inorganic solid electrolyte, an active material, a conductive auxiliary agent, and the like), there is a unique problem that the interfacial contact state between solid particles is restricted, and it is difficult to exhibit a firm binding force (adhesion) between the solid particles and to a base material to be laminated and the like.

Therefore, in an all-solid state secondary battery including such a constitutional layer, there is a strong tendency that the battery performance (for example, cycle characteristics) is significantly deteriorated due to repeated charging and discharging.

In addition, a constitutional layer having insufficient binding force causes defects such as chipping, breakage, cracking, or peeling in the manufacturing process of an all-solid state secondary battery, and is easily peeled off from a base material, which results in the deterioration (for example, the increase in resistance and the decrease in ion conductivity) of the batter performance of the all-solid state secondary battery. In particular, in a case of employing a highly productive method of continuously manufacturing a constitutional layer as a sheet, problems of the occurrence of defects of the constitutional layer and the peeling from the base material occur remarkably. These problems are conceived to be one of the factors of the vibration stress, the bending stress, and the like which act on a sheet for an all-solid state secondary battery, for example, in a case of winding the sheet for an all-solid state secondary battery around a winding core or in a case of manufacturing it by a roll-to-roll method having high productivity. Further, a factor thereof is also conceived to be a stress that acts on an interface with a constitutional layer or a base material in a case of cutting (punching out) the sheet for an all-solid state secondary battery as a solid electrolyte layer or an active material layer.

Regarding the solid particles that form the constitutional layer, the relationship among the solid particles such as the inorganic solid electrolyte, the dispersion medium, and the binder in the constitutional layer forming material and the constitutional layer is conceived to be one of the important factors in the dispersion stability in the constitutional layer forming material and the binding force in the constitutional layer described above. However, JP2018-200889A and WO2016/017758A1 do not describe this viewpoint.

An object of the present invention is to provide an inorganic solid electrolyte-containing composition which is excellent in dispersion stability and firmly binds solid particles in a case where a constitutional layer is formed therefrom. In addition, another object of the present invention is to provide a sheet for an all-solid state secondary battery and an all-solid state secondary battery, and manufacturing methods for a sheet for an all-solid state secondary battery and an all-solid state secondary battery, in which the above inorganic solid electrolyte-containing composition is used.

As a result of repeated studies focusing on the relationship among the solid particles, the dispersion medium, and the polymer binder in the inorganic solid electrolyte-containing composition and a constitutional layer formed from the inorganic solid electrolyte-containing composition, the inventors of the present invention obtained the following findings and further repeatedly carried out studies based on these finding, thereby completing the present invention.

That is, it was found that in a case where a polymer binder to be used in combination with an inorganic solid electrolyte is formed of a polymer into which a constitutional component having a glass transition temperature ($Tg^{HP}$) of 50° C. or higher and an SP value of 20.0 to 25.0 $MPa^{1/2}$ in a case where the polymer binder is formed into a homopolymer is incorporated and is allowed to be present in a dissolved state instead of being dispersed in a particle shape in a dispersion medium present together in a composition, the relationship of the polymer binder with respect to the solid particles and the dispersion medium in the inorganic solid electrolyte-containing composition can be improved, and as a result, the reaggregation or sedimentation of the solid particles due to a lapse of time can be suppressed, whereby the excellent dispersibility immediately after preparation can be maintained. In addition, it was found that in a case where this inorganic solid electrolyte-containing composition is used as a constitutional layer forming material, the relationship (the interaction) of the polymer binder in the constitutional layer with respect to the solid particles is reinforced, whereby a constitutional layer in which the solid particles are finnly bound with firm adhesion can be realized. In addition, it was found that in a case where the inorganic solid electrolyte-containing composition containing this specific polymer binder, inorganic solid electrolyte, and dispersion medium, is used as a constitutional layer forming material, it is possible to realize a sheet for an all-solid state secondary battery, having a constitutional layer in which solid particles are firmly bonded, as well as an all-solid state secondary battery having low resistance and excellent cycle characteristics as well.

That is, the above problems have been solved by the following means.

<1> An inorganic solid electrolyte-containing composition comprising an inorganic solid electrolyte having an ion conductivity of a metal belonging to Group 1 or Group 2 in the periodic table; a polymer binder; and a dispersion medium, in which the polymer binder contains a polymer having a constitutional component satisfying the following (A) and (B) and is dissolved in the dispersion medium, (A) a glass transition temperature ($Tg^{HP}$) in a case where the constitutional component is formed into a homopolymer is 50° C. or higher, and (B) an SP value in a case where the constitutional component is formed into a homopolymer is 20.0 $MPa^{1/2}$ or more and 25.0 $MPa^{1/2}$ or less.

<2> The inorganic solid electrolyte-containing composition according to <1>, in which a glass transition temperature ($Tg^{B}$) of the polymer is 0 to 90° C.

<3> The inorganic solid electrolyte-containing composition according to <1> or <2>, in which the polymer has a constitutional component exhibiting a glass transition temperature at which a difference (absolute value) from the glass transition temperature ($Tg^{HP}$) of the constitutional component is 130° C. or higher.

<4> The inorganic solid electrolyte-containing composition according to any one of <1> to <3>, in which the constitutional component satisfying the (A) and the (B) has an aromatic ring as a partial structure.

<5> The inorganic solid electrolyte-containing composition according to any one of <1> to <4>, in which the constitutional component satisfying the (A) and the (B) is represented by Formula (HC), Formula (HC)

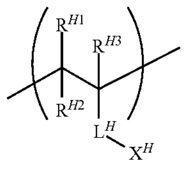

in Formula (HC), $R^{H1}$ to $R^{H3}$ represent a hydrogen atom or a substituent, $L^{H}$ represents a single bond or a linking group, and $X^{H}$ represents a monocyclic or polycyclic aromatic ring.

<6> The inorganic solid electrolyte-containing composition according to <4> or <5>, in which the aromatic ring is an aromatic hydrocarbon ring.

<7> The inorganic solid electrolyte-containing composition according to any one of <1> to <6>, in which the dispersion medium has an SP value of 14 to 24 $MPa^{1/2}$.

<8> The inorganic solid electrolyte-containing composition according to any one of <1> to <7>, further comprising an active material.

<9> The inorganic solid electrolyte-containing composition according to any one of <1> to <8>, further comprising a conductive auxiliary agent.

<10> The inorganic solid electrolyte-containing composition according to any one of <1> to <9>, in which the inorganic solid electrolyte is a sulfide-based inorganic solid electrolyte.

<11> A sheet for an all-solid state secondary battery, comprising a layer formed of the inorganic solid electrolyte-containing composition according to any one of <1> to <10>.

<12> An all-solid state secondary battery comprising, in the following order, a positive electrode active material layer; a solid electrolyte layer; and a negative electrode active material layer, in which at least one of the positive electrode active material layer, the solid electrolyte layer, or the negative electrode active material layer is a layer formed of the inorganic solid electrolyte-containing composition according to any one of <1> to <10>.

<13> A manufacturing method for a sheet for an all-solid state secondary battery, the manufacturing method comprising forming a film of the inorganic solid electrolyte-containing composition according to any one of <1> to <10>.

<14> A manufacturing method for an all-solid state secondary battery, comprising manufacturing an all-solid state secondary battery through the manufacturing method according to <13>.

The present invention can provide an inorganic solid electrolyte-containing composition which is excellent in dispersion stability and firmly binds solid particles in a case where a constitutional layer is formed therefrom. In addition, according to the present invention, it is possible to provide a sheet for an all-solid state secondary battery and an all-solid state secondary battery, which have a layer formed of this excellent inorganic solid electrolyte-containing composition. Further, according to the present invention, it is possible to provide manufacturing methods for a sheet for an all-solid state secondary battery and an all-solid state secondary battery, in which the above inorganic solid electrolyte-containing composition is used.

The above-described and other characteristics and advantages of the present invention will be further clarified by the following description with appropriate reference to the accompanying drawing.

DESCRIPTION OF THE PREFERRED EMBODIMENTS

Figure 1:
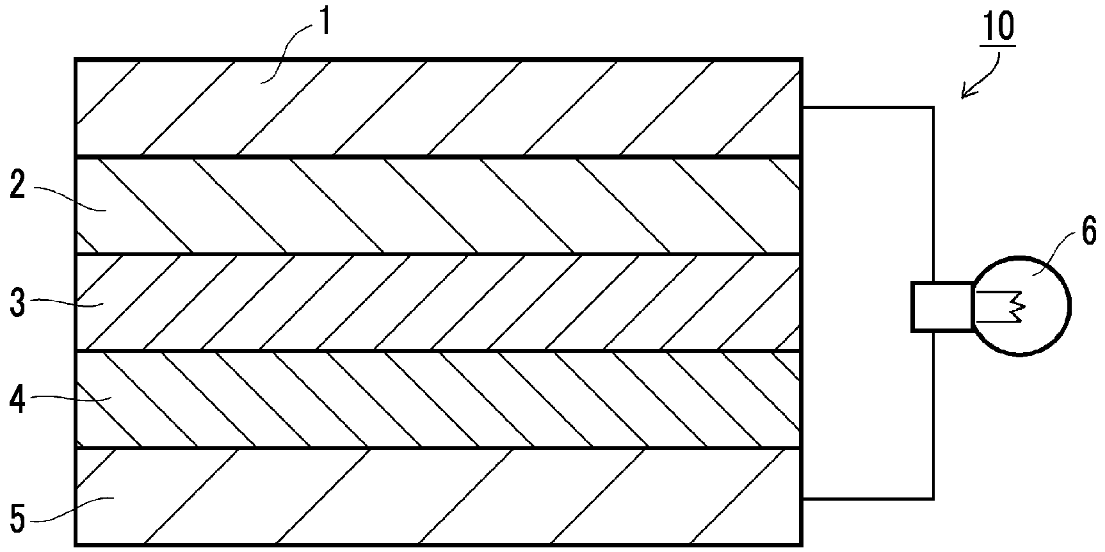
FIG. 1 is a vertical cross-sectional view schematically illustrating an all-solid state secondary battery according to a preferred embodiment of the present invention.

In the present invention, numerical ranges indicated using “to” include numerical values before and after the “to” as the lower limit value and the upper limit value.

In the present invention, the expression of a compound (for example, in a case where a compound is represented by an expression in which “compound” is attached to the end) refers to not only the compound itself but also a salt or an ion thereof. In addition, this expression also refers to a derivative obtained by modifying a part of the compound, for example, by introducing a substituent into the compound within a range where the effect of the present invention is not impaired.

In the present invention, (meth)acryl means one or both of acryl and methacryl. The same applies to (meth)acrylate.

In the present invention, a substituent, a linking group, or the like (hereinafter, referred to as a substituent or the like), which is not specified regarding whether to be substituted or unsubstituted, may have an appropriate substituent. Accordingly, even in a case where a YYY group is simply described in the present invention, this YYY group includes not only an aspect having a substituent but also an aspect not having a substituent. The same shall be applied to a compound that is not specified in the present specification regarding whether to be substituted or unsubstituted. Examples of the preferred examples of the substituent include a substituent Z described later.

In the present invention, in a case where a plurality of substituents or the like represented by a specific reference numeral are present or a plurality of substituents or the like are simultaneously or alternatively defined, the respective substituents or the like may be the same or different from each other. In addition, unless specified otherwise, in a case where a plurality of substituents or the like are adjacent to each other, the substituents may be linked or fused to each other to form a ring.

In the present invention, the polymer means a polymer; however, it has the same meaning as a so-called polymeric compound. Further, a polymer binder (also simply referred to as a binder) means a binder constituted of a polymer and includes a polymer itself and a binder formed by containing a polymer.

[Inorganic Solid Electrolyte-Containing Composition]

The inorganic solid electrolyte-containing composition according to the embodiment of the present invention contains an inorganic solid electrolyte having an ion conductivity of a metal belonging to Group 1 or Group 2 in the periodic table; a polymer binder containing a constitutional component satisfying (A) and (B) described later; and a dispersion medium.

This polymer binder has a characteristic (solubility) of being soluble in a dispersion medium contained in the inorganic solid electrolyte-containing composition. The polymer binder in the inorganic solid electrolyte-containing composition generally is present in a state of being dissolved in a dispersion medium in the inorganic solid electrolyte-containing composition, which depends on the content thereof. This makes it possible for the polymer binder to stably exhibit a function of dispersing solid particles in the dispersion medium and maintain the excellent dispersibility of the solid particles in the inorganic solid electrolyte-containing composition. Further, the adhesiveness between the solid particles or to the collector is reinforced, and thus it is possible to further reinforce the effect of improving the cycle characteristics of the all-solid state secondary battery.

In the present invention, the description that a polymer binder is dissolved in a dispersion medium in an inorganic solid electrolyte-containing composition is not limited to an aspect in which the entire polymer binder is dissolved in the dispersion medium, and for example, a part of the polymer binder may be present in an insoluble form in the inorganic solid electrolyte-containing composition as long as the following solubility in a dispersion medium is 80% or more.

The measuring method for solubility is as follows. That is, a specified amount of a polymer binder as a measurement target is weighed in a glass bottle, 100 g of a dispersion medium that is the same kind as the dispersion medium contained in the inorganic solid electrolyte-containing composition is added thereto, and stirring is carried out at a temperature of 25° C. on a mix rotor at a rotation speed of 80 rpm for 24 hours. After stirring for 24 hours, the obtained mixed solution is subjected to the transmittance measurement under the following conditions. This test (the transmittance measurement) is carried out by changing the amount of the binder dissolved (the above-described specified amount), and the upper limit concentration X (% by mass) at which the transmittance is 99.8% is defined as the solubility of the polymer binder in the above dispersion medium.

<Transmittance Measurement Conditions>

Dynamic Light Scattering (DLS) Measurement

Device: DLS measuring device DLS-8000 manufactured by Otsuka Electronics Co., Ltd.

Laser wavelength, output: 488 nm/100 mW Sample cell: NMR tube

In the inorganic solid electrolyte-containing composition, the polymer binder is dissolved in a dispersion medium and interacts with, preferably adsorbs to, solid particles, thereby functioning to enhance the dispersion stability of the solid particles such as the inorganic solid electrolyte. In the present invention, the adsorption of the polymer binder to the solid particles includes not only physical adsorption but also chemical adsorption (adsorption by chemical bond formation, adsorption by transfer of electrons, or the like). The polymer binder functions, in a constitutional layer formed of at least an inorganic solid electrolyte-containing composition, as a binder that causes solid particles of an inorganic solid electrolyte (as well as a co-existable active material, conductive auxiliary agent, and the like) or the like to mutually binds therebetween (for example, between solid particles of an inorganic solid electrolyte, between solid particles of an inorganic solid electrolyte and an active material, or between solid particles of an active material). Further, it also functions as a binding agent that firmly binds the base material such as a collector and the solid particles.

The inorganic solid electrolyte-containing composition according to the embodiment of the present invention is preferably a slurry in which the inorganic solid electrolyte is dispersed in a dispersion medium.

The inorganic solid electrolyte-containing composition according to the embodiment of the present invention has excellent dispersion stability and can firmly bind solid particles to other solid particles and furthermore to a base material in a case where a constitutional layer is formed therefrom. In a case where this inorganic solid electrolyte-containing composition is used as a constitutional layer forming material, it is possible to realize a sheet for an all-solid state secondary battery, which has a low-resistance constitutional layer in which solid particles firmly adhere, and furthermore, an all-solid state secondary battery which has a high conductivity (low resistance) and excellent cycle characteristics as well.

Although the details of the reason for the above are not yet clear, they are conceived to be as follows. That is, it is presumed to be because a polymer binder which is formed of a polymer into which a constitutional component having a glass transition temperature ($Tg^{HP}$) of 50° C. or higher and an SP value of 20.0 to 25.0 $MPa^{1/2}$ in a case where the constitutional component is formed into a homopolymer is incorporated and dissolved in a dispersion medium present together in a composition can improve or modify the relationship with respect to the solid particles and the dispersion medium in the inorganic solid electrolyte-containing composition and the constitutional layer.

Specifically, the polymer binder having the above-described configuration is uniformly present in the inorganic solid electrolyte-containing composition in a state of being dissolved in a dispersion medium with the molecular chain thereof being spread. In addition, the above-described constitutional component in the polymer that constitutes the polymer binder causes the polymer binder to exhibit high wettability to the solid particles based on a specific SP value. Therefore, in the inorganic solid electrolyte-containing composition, the initial dispersibility of the solid particles (the dispersibility at the time of preparing the composition) is improved, and furthermore, the reaggregation or precipitation of the solid particles due to a lapse of time is suppressed, whereby excellent initial dispersibility can be maintained. Such an inorganic solid electrolyte-containing composition having excellent dispersion stability makes it possible to form a constitutional layer having excellent surface properties having less coating unevenness (non-uniformity of a layer thickness, uneven distribution of solid particles, and the like) and realize a high conductivity.

On the other hand, in the process of forming a film of the inorganic solid electrolyte-containing composition, since the polymer contains the above-described constitutional component, the polymer binder is solidified to a high strength (high hardness) based on a specific glass transition temperature ($Tg^{HP}$). Therefore, the interaction between the polymer binder and the solid particles in the constitutional layer to be formed into a film is enhanced, and the binding property between the solid particles and furthermore, the binding force between the solid particles and the base material can be reinforced. The constitutional layer in which the binding force of the solid particles is reinforced is less likely to generate voids even in a case where the all-solid state secondary battery is repeatedly charged and discharged, cycle characteristics can be improved, and furthermore, the tolerance (the suppression of occurrence of defects and the suppression of peeling from a base material) to a stress that acts during the manufacturing process can be also improved, which makes it also possible to suppress an increase in resistance (a decrease in conductivity).

In the present invention, as described above, the interaction (the relationship) among the inorganic solid electrolyte, the dispersion medium, and the polymer binder in the inorganic solid electrolyte-containing composition and the constitutional layer is improved, and it is possible to realize the excellent dispersion stability of the inorganic solid electrolyte-containing composition and the firm binding of solid particles in a case where a constitutional layer is formed therefrom. Therefore, it is possible to apply industrial manufacturing, for example, a roll-to-roll method having high productivity as manufacturing methods for a sheet for an all-solid state secondary battery and an all-solid state secondary battery using the inorganic solid electrolyte-containing composition according to the embodiment of the present invention. In addition, in a case of using the inorganic solid electrolyte-containing composition according to the embodiment of the present invention, it is possible to realize a sheet for an all-solid state secondary battery, including a constitutional layer in which solid particles firmly adhere to each other while exhibiting a sufficiently low resistance due to having excellent surface properties with little coating unevenness, and furthermore, an all-solid state secondary battery having both low resistance (high conductivity) and excellent cycle characteristics. Furthermore, in a case of using the sheet for an all-solid state secondary battery, produced using the inorganic solid electrolyte-containing composition according to the embodiment of the present invention, as an electrode (a laminate of a collector and an active material layer) of an all-solid state secondary battery, it is possible to further improve the cycle characteristics while maintaining low resistance.

The inorganic solid electrolyte-containing composition according to the embodiment of the present invention is preferably used as a material (a constitutional layer forming material) for forming a solid electrolyte layer or an active material layer, where the material is for a sheet for an all-solid state secondary battery (including an electrode sheet for an all-solid state secondary battery) or an all-solid state secondary battery. In particular, it can be preferably used as a material for forming a negative electrode sheet for an all-solid state secondary battery or a material for forming a negative electrode active material layer, which contains a negative electrode active material having a large expansion and contraction due to charging and discharging, and high cycle characteristics and furthermore, high conductivity can be achieved in this aspect as well.

The inorganic solid electrolyte-containing composition according to the embodiment of the present invention is preferably a non-aqueous composition. In the present invention, the non-aqueous composition includes not only an aspect including no moisture but also an aspect where the moisture content (also referred to as the "water content") is preferably 500 ppm or less. In the non-aqueous composition, the moisture content is more preferably 200 ppm or less, still more preferably 100 ppm or less, and particularly preferably 50 ppm or less. In a case where the inorganic solid electrolyte-containing composition is a non-aqueous composition, it is possible to suppress the deterioration of the inorganic solid electrolyte. The water content refers to the water amount (the mass proportion to the inorganic solid electrolyte-containing composition) in the inorganic solid electrolyte-containing composition, and specifically, it is a value measured by carrying out filtration through a 0.02 μm membrane filter and then Karl Fischer titration.

The inorganic solid electrolyte-containing composition according to the aspect of the present invention includes an aspect containing not only an inorganic solid electrolyte but also an active material, as well as a conductive auxiliary agent or the like (the composition in this aspect may be referred to as the "electrode composition").

Hereinafter, components that are contained and components that can be contained in the inorganic solid electrolyte-containing composition according to the embodiment of the present invention will be described.

<Inorganic Solid Electrolyte>

The inorganic solid electrolyte-containing composition according to the embodiment of the present invention contains an inorganic solid electrolyte.

In the present invention, the inorganic solid electrolyte is an inorganic solid electrolyte, and the solid electrolyte refers to a solid-form electrolyte capable of migrating ions therein. The inorganic solid electrolyte is clearly distinguished from the organic solid electrolyte (the polymeric electrolyte such as polyethylene oxide (PEO) or the organic electrolyte salt such as lithium bis(trifluoromethanesulfonyl)imide (LiTFSI)) since it does not include any organic substance as a principal ion-conductive material. In addition, the inorganic solid electrolyte is solid in a steady state and thus, typically, is not dissociated or liberated into cations and anions. Due to this fact, the inorganic solid electrolyte is also clearly distinguished from inorganic electrolyte salts of which cations and anions are dissociated or liberated in electrolytic solutions or polymers ($LiPF_6$, $LiBF_4$, lithium bis(fluorosulfonyl)imide (LiFSI), LiCl, and the like). The inorganic solid electrolyte is not particularly limited as long as it has an ion conductivity of a metal belonging to Group 1 or Group 2 in the periodic table and generally does not have electron conductivity. In a case where the all-solid state secondary battery according to the embodiment of the present invention is a lithium ion battery, the inorganic solid electrolyte preferably has a lithium ion conductivity.

As the inorganic solid electrolyte, a solid electrolyte material that is typically used for an all-solid state secondary battery can be appropriately selected and used. Examples of the inorganic solid electrolyte include (i) a sulfide-based inorganic solid electrolyte, (ii) an oxide-based inorganic solid electrolyte, (iii) a halide-based inorganic solid electrolyte, and (iv) a hydride-based inorganic solid electrolyte. The sulfide-based inorganic solid electrolytes are preferably used from the viewpoint that it is possible to form a more favorable interface between the active material and the inorganic solid electrolyte.

(i) Sulfide-Based Inorganic Solid Electrolyte

The sulfide-based inorganic solid electrolyte is preferably an electrolyte that contains a sulfur atom, has an ion conductivity of a metal belonging to Group 1 or Group 2 in the periodic table, and has electron-insulating properties. The sulfide-based inorganic solid electrolytes is preferably a sulfide-based inorganic solid electrolyte which contains, as elements, at least Li, S, and P and have a lithium ion conductivity; however, it may appropriately contains elements other than Li, S, and P.

Examples of the sulfide-based inorganic solid electrolyte include a lithium ion-conductive inorganic solid electrolyte, which satisfies a composition represented by the following Formula (Si).

$$L_{a1}M_{b1}P_{c1}S_{d1}A_{e1} \quad (S1)$$

In the formula, L represents an element selected from Li, Na, or K and is preferably Li. M represents an element selected from B, Zn, Sn, Si, Cu, Ga, Sb, Al, or Ge. A represents an element selected from I, Br, Cl, or F. a1 to e1 represent the compositional ratios between the respective elements, and a1:b1:c1:d1:e1 satisfies 1 to 12:0 to 5:1:2 to 12:0 to 10. a1 is preferably 1 to 9 and more preferably 1.5 to 7.5. b1 is preferably 0 to 3 and more preferably 0 to 1. d1 is preferably 2.5 to 10 and more preferably 3.0 to 8.5. e1 is preferably 0 to 5 and more preferably 0 to 3.

The compositional ratios among the respective elements can be controlled by adjusting the amounts of raw material compounds blended to manufacture the sulfide-based inorganic solid electrolyte as described below.

The sulfide-based inorganic solid electrolyte may be non-crystalline (glass) or crystallized (made into glass ceramic) or may be only partially crystallized. For example, it is possible to use Li—P—S-based glass containing Li, P, and S or Li—P—S-based glass ceramic containing Li, P, and S.

The sulfide-based inorganic solid electrolytes can be manufactured by a reaction of at least two or more raw materials of, for example, lithium sulfide ($Li_2S$), phosphorus sulfide (for example, diphosphorus pentasulfide ($P_2S_5$)), a phosphorus single body, a sulfur single body, sodium sulfide, hydrogen sulfide, lithium halides (for example, LiI, LiBr, and LiCl), or sulfides of an element represented by M described above (for example, $SiS_2$, SnS, and $GeS_2$).

The ratio between $Li_2S$ and $P_2S_5$ in each of Li—P—S-based glass and Li—P—S-based glass ceramic is preferably 60:40 to 90:10 and more preferably 68:32 to 78:22 in terms of the molar ratio between $Li_2S$:$P_2S_5$. In a case where the ratio between $Li_2S$ and $P_2S_5$ is set in the above-described range, it is possible to increase a lithium ion conductivity. Specifically, the lithium ion conductivity can be preferably set to $1\times10^{-4}$ S/cm or more and more preferably set to $1\times10^{-3}$ S/cm or more. The upper limit is not particularly limited; however, it is realistically $1\times10^{-1}$ S/cm or lower.

As specific examples of the sulfide-based inorganic solid electrolytes, combination examples of raw materials will be described below. Examples thereof include $Li_2S$—$P_2S_5$, $Li_2S$—$P_2S_5$—LiCl, $Li_2S$—$P_2S_5$—$H_2S$, $Li_2S$—$P_2S_5$—$H_2S$—LiCl, $Li_2S$—LiI—$P_2S_5$, $Li_2S$—LiI—$Li_2O$—$P_2S_5$, $Li_2S$—LiBr—$P_2S_5$, $Li_2S$—$Li_2O$—$P_2S_5$, $Li_2S$—$Li_3PO_4$—$P_2S_5$, $Li_2S$—$P_2S_5$—$P_2O_5$, $Li_2S$—$P_2S_5$—$SiS_2$, $Li_2S$—$P_2S_5$—$SiS_2$—LiCl, $Li_2S$—$P_2S_5$—SnS, $Li_2S$—$P_2S_5$—$Al_2S_3$, $Li_2S$—$GeS_2$, $Li_2S$—$GeS_2$—ZnS, $Li_2S$—$Ga_2S_3$, $Li_2S$—$GeS_2$—$Ga_2S_3$, $Li_2S$—$GeS_2$—$P_2S_5$, $Li_2S$-$Ge_s$2-$Sb_2S_5$, $Li_2S$—$GeS_2$—$Al_2S_3$, $Li_2S$—$SiS_2$, $Li_2S$—$Al_2S_3$, $Li_2S$—$SiS_2$—$Al_2S_3$, $Li_2S$—$SiS_2$—$P_2S_5$, $Li_2S$—$SiS_2$—$P_2S_5$—LiI, $Li_2S$—$SiS_2$—LiI, $Li_2S$—$SiS_2$—$Li_4SiO_4$, $Li_2S$—$SiS_2$—$Li_3PO_4$, and $Li_{10}GeP_2S_{12}$. The mixing ratio between the individual raw materials does not matter. Examples of the method of synthesizing a sulfide-based inorganic solid electrolyte material using the above-described raw material compositions include an amorphization method. Examples of the amorphization method include a mechanical milling method, a solution method, and a melting quenching method. This is because treatments at a normal temperature become possible, and it is possible to simplify manufacturing processes.

(ii) Oxide-Based Inorganic Solid Electrolyte

The oxide-based inorganic solid electrolyte is preferably an electrolyte that contains an oxygen atom, has an ion conductivity of a metal belonging to Group 1 or Group 2 in the periodic table, and has electron-insulating properties.

The ion conductivity of the oxide-based inorganic solid electrolyte is preferably $1\times10^{-6}$ S/cm or more, more preferably $5\times10^{-6}$ S/cm or more, and particularly preferably $1\times10^{-5}$ S/cm or more. The upper limit is not particularly limited; however, it is practically $1\times10^{-1}$ S/cm or less.

Specific examples of the compound include $Li_{xa}La_{ya}TiO_3$ (LLT) [xa satisfies $0.3\leq xa\leq 0.7$, and ya satisfies $0.3\leq ya\leq 0.7$]; $Li_{xb}La_{yb}Zr_{zb}M^{bb}{}_{mb}O_{nb}$ ($M^{bb}$ is one or more elements selected from Al, Mg, Ca, Sr, V, Nb, Ta, Ti, Ge, In, and Sn, xb satisfies $5\leq xb\leq 10$, yb satisfies $1\leq yb\leq 4$, zb satisfies $1\leq zb\leq 4$, mb satisfies $0\leq mb\leq 2$, and nb satisfies $5\leq nb\leq 20$); $Li_{xc}B_{yc}M^{cc}{}_{zc}O_{nc}$ ($M^{cc}$ is one or more elements selected from C, S, Al, Si, Ga, Ge, In, and Sn, xc satisfies $0<xc\leq 5$, yc satisfies $0<yc\leq 1$, ze satisfies $0<zc\leq 1$, and nc satisfies $0<nc\leq 6$); $Li_{xd}(Al, Ga)_{yd}(Ti, Ge)_{zd}Si_{ad}P_{md}O_{nd}$ (xd satisfies $1\leq xd\leq 3$, yd satisfies $0\leq yd<1$, zd satisfies $0\leq zd\leq 2$, ad satisfies $0\leq ad\leq 1$, md satisfies $1\leq md\leq 7$, and nd satisfies $3\leq nd\leq 13$); $Li_{(3-2xe)}M^{ee}{}_{xe}D^{ee}O$ (xe represents a number of 0 or more and 0.1 or less, and $M^{ee}$ represents a divalent metal atom, $D^{ee}$ represents a halogen atom or a combination of two or more halogen atoms); $Li_{xf}Si_{yf}O_{zf}$ (xf satisfies $1\leq xf\leq 5$, yf satisfies $0<yf\leq 3$, zf satisfies $1\leq zf\leq 10$); $Li_{xg}S_{yg}O_{zg}$ (xg satisfies $1\leq xg\leq 3$, yg satisfies $0<yg\leq 2$, zg satisfies $1\leq zg\leq 10$); $Li_3BO_3$; $Li_3BO_3$—$Li_2SO_4$; $Li_2O$—$B_2O_3$—$P_2O_5$; $Li_2O$—$SiO_2$; $Li_6BaLa_2Ta_2O_{12}$; $Li_3PO_{(4-3/2w)}N_w$ (w satisfies $w<1$); $Li_{3.5}Zn_{0.25}GeO_4$ having a lithium super ionic conductor (LISICON)-type crystal structure; $La_{0.55}Li_{0.35}TiO_3$ having a perovskite-type crystal structure; $LiTi_2P_3O_{12}$ having a natrium super ionic conductor (NASICON)-type crystal structure; $Li_{1+xh+yh}(Al, Ga)_{xh}(Ti, Ge)_{2-xh}Si_{yh}P_{3-yh}O_{12}$ (xh satisfies $0\leq xh\leq 1$, and yh satisfies $0\leq yh\leq 1$); and $Li_7La_3Zr_2O_{12}$ (LLZ) having a garnet-type crystal structure.

In addition, a phosphorus compound containing Li, P, or O is also desirable. Examples thereof include lithium phosphate ($Li_3PO_4$); LiPON in which a part of oxygen atoms in lithium phosphate are substituted with a nitrogen atom; and $LiPOD^1$ ($D^1$ is preferably one or more elements selected from Ti, V, Cr, Mn, Fe, Co, Ni, Cu, Zr, Nb, Mo, Ru, Ag, Ta, W, Pt, and Au).

Further, it is also possible to preferably use $LiA^1ON$ ($A^1$ is one or more elements selected from Si, B, Ge, Al, C, and Ga).

(iii) Halide-Based Inorganic Solid Electrolytes

The halide-based inorganic solid electrolyte is preferably a compound that contains a halogen atom, has an ion conductivity of a metal belonging to Group 1 or Group 2 in the periodic table, and has electron-insulating properties.

The halide-based inorganic solid electrolyte is not particularly limited; however, examples thereof include LiCl, LiBr, LiI, and compounds such as $Li_3YBr_6$ or $Li_3YCl_6$ described in ADVANCED MATERIALS, 2018, 30, 1803075. In particular, $Li_3YBr_6$ or $Li_3YCl_6$ is preferable.

(iv) Hydride-Based Inorganic Solid Electrolyte

The hydride-based inorganic solid electrolyte is preferably a compound that contains a hydrogen atom, has an ion conductivity of a metal belonging to Group 1 or Group 2 in the periodic table, and has electron-insulating properties.

The hydride-based inorganic solid electrolyte is not particularly limited, and examples thereof include $LiBH_4$, $Li_4(BH_4)_3I$, and $3LiBH_4$—LiCl.

The inorganic solid electrolyte is preferably particulate. In this case, the particle diameter (the volume average particle diameter) of the inorganic solid electrolyte is not particularly limited; however, it is preferably 0.01 μm or more and more preferably 0.1 μm or more. The upper limit is preferably 100 μm or less and more preferably 50 μm or less.

The particle diameter of the inorganic solid electrolyte is measured according to the following procedure. Using water (heptane in a case where the inorganic solid electrolyte is unstable in water), the inorganic solid electrolyte particles are diluted in a 20 mL sample bottle to prepare 1% by mass of a dispersion liquid. The diluted dispersion liquid sample is irradiated with 1 kHz ultrasonic waves for 10 minutes and is then immediately used for testing. Data collection is carried out 50 times using this dispersion liquid sample, a laser diffraction/scattering-type particle size distribution analyzer LA-920 (product name, manufactured by Horiba Ltd.), and a quartz cell for measurement at a temperature of 25° C. to obtain the volume average particle diameter. Other detailed conditions and the like can be found in Japanese Industrial Standards (JIS) Z8828: 2013 "particle diameter Analysis-Dynamic Light Scattering" as necessary. Five samples per level are produced, and the average values therefrom are employed.

One kind of inorganic solid electrolyte may be contained, or two or more kinds thereof may be contained.

The content of the inorganic solid electrolyte in the inorganic solid electrolyte-containing composition is not particularly limited. However, in terms of the binding property as well as in terms of dispersibility, it is preferably 50% by mass or more, more preferably 70% by mass or more, and still more preferably 90% by mass or more, in 100% by mass of the solid content. From the same viewpoint, the upper limit thereof is preferably 99.9% by mass or less, more preferably 99.5% by mass or less, and particularly preferably 99% by mass or less.

However, in a case where the inorganic solid electrolyte-containing composition contains an active material described later, regarding the content of the inorganic solid electrolyte in the inorganic solid electrolyte-containing composition, the total content of the active material and the inorganic solid electrolyte is preferably in the above-described range.

In the present invention, the solid content (solid component) refers to components that neither volatilize nor evaporate and disappear in a case where the inorganic solid electrolyte-containing composition is subjected to drying treatment at 150° C. for 6 hours in a nitrogen atmosphere at a pressure of 1 mmHg. Typically, the solid content refers to a constitutional component other than a dispersion medium described later.

<Polymer Binder>

The polymer binder contained in the inorganic solid electrolyte-containing composition according to the embodiment of the present invention is formed by containing a polymer having a constitutional component that satisfies (A) a glass transition temperature and (B) an SP value, which will be described later, and it is dissolved in a dispersion medium contained in the inorganic solid electrolyte-containing composition. In a case of using this polymer binder in combination with the inorganic solid electrolyte and the dispersion medium, it is possible to exhibit excellent dispersion stability in the inorganic solid electrolyte-containing composition and to firmly bind solid particles in a case where a constitutional layer is formed therefrom.

—Constitutional Component Satisfying (A) Glass Transition Temperature and (B) SP Value—

In the present invention, a polymer (also referred to as a binder forning polymer) that is contained in a polymer binder and forms this polymer binder dissolves the polymer binder in a dispersion medium and has a constitutional component that satisfies both the following (A) glass transition temperature and the following (B) SP value. The dissolution of the polymer binder in the dispersion medium is as described above.

(A) a glass transition temperature ($Tg^{HP}$) in a case where the constitutional component is formed into a homopolymer is 50° C. or higher, and (B) an SP value in a case where the constitutional component is formed into a homopolymer is 20.0 $MPa^{1/2}$ or more and 25.0 $MPa^{1/2}$ or less.

The constitutional component of the binder forming polymer is a constitutional component (hereinafter, may be referred to as a constitutional component AB) in which the SP value (the (A)) which is 20.0 $MPa^{1/2}$ or more and 25.0 $MPa^{1/2}$ or less is satisfied and the glass transition temperature ($Tg^{HP}$) in a case where the constitutional component is formed into a homopolymer is 50° C. or higher. Since the binder forming polymer has this constitutional component AB, the polymer binder can be solidified to a high strength without deteriorating the dispersion stability of the inorganic solid electrolyte-containing composition, whereby the solid particles can be firmly bound.

From the viewpoint that the binding force of the solid particles can be further reinforced while maintaining excellent dispersion stability, the glass transition temperature ($Tg^{HP}$) of the constitutional component AB is preferably 60° C. or higher, more preferably 80° C. or higher, and still more preferably 100° C. or higher. The upper limit value of the glass transition temperature ($Tg^{HP}$) is not particularly limited; however, it is preferably 200° C. or lower, more preferably 150° C. or lower, and still more preferably 130° C. or lower from the viewpoint that the adhesion can be suitably reinforced without excessively increasing the glass transition temperature ($Tg^{B}$) of the polymer binder itself.

In the binder forming polymer, the constitutional component is preferably a constitutional component among the constitutional components AB, where a difference (absolute value) in glass transition temperature between the constitutional component and a constitutional component other than the constitutional components AB described later is 130° C. or higher. This makes it possible to exhibit high strength while maintaining the flexibility of the binder forming polymer as a whole and makes it possible to further reinforce the adhesion of the solid particles.

The glass transition temperature ($Tg^{HP}$) of a constitutional component shall be a glass transition temperature measured according to the following method using a homopolymer consisting of the constitutional component.

That is, the glass transition point is measured under the following conditions using a differential scanning calorimeter (manufactured by SII Crystal Technology Inc., DSC7000) using a dried sample of the homopolymer. The measurement is carried out twice for the same sample, and the result of the second measurement is employed.

Atmosphere in measurement room: Nitrogen (50 mL/min)

Temperature rising rate: 5° C./min

Measurement start temperature: −100° C.

Measurement end temperature: 200° C.

Sample pan: aluminum pan

Mass of measurement sample: 5 mg

Calculation of Tg: Tg is calculated by rounding off the decimal point of the intermediate temperature between the descent start point and the descent end point of the DSC chart.

The constitutional component AB is a constitutional component that exhibits a glass transition temperature ($Tg^{HP}$) of 50° C. or higher, where it has an SP value of 20.0 $MPa^{1/2}$ or more and 25.0 $MPa^{1/2}$ or less in a case of being formed into a homopolymer. Since the binder forming polymer has the constitutional component AB, the dispersion stability of the inorganic solid electrolyte-containing composition can be improved without deteriorating the strong adhesion of the solid particles.

From the viewpoint that the dispersion stability can be further improved while reinforcing the binding force of the solid particles, 20.1 $MPa^{1/2}$ or more is preferable, and 20.2 $MPa^{1/2}$ or more is more preferable. From the viewpoint that a suitable interaction (affinity) with the dispersion medium can be exhibited and excellent dispersion stability can be maintained, the upper limit value of the SP value is preferably 24.0 $MPa^{1/2}$ or less and more preferably 23.0 $MPa^{1/2}$.

The SP value of a constitutional component is an SP value of a homopolymer consisting of the constitutional component, and it can be determined according to the Hoy method described later unless otherwise specified.

As the constitutional component AB, a constitutional component satisfying the (A) glass transition temperature ($Tg^{HP}$) and the (B) SP value can be appropriately selected depending on the kind and the like of the binder forming polymer.

Examples of the constitutional component AB include a constitutional component having an aliphatic group or an aromatic group as a partial structure. The aliphatic group is not particularly limited, and examples thereof include an aliphatic acyclic hydrocarbon (preferably an alkyl group) and an aliphatic cyclic hydrocarbon (adamantane or the like).

Among them, the constitutional component AB is preferably a constitutional component having an aromatic ring as a partial structure.

The aromatic ring contained as a partial structure may be incorporated into the main chain of the binder forming polymer, however, it is preferably incorporated into the side chain and more preferably incorporated into the terminal of the side chain in terms of dispersion stability and adhesiveness. The aromatic ring serves as a substituent (generally a monovalent substituent) or a linking group (generally a divalent or higher valent linking group) depending on the aspect of incorporation.

Examples of the aromatic ring include an aromatic hydrocarbon ring and an aromatic heterocycle, where an aromatic hydrocarbon ring is preferable in terms of dispersion stability and adhesiveness. The aromatic ring may be a monocyclic or a polycyclic ring; however, it is preferably a monocyclic ring. The aromatic ring preferably includes a monocyclic aromatic hydrocarbon ring, and examples thereof include a (monocyclic or polycyclic) aromatic hydrocarbon ring and a polycyclic aromatic heterocyclic ring containing at least one monocyclic aromatic hydrocarbon ring. Among them, a monocyclic or polycyclic aromatic hydrocarbon ring is more preferable, and a monocyclic aromatic hydrocarbon ring is still more preferable. The monocyclic aromatic hydrocarbon ring has the same meaning as the benzene ring. The polycyclic aromatic hydrocarbon ring is a ring formed by condensing a plurality of monocyclic aromatic hydrocarbon rings, and it includes an aromatic hydrocarbon (an acene) ring having a structure in which benzene rings are linearly condensed and connected. The number of aromatic hydrocarbon rings to be condensed is not particularly limited and can be, for example, 2 to 5. Examples of such a polycyclic aromatic hydrocarbon ring include an acene ring such as naphthalene, anthracene, and pentacene and further include chrysene, pyrene, triphenylene, benzopyrene, and coronene.

The aromatic heterocyclic ring is not particularly limited, and examples thereof include a ring corresponding to a heterocyclic group having aromaticity among the heterocyclic groups in the substituent Z described later.

The aromatic ring is preferably bonded, directly or through a linking group, to a partial structure that is incorporated into the main chain of the binder forming polymer. The partial structure is appropriately selected depending on the kind and the like of the binder forming polymer, and examples thereof include a carbon chain (a carbon-carbon bond). The linking group is not particularly limited, and suitable examples thereof include a linking group that can be adopted as $L^H$ of Formula (HC).

The aromatic ring contained in the constitutional component AB, the partial structure incorporated into the main chain, and the linking group each may have a substituent as long as the (A) glass transition temperature ($Tg^{HP}$) and the (B) SP value are satisfied. Such a substituent is not particularly limited, and examples thereof include a group selected from the following substituent Z described later. Preferred examples thereof include a hydroxy group, an alkoxy group, a carbonate group (—O—CO—O—$R^Z$: $R^Z$ represents a substituent), and an ester group (—CO—O—$R^Z$: $R^Z$ represents a substituent). The substituent that can be adopted as $R^Z$ is not particularly limited, and examples thereof include a group selected from the substituent Z described later, examples of which include an alkyl group.

The constitutional component AB is more preferably a constitutional component represented by Formula (HC).

Formula (HC)

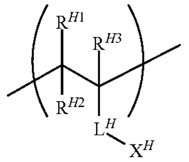

In Formula (HC), $R^{H1}$ to $R^{H3}$ represent a hydrogen atom or a substituent, $L^H$ represents a single bond or a linking group, and $X^H$ represents a monocyclic or polycyclic aromatic ring.

The substituent which can be adopted as $R^{H1}$ to $R^{H3}$ is not particularly limited, and examples thereof include a group selected from the substituent Z described later. Among them, an alkyl group or a halogen atom is preferable. $R^{H1}$ and $R^{H2}$ are each preferably a hydrogen atom, and $R^{H3}$ is preferably a hydrogen atom or methyl.

$L^H$ represents a single bond or a linking group and is appropriately selected depending on the glass transition temperature ($Tg^{HP}$) and the SP value, as well as a combination with $X^H$ and the like.

The linking group that can be adopted as $L^H$ is not particularly limited; however, examples thereof include an alkylene group (preferably having 1 to 12 carbon atoms, more preferably 1 to 6 carbon atoms, and still more preferably having 1 to 3 carbon atoms), an alkenylene group (preferably having 2 to 6 carbon atoms and more preferably having 2 or 3 carbon atoms), an arylene group (preferably having 6 to 24 carbon atoms and more preferably having 6 to 10 carbon atoms), an oxygen atom, a sulfur atom, an imino group (—$NR^N$—: $R^N$represents a hydrogen atom, an alkyl group having 1 to 6 carbon atoms or an aryl group having 6 to 10 carbon atoms), a carbonyl group, a phosphate linking group (—O—P(OH)(O)—O—), a phosphonate linking group (—P)(OH)(O)—O—), and a group involved in the combination thereof. The linking group is preferably a group composed of a combination of an alkylene group, an arylene group, a carbonyl group, an oxygen atom, a sulfur atom, and an imino group, more preferably a group composed of a combination of an alkylene group, an arylene group, a carbonyl group, an oxygen atom, and an imino group, still more preferably a group containing a —CO—O— group, a —CO—N($R^N$)— group (—$NR^N$—: $R^N$ represents a hydrogen atom, an alkyl group having 1 to 6 carbon atoms or an aryl group having 6 to 10 carbon atoms), and particularly preferably a group obtained by combining these and a (mono- or poly-) alkyleneoxy group. The number of atoms that constitute the linking group and the number of linking atoms are as described below. However, the above does not apply to the polyalkyleneoxy group that constitutes the linking group.

In the present invention, the number of atoms that constitute the linking group is preferably 1 to 36, more preferably 1 to 24, still more preferably 1 to 12, and particularly preferably 1 to 6. The number of linking atoms of the linking group is preferably 10 or less and more preferably 8 or less. The lower limit thereof is 1 or more. The number of linking atoms refers to the minimum number of atoms linking predetermined structural parts. For example, in a case of a —C(C═O)—$CH_2$—$CH_2$—O— linking group, the number of atoms that constitute the linking group is 10; however, the number of linking atoms is 5.

$X^H$ represents a monocyclic or polycyclic aromatic ring. The monocyclic or polycyclic aromatic ring that can be adopted as $X^H$ has the same meaning as the monocyclic aromatic ring and the polycyclic aromatic ring, which are included in the constitutional component AB as a partial structure.

The constitutional component represented by Formula (HC) may have a substituent as long as the (A) glass transition temperature ($Tg^{HP}$) and the (B) SP value are satisfied. Such a substituent is not particularly limited, and suitable examples thereof include the substituent described in the above-described preferred constitutional component AB.

It is noted that in a case where the constitutional component AB has an aromatic ring group having a substituent, the aromatic ring is assigned to $X^H$ instead of $L^H$ of Formula (HC), and the constitutional component AB is interpreted as the constitutional component represented by Formula (HC). For example, the constitutional component AB in a polymer S-3 synthesized in Example has a methoxyphenyl group as a partial structure; however, the phenyl group is assigned to $X^H$, and the methoxy group is included as a substituent in the constitutional component by Formula (HC).

The constitutional component AB is not particularly limited; however, it is preferably a constitutional component derived from a (meth)acrylic compound (M1) described later or a constitutional component derived from a vinyl compound (M2) described later. Specific examples thereof include a (meth)acrylic acid alkyl ester compound, a (meth) acrylic acid aryl (preferably a phenyl) ester compound, a (mono or di-alkyl) (meth)acrylamide compound, a styrene compound, a vinyl pyridine compound, a vinyl naphthalene compound, and a carboxylic acid vinyl ester compound. The numbers of carbon atoms of the alkyl group (including the alkylene group of the alkyleneoxy group) in the (meth) acrylic acid alkyl ester compound and the (mono or di-alkyl) (meth)acrylamide compound are appropriately determined in consideration of the (A) glass transition temperature and the (B) SP value. However, it can be, for example, 1 to 20, and it is preferably 1 to 10, more preferably 1 to 6, and still more preferably 1 to 3, in terms of dispersion stability and adhesiveness.

Specific examples of the above-described preferred constitutional component and the more preferred constitutional component represented by Formula (HC), as the constitutional component AB, include constitutional components in a binder forming polymer described later and in Examples; however, the present invention is not limited thereto.

The binder forming polymer may have one kind or two or more kinds of the constitutional components AB.

The content of the constitutional component AB in the binder forming polymer is determined by appropriately considering the glass transition temperature ($Tg^B$), the SP value, and the like of the entire polymer, and the details thereof will be described later.

—Polymer Having Constitutional Component AB Described Above—

The polymer having the constitutional component AB is not particularly limited, and various polymers can be used. Preferred examples thereof include a polymer having, in the main chain, at least one bond selected from a urethane bond, a urea bond, an amide bond, an imide bond, or an ester bond, or a polymerized chain of carbon-carbon double bond.

In the present invention, a main chain of the polymer refers to a linear molecular chain in which all the molecular chains that constitute the polymer other than the main chain can be conceived as a branched chain or a pendant group with respect to the main chain. Although it depends on the mass average molecular weight of the branched chain regarded as a branched chain or pendant group, the longest chain among the molecular chains that constitute the polymer is typically the main chain. In this case, a terminal group at the polymer terminal is not included in the main chain. In addition, side chains of the polymer refer to branched chains other than the main chain and include a short chain and a long chain.

The above bond is not particularly limited as long as it is contained in the main chain of the polymer, and it may have any aspect in which it is contained in the constitutional component (the repeating unit) and/or an aspect in which it is contained as a bond that connects different constitutional components to each other). Further, the above-described bond contained in the main chain is not limited to one kind, it may be 2 or more kinds, and it is preferably 1 to 6 kinds and more preferably 1 to 4 kinds. In this case, the binding mode of the main chain is not particularly limited. The main chain may randomly have two or more kinds of bonds and may be a main chain that is segmented to a segment having a specific bond and a segment having another bond.

The main chain having the above-described bonds is not particularly limited. However, it is preferably a main chain having at least one segment of the above-described bonds, and it is more preferably a main chain consisting of polyamide, polyurea, or polyurethane.

Examples of the polymer having, among the above bonds, a urethane bond, a urea bond, an amide bond, an imide bond, or an ester bond in the main chain include sequential polymerization (polycondensation, polyaddition, or addition condensation) polymers such as polyurethane, polyurea, polyamide, polyimide, and polyester, and copolymers thereof. The copolymer may be a block copolymer having each of the above polymers as a segment, or a random copolymer in which each constitutional component that constitutes two or more polymers among the above polymers is randomly bonded.

Examples of the polymer having a polymerized chain of carbon-carbon double bonds in the main chain include chain polymerization polymers such as a fluorine-based polymer (a fluorine-containing polymer), a hydrocarbon-based polymer, a vinyl polymer, and a (meth)acrylic polymer. The polymerization mode of these chain polymerization polymers is not particularly limited. The chain polymerization polymer may be any one of a block copolymer, an alternating copolymer, or a random copolymer; however, it is preferably a random copolymer.

As the polymer having the constitutional component AB, each of the above-described polymers can be appropriately selected; however, a vinyl polymer or a (meth)acrylic polymer is preferable.

In the binder forming polymer, the content of the constitutional component AB, another constitutional component, and the content of the other component are determined in consideration of the glass transition temperature ($Tg^B$), the SP value, and the like of the entire polymer, and details thereof will be described later.

Examples of the (meth)acrylic polymer suitable as the polymer having the constitutional component AB include a copolymer of the constitutional component AB and the (meth)acrylic compound (M1), where the polymer consists of a polymer containing 50% by mass of a constitutional component derived from the (meth)acrylic compound. Here, in a case where the constitutional component AB is a constitutional component derived from the (meth)acrylic compound, the content of the constitutional component AB is included for calculation in the content of the constitutional component derived from the (meth)acrylic compound. Further, the (meth)acrylic polymer is also preferably a copolymer with the vinyl compound (M2) other. than the (meth) acrylic compound (M1).

Examples of the vinyl polymer suitable as the polymer having the constitutional component AB include a copolymer of the constitutional component AB and the vinyl compound (M2) other than the (meth)acrylic compound (M1), where the polymer consists of a copolymer containing 50% by mass or more of a constitutional component derived from the vinyl compound. Here, in a case where the constitutional component AB is a constitutional component derived from the vinyl compound, the content of the constitutional component AB is included for calculation in the content of the constitutional component derived from the vinyl compound. The vinyl polymer is also preferably a copolymer with the (meth)acrylic compound (M1).

Examples the (meth)acrylic compound (M1) include a compound other than the compound from which the constitutional component AB is derived, among a (meth)acrylic acid compound, a (meth)acrylic acid ester compound, a (meth)acrylamide compound, a (meth)acrylonitrile compound, and the like. Among the above, a (meth)acrylic acid ester compound or a (meth)acrylamide compound is preferable.

Examples of the (meth)acrylic acid ester compound include a (meth)acrylic acid alkyl ester compound, a (meth) acrylic acid aryl ester compound, and a (meth)acrylic acid ester compound having a polymerized chain, where a (meth) acrylic acid alkyl ester compound or a (meth)acrylic acid ester compound having a polymerized chain is preferable. The number of carbon atoms of the alkyl group that constitutes the (meth)acrylic acid alkyl ester compound is not particularly limited; however, it can be set to, for example, 1 to 24, and it is preferably 3 to 20, more preferably 4 to 16, and still more preferably 6 to 14, in terms of dispersion stability and adhesiveness. The number of carbon atoms of the aryl group that constitutes the aryl ester is not particularly limited; however, it can be set to, for example, 6 to 24, and it is preferably 6 to 10 and more preferably 6. In the (meth)acrylamide compound, the nitrogen atom of the amide group may be substituted with an alkyl group or an aryl group. The polymerized chain contained in the (meth) acrylic acid ester compound is not particularly limited; however, it is preferably an alkylene oxide polymerized chain and more preferably a polymerized chain consisting of an alkylene oxide having 2 to 4 carbon atoms. The degree of polymerization of the polymerized chain is not particularly limited and is appropriately set. An alkyl group or an aryl group is generally bonded to the end part of the polymerized chain.

The vinyl compound (M2) is not particularly limited. However, among the vinyl compounds that can be copolymerized with the (meth)acrylic compound (M1), a vinyl compound other than the vinyl compound from which the constitutional component AB is preferable, and examples thereof include aromatic vinyl compounds such as a styrene compound, a vinyl naphthalene compound, a vinyl imidazole compound, a vinyl carbazole compound, and a vinyl pyridine compound and further include an allyl compound, a vinyl ether compound, a vinyl ester compound (for example, a vinyl acetate compound or a vinyl benzoate compound), a dialkyl itaconate compound, and an unsaturated carboxylic acid anhydride. Examples of the vinyl compound include the "vinyl monomer" disclosed in JP2015-88486A.

The (meth)acrylic compound (M1) and the vinyl compound (M2) may have a substituent. The substituent is not particularly limited, and examples thereof include a group selected from the substituent Z described later. Among the above, a polar group such as a hydroxy group, an alkoxy group, a heterocyclic group (preferably an aromatic heterocyclic group), an acyloxy group, a cyano group, or an amino group is preferable.

The (meth)acrylic compound (M1) and the vinyl compound (M2) are preferably a compound represented by Formula (b-1). It is preferable that this compound is different from the above-described compound from which the constitutional component AB is derived.

(b-1)

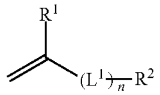

In the formula, $R^1$ represents a hydrogen atom, a hydroxy group, a cyano group, a halogen atom, an alkyl group (preferably having 1 to 24 carbon atoms, more preferably 1 to 12 carbon atoms, and particularly preferably 1 to 6 carbon atoms), an alkenyl group (preferably having 2 to 24 carbon atoms, more preferably 2 to 12 carbon atoms, and particularly preferably 2 to 6 carbon atoms), an alkynyl group (preferably having 2 to 24 carbon atoms, more preferably 2 to 12 carbon atoms, and particularly preferably 2 to 6 carbon atoms), or an aryl group (preferably having 6 to 22 carbon atoms and more preferably 6 to 14 carbon atoms). Among the above, a hydrogen atom or an alkyl group is preferable, and a hydrogen atom or a methyl group is more preferable.

$R^2$ represents a hydrogen atom or a substituent. The substituent that can be adopted as $R^2$ is not particularly limited. However, examples thereof include an alkyl group (preferably a linear chain although it may be a branched chain), an alkenyl group (preferably having 2 to 12 carbon atoms, more preferably 2 to 6 carbon atoms, and particularly preferably 2 or 3 carbon atoms), an aryl group (preferably having 6 to 22 carbon atoms and more preferably 6 to 14 carbon atoms), an aralkyl group (preferably having 7 to 23 carbon atoms and more preferably 7 to 15 carbon atoms), and a cyano group.

The number of carbon atoms of the alkyl group has the same meaning as the number of carbon atoms of the alkyl group that constitutes the (meth)acrylic acid alkyl ester compound, and the same applies to the preferred range thereof.

$L^1$ is a linking group and is not particularly limited, and examples thereof include $L^H$ of Formula (HC).

In a case where $L^1$ adopts a —CO—O— group or a —CO—N($R^N$)— group ($R^N$ is as described above) (here, an aspect in which —O— or —N($R^N$)— is bonded to $R^2$), the compound represented by Formula (b-1) corresponds to the (meth)acrylic compound (M1), the others correspond to the vinyl compound (M2).

n is 0 or 1 and preferably 1. However, in a case where $-(L^1)_n-R^2$ represents one kind of substituent (for example, an alkyl group), n is set to 0, and $R^2$ is set to a substituent (an alkyl group).

The (meth)acrylic compound (M1) is preferably a compound represented by Formula (b-2) or (b-3). This compound is different from the above-described compounds from which the constitutional component AB is derived.

(b-2)

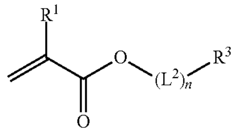

(b-3)

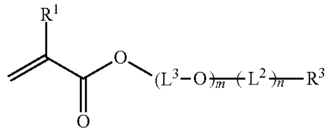

$R^1$ and n have the same as those in Formula (b-1).

$R^3$ has the same meaning as $R^2$.

$L^2$ is a linking group and has the same meaning as the above $L^1$.

$L^3$ is a linking group and has the same meaning as the above $L^1$; however, it is preferably an alkylene group having 1 to 6 carbon atoms (preferably 2 to 4).

m is preferably an integer of 1 to 200, more preferably an integer of 1 to 100, and still more preferably an integer of 1 to 50.

The compound represented by Formulae (b-1) to (b-3) (preferably $R^2$ or $R^3$) may have a substituent. The substituent is not particularly limited, and examples thereof include a group selected from the substituent Z described later, where the above-described polar group which can be adopted by the above-described (meth)acrylic compound (M1) or the like is preferable.

In addition, in Formulae (b-1) to (b-3), the carbon atom which forms a polymerizable group and to which $R^1$ is not bonded is represented as an unsubstituted carbon atom ($H_2C$=); however, it may have a substituent. The substituent is not particularly limited; however, examples thereof include the above group that can be adopted as $R^1$.

In the present invention, The (meth)acrylic compound (M1) and the vinyl compound (M2) other than the compound from which the constitutional component AB is derived is preferably a compound from which a constitutional component exhibiting a glass transition temperature at which a difference (absolute value) from the glass transition temperature ($Tg^{HP}$) of the constitutional component AB is 130° C. or higher. Here, the glass transition temperature of a constitutional component is the glass transition temperature of a homopolyiner consisting of the constitutional component. In a case where the polymer having the constitutional component AB further has a constitutional component that exhibits a high glass transition temperature with respect to the constitutional component AB, it is possible to exhibit high strength while maintaining the flexibility of the polymer having the constitutional component AB, as a whole, and makes it possible to further reinforce the adhesion of the solid particles. In a case where the polymer having the constitutional component AB has a plurality of constitutional components derived from the (meth)acrylic compound (M1) and the vinyl compound (M2), the highest difference (absolute value) in the glass transition temperature from that of the constitutional component AB may be 130° C. or higher; however, it is preferable that all the constitutional components exhibit a difference (absolute value) in the glass transition temperature of 130° C. or higher with respect to the constitutional component AB. From the viewpoint of further reinforcing the adhesion, the difference (absolute value) from the glass transition temperature ($Tg^{HP}$) of the constitutional component AB is more preferably 140° C. or higher and still more preferably 150° C. or higher. The upper limit value thereof is not particularly limited; however, it can be set to, for example, 210° C. or lower and it is preferably 190° C. or lower.

Specific examples of the (meth)acrylic compound (M1) and the vinyl compound (M2) include compounds from which constitutional components in polymers having the constitutional component AB are derived, where the polymers will be described later and are those in Examples; however, the present invention is not limited thereto. Examples of the (meth)acrylic compound (M1) or the vinyl compound (M2) having the above-described polar group as a substituent include an acrylonitrile compound, a hydroxyalkyl acrylic acid ester compound, an alkoxyalkyl acrylic acid ester compound, a (meth)acrylic compound represented by Formula (b-3), an aromatic vinyl compound (an aromatic heterocyclic ring having a vinyl group), and a vinyl ester compound.

The polymer having the constitutional component AB may have one kind of the (meth)acrylic compound (M1) or the vinyl compound (M2) or may have two or more kinds thereof.

In the polymer having the constitutional component AB, the constitutional component AB and the constitutional component other than the constitutional component AB (another constitutional component) are used in combination in an appropriate combination in consideration of the glass transition temperature and the SP value of the polymer. Examples of the preferred combination thereof include a combination of the preferred one as the constitutional component AB and the preferred one as the (meth)acrylic compound (M1) or the vinyl compound (M2). It is preferable that the (meth)acrylic compound (M1) or the vinyl compound (M2), which is be combined with the constitutional component AB includes the (meth)acrylic compound (M1) or the vinyl compound (M2), which does not have the above-described polar group as a substituent, where an aspect in which the (meth)acrylic compound (M1) or the vinyl compound (M2), which has the above-described polar group as a substituent is further included, or the (meth) acrylic compound represented by Formula (b-3) is included as the (meth)acrylic compound (M1) which does not have the above-described polar group is also one of the preferred aspects.

The polymer having the constitutional component AB can adopt a form having or a form not having, as still another constitutional component, a constitutional component derived from a macromonomer having a number average molecular weight of 1,000 or more. In the present invention, a form not having a constitutional component derived from a macromonomer is preferable. The macromonomer having a number average molecular weight of 1,000 or more is not particularly limited as long as it does not include the compound represented by any one of Formulae (b-1) to (b-3), and examples thereof include the macromonomer (X) described in JP2015-088486A.

The content of each constitutional component in the polymer containing the constitutional component AB is not particularly limited and is determined in appropriate consideration of the glass transition temperature ($Tg^B$), the SP value, and the like of the entire polymer. For example, it is set within the following range.

The content of each constitutional component in the (meth)acrylic polymer is set, for example, in the following range such that the total content of all the constitutional components is 100% by mass.

The content of the constitutional components derived from the (meth)acrylic compound (the constitutional component derived from the (meth)acrylic compound and the constitutional component derived from the (meth)acrylic compound (M1) among the constitutional components AB) is preferably 50% by mass or more, more preferably 60% by mass or more, and still more preferably 70% by mass or more. The upper limit content can be set to 100% by mass; however, it can be also set to 97% by mass or less.

The content of the constitutional component AB is, for example, preferably 20% to 95% by mass, more preferably 30% to 90% by mass, and still more preferably 40% to 85% by mass. Among the constitutional components AB, the content of the constitutional component (the constitutional component derived from the (meth)acrylic compound (M1)) represented by Formula (HC) is set in consideration of the above range; however, it is preferably 20% to 90% by mass, more preferably 35% to 85% by mass, and still more preferably 50% to 80% by mass.

The content of the constitutional component (excluding the constitutional component AB) derived from the (meth) acrylic compound (M1) is, for example, preferably 5% to 95% by mass, more preferably 10% to 70% by mass, still more preferably 10% to 50% by mass, and particularly preferably 10% to 40% by mass.

The content of the constitutional component (excluding the constitutional component AB) derived from the vinyl compound (M2) is set to 50% by mass or less, and it is preferably 3% to 40% by mass and preferably 3% to 30% by mass. The content of the constitutional component derived from the styrene compound among the vinyl compounds is set in consideration of the above range; however, the content of the vinyl compound (M2) is preferably 0% to 90% by mass and more preferably 50% to 80% by mass in a case where the content of the vinyl compound(M2) is set to 100% by mass.

In a case where the constitutional component derived from the (meth)acrylic compound (M1) and the constitutional component derived from the vinyl compound (M2) include a constitutional component having the above-described polar group, the total content of the constitutional component having the polar group is appropriately set, for example, in consideration of the range of the content of the constitutional component derived from the (meth)acrylic compound (M1) or the constitutional component derived from the vinyl compound (M2), where it is specifically, preferably 0% to 50% by mass and more preferably 2% to 20% by mass.

The content of the constitutional component derived from the macromonomer is, for example, preferably 0% to 30% by mass.

The content of each constitutional component in the vinyl polymer is set, for example, in the following range such that the total content of all the constitutional components is 100% by mass.

The content of the constitutional components derived from the vinyl compound (M2) (the constitutional component derived from the vinyl compound (M2) and a constitutional component derived from the vinyl compound (M2) other than the (meth)acrylic compound (M1) among the constitutional components AB) is preferably 50% by mass or more, more preferably 60% by mass or more, and still more preferably 65% by mass or more. The upper limit content can be set to 100% by mass; however, it is preferably 95% by mass or less and more preferably 90% by mass or less.

The content of the constitutional component AB is, for example, preferably 20% to 95% by mass, more preferably 30% to 90% by mass, and still more preferably 40% to 80% by mass. Among the constitutional components AB, the content of the constitutional component (the constitutional component derived from the vinyl compound (M2)) represented by Formula (HC) is set in consideration of the above range; however, it is preferably 20% to 95% by mass, more preferably 20% to 90% by mass, still more preferably 35% to 85% by mass, and particularly preferably 50% to 80% by mass.

The content of the constitutional component (excluding the constitutional component AB) derived from the vinyl compound (M2) is, for example, preferably 5% to 90% by mass, more preferably 15% to 70% by mass, and still more preferably 25% to 50% by mass. The content of the constitutional component derived from the styrene compound among the vinyl compounds is set in consideration of the above range; however, it is preferably 20% to 90% by mass and more preferably 40% to 80% by mass in a case where the content of the vinyl compound(M2) is set to 100% by mass.

It suffices that the content of the constitutional component (excluding the constitutional component AB) derived from the (meth)acrylic compound (MI) is less than 50% by mass, where the content of the constitutional component is, for example, preferably 0% to 40% by mass and more preferably 0% to 30% by mass.

In a case where the constitutional component derived from the vinyl compound (M2) and the constitutional component derived from the (meth)acrylic compound (M1) include a constitutional component having the above-described polar group, the total content of the constitutional component having the polar group is appropriately set, for example, in consideration of the range of the content of the constitutional component derived from the vinyl compound (M2) or the constitutional component derived from (meth) acrylic compound (M1), where it is specifically, preferably 0% to 50% by mass and more preferably 2% to 20% by mass.

The content of the constitutional component derived from the macromonomer is, for example, preferably 0% to 30% by mass.

The polymer having the constitutional component AB may have a substituent. The substituent is not particularly limited; however, examples thereof preferably include a group selected from the following substituent Z.

The polymer having the constitutional component AB can be synthesized with a known method by selecting a raw material compound depending on the kind of bond of the main chain and subjecting the raw material compound to polyaddition or polycondensation.

—Substituent Z—

The examples are an alkyl group (preferably an alkyl group having 1 to 20 carbon atoms, for example, methyl, ethyl, isopropyl, t-butyl, pentyl, heptyl, 1-ethylpentyl, benzyl, 2-ethoxyethyl, and 1-carboxymethyl), an alkenyl group (preferably an alkenyl group having 2 to 20 carbon atoms, such as vinyl, allyl, andoleyl), an alkynyl group (preferably an alkynyl group having 2 to 20 carbon atoms, for example, ethynyl, butadynyl, and phenylethynyl), a cycloalkyl group (preferably a cycloalkyl group having 3 to 20 carbon atoms, such as cyclopropyl, cyclopentyl, cyclohexyl, and 4-methylcyclohexyl; in the present invention, the alkyl group generally has a meaning including a cycloalkyl group therein when being referred to, however, it will be described separately here), an aryl group (preferably an aryl group having 6 to 26 carbon atoms, such as phenyl, 1-naphthyl, 4-methoxyphenyl, 2-chlorophenyl, and 3-methylphenyl), an aralkyl group (preferably an aralkyl group having 7 to 23 carbon atoms, for example, benzyl or phenethyl), and a heterocyclic group (preferably a heterocyclic group having 2 to 20 carbon atoms and more preferably a 5- or 6-membered heterocyclic group having at least one oxygen atom, one sulfur atom, or one nitrogen atom. The heterocyclic group includes an aromatic heterocyclic group and an aliphatic heterocyclic group. Examples thereof include a tetrahydropyran ring group, a tetrahydrofuran ring group, a 2-pyridyl group, a 4-pyridyl group, a 2-imidazolyl group, a 2-benzimidazolyl group, a 2-thiazolyl group, a 2-oxazolyl group, or a pyrrolidone group); an alkoxy group (preferably an alkoxy group having 1 to 20 carbon atoms, for example, a methoxy group, an ethoxy group, an isopropyloxy group, or a benzyloxy group); an aryloxy group (preferably an aryloxy group having 6 to 26 carbon atoms, for example, a phenoxy group, a 1-naphthyloxy group, a 3-methylphenoxy group, or a 4-methoxyphenoxy group); a heterocyclic oxy group (a group in which an —O— group is bonded to the above-described heterocyclic group), an alkoxycarbonyl group (preferably an alkoxycarbonyl group having 2 to 20 carbon atoms, for example, an ethoxycarbonyl group, a 2-ethylhexyloxycarbonyl group, or a dodecyloxycarbonyl group); an aryloxycarbonyl group (preferably an aryloxycarbonyl group having 6 to 26 carbon atoms, for example, a phenoxycarbonyl group, a 1-naphthyloxycarbonyl group, a 3-methylphenoxycarbonyl group, or a 4-methoxyphenoxycarbonyl group); a heterocyclic oxycarbonyl group (a group in which a —O—CO— group is bonded to the heterocyclic group); an amino group (preferably an amino group having 0 to 20 carbon atoms, an alkylamino group, or an arylamino group, for example, an amino ($-NH_2$) group, an N,N-dimethylamino group, an N,N-diethylamino group, an N-ethylamino group, or an anilino group); a sulfamoyl group (preferably a sulfamoyl group having 0 to 20 carbon atoms, for example, an N,N-dimethylsulfamoyl group or an N-phenylsufamoyl group); an acyl group (an alkylcarbonyl group, an alkenylcarbonyl group, an alkynylcarbonyl group, an arylcarbonyl group, or a heterocyclic carbonyl group, preferably an acyl group having 1 to 20 carbon atoms, for example, an acetyl group, a propionyl group, a butyryl group, an octanoyl group, a hexadecanoyl group, an acryloyl group, a methacryloyl group, a crotonoyl group, a benzoyl group, a naphthoyl group, or a nicotinoyl group); an acyloxy group (an alkylcarbonyloxy group, an alkenylcarbonyloxy group, an alkynylcarbonyloxy group, an arylcarbonyloxy group, or a heterocyclic carbonyloxy group, preferably an acyloxy group having 1 to 20 carbon atoms, for example, an acetyloxy group, a propionyloxy group, a butyryloxy group, an octanoyloxy group, a hexadecanoyloxy group, an acryloyloxy group, a methacryloyloxy group, a crotonoyloxy group, a benzoyloxy group, or the like); an aryloyloxy group (preferably an aryloyloxy group having 7 to 23 carbon atoms, for example, a benzoyloxy group, a naphthoyloxy group, or the like); a carbamoyl group (preferably a carbamoyl group having 1 to 20 carbon atoms, for example, an N,N-dimethylcarbamoyl group or an N-phenylcarbamoyl group); an acylamino group (preferably an acylamino group having 1 to 20 carbon atoms, for example, an acetylamino group or a benzoylamino group); an alkylthio group (preferably an alkylthio group having 1 to 20 carbon atoms, for example, a methylthio group, an ethylthio group, an isopropylthio group, or a benzylthio group); an arylthio group (preferably an arylthio group having 6 to 26 carbon atoms, for example, a phenylthio group, a 1-naphthylthio group, a 3-methylphenylthio group, or a 4-methoxyphenylthio group); a heterocyclic thio group (a group in which an —S— group is bonded to the above-described heterocyclic group), an alkylsulfonyl group (preferably an alkylsulfonyl group having 1 to 20 carbon atoms, for example, a methylsulfonyl group or an ethylsulfonyl group), an arylsulfonyl group (preferably an arylsulfonyl group having 6 to 22 carbon atoms, for example, a benzenesulfonyl group), an alkylsilyl group (preferably an alkylsilyl group having 1 to 20 carbon atoms, for example, a monomethylsilyl group, a dimethylsilyl group, a trimethylsilyl group, or a triethylsilyl group); an arylsilyl group (preferably an arylsilyl group having 6 to 42 carbon atoms, for example, a triphenylsilyl group), an alkoxysilyl group (preferably an alkoxysilyl group having 1 to 20 carbon atoms, for example, a monomethoxysilyl group, a dimethoxysilyl group, a trimethoxysilyl group, or a triethoxysilyl group), an aryloxysilyl group (preferably an aryloxysilyl group having 6 to 42 carbon atoms, for example, a triphenyloxysilyl group), a phosphate group (preferably a phosphate group having 0 to 20 carbon atoms, for example, $-OP(=O)(R^P)_2$), a phosphonyl group (preferably a phosphonyl group having 0 to 20 carbon atoms, for example, $-P(=O)(R^P)_2$), a phosphinyl group (preferably a phosphinyl group having 0 to 20 carbon atoms, for example, $-P(R^P)_2$), a phosphonate group (preferably a phosphonate group having 0 to 20 carbon atoms, for example, $-PO(OR^P)_2$), a sulfo group (a sulfonate group), a carboxy group, a hydroxy group, a sulfanyl group, a cyano group, and a halogen atom (for example, a fluorine atom, a chlorine atom, a bromine atom, or an iodine atom). $R^P$ represents a hydrogen atom or a substituent (preferably a group selected from the substituent Z).

In addition, each group exemplified in the substituent Z may be further substituted with the substituent Z.

The alkyl group, the alkylene group, the alkenyl group, the alkenylene group, the alkynyl group, the alkynylene group, and/or the like may be cyclic or chained, may be linear or branched.

—Physical Properties, Characteristics, or Like of Polymer Having Constitutional Component AB or Polymer Binder—

It is preferable that the polymer binder or the polymer having the constitutional component AB, which is used in the present invention, has the following physical properties, characteristics, or the like.

The glass transition temperature ($Tg^B$) of the polymer having the constitutional component AB of the polymer binder is not uniquely determined by changing the kind, content, and the like of the constitutional component AB described later; however, it is preferably 0° C. to 100° C., more preferably 0° C. to 90° C., still more preferably 5° C. to 70° C., and particularly preferably 10° C. to 50° C. in terms of the adhesiveness of the solid particles. The measuring method for the glass transition temperature is as described above.

In the polymer having the constitutional component AB, the SP value is, for example, preferably 17.0 to 23.0 $MPa^{1/2}$, more preferably 17.0 to 21.0 $MPa^{1/2}$, and still more preferably 18.0 to 20.5 $MPa^{1/2}$ in terms of dispersion stability.

The method of calculating the SP value will be described.

First, the SP value ($MPa^{1/2}$) of each constitutional component that constitutes the polymer having the constitutional component AB is determined according to the Hoy method unless otherwise specified (see the following formula in H. L. Hoy JOURNAL OF PAINT TECHNOLOGY, Vol. 42, No. 541, 1970, 76-118, and POLYMER HANDBOOK $4^{th}$, Chapter 59, VII, page 686, Table 5, Table 6, and the following formula in Table 6).

$$\delta_t = \frac{F_t + \frac{B}{\bar{n}}}{V};$$

$$B = 277$$

In the expression, $\delta_t$ indicates an SP value. Ft is a molar attraction function $(J \times cm^3)^{1/2}$/mol and represented by the following expression. V is a molar volume ($cm^3$/mol) and represented by the following expression. $\bar{n}$ is represented by the following expression.

$$F_t = \sum n_i F_{t,i}$$

$$V = \sum n_i V_i$$

$$\bar{n} = \frac{0.5}{\Delta_T^{(P)}}$$

$$\Delta_T^{(P)} = \sum n_i \Delta_{T,i}^{(P)}$$

In the above formula, $F_{t,i}$ indicates a molar attraction function of each constitutional unit, $V_i$ indicates a molar volume of each constitutional unit, $\Delta^{(P)}_{T,i}$ indicates a correction value of each constitutional unit, and $n_i$ indicates the number of each constitutional unit.

Using the SP value ($MPa^{1/2}$) of each component determined as described above, the SP value ($MPa^{1/2}$) of the polymer having the constitutional component AB is calculated from the following expression. It is noted that the SP value of the constitutional component obtained according to the above document is converted into an SP value ($MPa^{1/2}$) (for example, $1 cal^{1/2} cm^{-3/2} \approx 2.05\ J^{1/2}\ cm^{-3/2} \approx 2.05\ MPa^{1/2}$) and used.

$$SP_p^2 = (SP_1^2 \times W_1) + (SP_2^2 \times W_2) +$$

In the expression, $SP_1$, $SP_2$ . . . indicates the SP values of the constitutional components, and $W_1$, $W_2$ . . . indicates the mass fractions of the constitutional components. In the present invention, the mass fraction of a constitutional component shall be a mass fraction of the constitutional component AB of the constitutional component (the raw material compound from which this constitutional component is derived) in the polymer.

The SP value of the polymer having the constitutional component AB can be adjusted depending on the kind or the composition (the kind and the content of the constitutional component) of the polymer.

It is preferable that the SP value of the polymer having the constitutional component AB satisfies a difference (in terms of absolute value) in SP value in a range described later with respect to the SP value of the dispersion medium from the viewpoint of realizing a higher dispersibility and higher dispersion stability.

The mass average molecular weight of the polymer having the constitutional component AB is not particularly limited. It is, for example, preferably 15,000 or more, more preferably 30,000 or more, and still more preferably 50,000 or more. The upper limit thereof is practically 5,000,000 or less, preferably 4,000,000 or less, more preferably 3,000,000 or less, and still more preferably 100,000 or less.

—Measurement of Molecular Weight—

In the present invention, unless specified otherwise, molecular weights of a polymer, a polymer chain and a macromonomer refer to a mass average molecular weight and number average molecular weight in terms of standard polystyrene conversion, which are determined according to gel permeation chromatography (GPC). The measurement method thereof includes, basically, a method under Conditions 1 or Conditions 2 (preferential) described below. However, depending on the kind of polymer or macromonomer, an appropriate eluent may be suitably selected and used.

(Condition 1)

Column: Connect two TOSOH TSKgel Super AWM-H (product name, manufactured by Tosoh Corporation)
Carrier: 10 mM LiBr/N-methylpyrrolidone
Measurement temperature: 40° C.
Carrier flow rate: 1.0 ml/min
Sample concentration: 0.1% by mass
Detector: refractive indicator (RI) detector (Condition 2)

Column: A column obtained by connecting TOSOH TSKgel Super HZM-H, TOSOH TSKgel Super HZ4000, and TOSOH TSKgel Super HZ2000 (all of which are product names, manufactured by Tosoh Corporation)
Carrier: tetrahydrofuran
Measurement temperature: 40° C.
Carrier flow rate: 1.0 ml/min
Sample concentration: 0.1% by mass
Detector: refractive indicator (RI) detector The water concentration of the binder (the polymer having the constitutional component AB) is preferably 100 ppm (mass basis) or less. Further, as this binder, a polymer may be crystallized and dried, or a binder dispersion liquid may be used as it is.

The polymer having the constitutional component AB is preferably amorphous. In the present invention, the description that a polymer is "amorphous" typically refers to that no endothermic peak due to crystal melting is observed when the measurement is carried out at the glass transition temperature.

The polymer having the constitutional component AB may be a non-crosslinked polymer or a crosslinked polymer. In addition, in a case where the crosslinking of the polymer progresses due to heating or voltage application, the molecular weight may be higher than the above-described molecular weight. Preferably, the polymer having the constitutional component AB has a mass average molecular weight in the above-described range at the start of use of the all-solid state secondary battery.

Specific examples of the polymer having the constitutional component AB include polymers shown below in addition to those synthesized in Examples; however, the present invention is not limited thereto. It is noted that in the following specific examples, the content of the constitutional component is appropriately set in consideration of the (A) glass transition temperature ($Tg^{HP}$) and the (B) SP value.

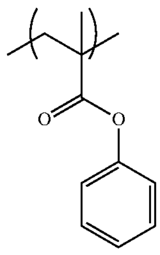 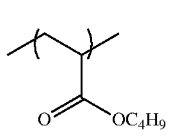

-continued

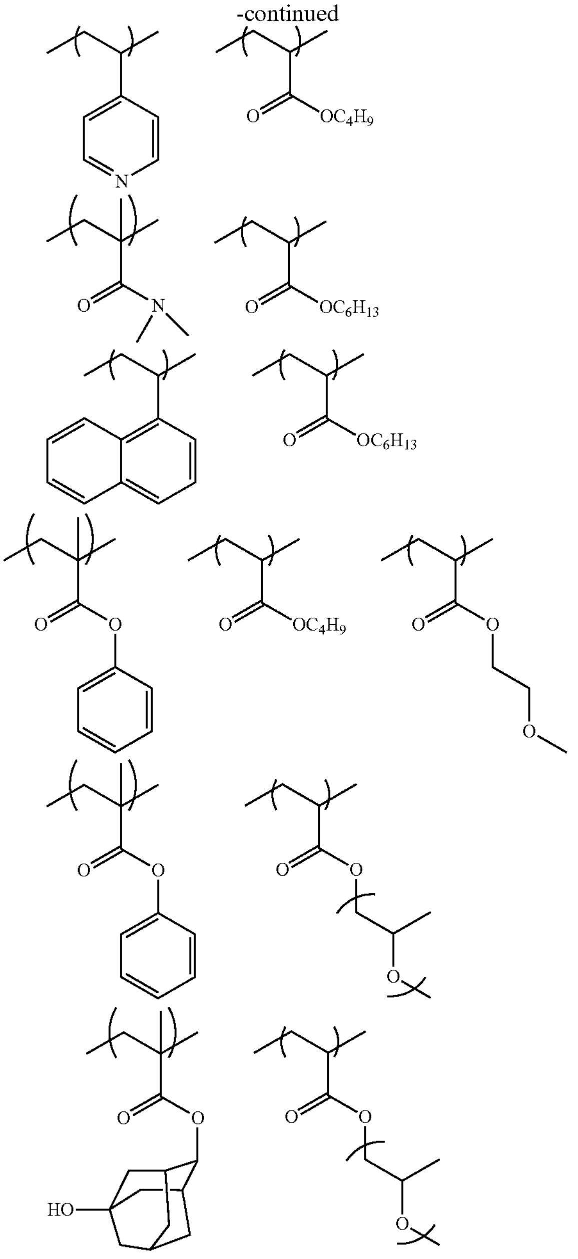

The polymer having the constitutional component AB, which is contained in the polymer binder, may be one kind or two or more kinds. In addition, the polymer binder may contain another polymer as long as the action of the polymer having the above-described constitutional component AB is not impaired. As another polymer, a polymer that is generally used as a binder for an all-solid state secondary battery can be used without particular limitation.

The inorganic solid electrolyte-containing composition may contain one kind or two or more kinds of polymer binders.

The content of the polymer binder in the inorganic solid electrolyte-containing composition is not particularly limited. However, in terms of the improvement of the dispersion stability and the binding property and the suppression of the decrease in ion conductivity, it is preferably 0.1% to 5.0% by mass, more preferably 0.2% to 4.0% by mass, and still more preferably 0.3% to 1.0% by mass. For the same reason, the content of the polymer binder in 100% by mass of the solid content of the inorganic solid electrolyte-containing composition is preferably 0.1% to 6.0% by mass, more preferably 0.3% to 5.0% by mass, and still more preferably 0.4% to 1.5% by mass.

In the present invention, the mass ratio [(the mass of the inorganic solid electrolyte+the mass of the active material)/(the total mass of the polymer binder)] of the total mass (the total amount) of the inorganic solid electrolyte and the active material to the mass of the polymer binder in the solid content of 100% by mass is preferably in a range of 1,000 to 1. Furthermore, this ratio is more preferably 500 to 2 and still more preferably 100 to 10.

<Dispersion Medium>

It suffices that the dispersion medium contained in the inorganic solid electrolyte-containing composition is an organic compound that is in a liquid state in the use environment, examples thereof include various organic solvents, and specific examples thereof include an alcohol compound, an ether compound, an amide compound, an amine compound, a ketone compound, an aromatic compound, an aliphatic compound, a nitrile compound, and an ester compound.

The dispersion medium may be a non-polar dispersion medium (a hydrophobic dispersion medium) or a polar dispersion medium (a hydrophilic dispersion medium); however, a non-polar dispersion medium is preferable from the viewpoint that excellent dispersibility can be exhibited. The non-polar dispersion medium generally refers to a dispersion medium having a property of a low affinity to water; however, in the present invention, examples thereof include an ester compound, a ketone compound, an ether compound, an aromatic compound, and an aliphatic compound.

Examples of the alcohol compound include methyl alcohol, ethyl alcohol, 1-propyl alcohol, 2-propyl alcohol, 2-butanol, ethylene glycol, propylene glycol, glycerin, 1,6-hexanediol, cyclohexanediol, sorbitol, xylitol, 2-methyl-2,4-pentanediol, 1,3-butanediol, and 1,4-butanediol.

Examples of the ether compound include an alkylene glycol (diethylene glycol, triethylene glycol, polyethylene glycol, dipropylene glycol, or the like), an alkylene glycol monoalkyl ether (ethylene glycol monomethyl ether, ethylene glycol monobutyl ether, diethylene glycol monomethyl ether, propylene glycol monomethyl ether, dipropylene glycol monomethyl ether, tripropylene glycol monomethyl ether, diethylene glycol monobutyl ether, or the like), alkylene glycol dialkyl ether (ethylene glycol dimethyl ether or the like), a dialkyl ether (dimethyl ether, diethyl ether, diisopropyl ether, dibutyl ether, or the like), and a cyclic ether (tetrahydrofuran, dioxane (including 1,2-, 1,3- or 1,4-isomer), or the like).

Examples of the amide compound include N,N-dimethylformamide, N-methyl-2-pyrrolidone, 2-pyrrolidinone, 1,3-dimethyl-2-imidazolidinone, s-caprolactam, formamide, N-methylformamide, acetamide, N-methylacetamide, N,N-dimethylacetainide, N-methylpropanamide, and hexamethylphosphoric triamide.

Examples of the amine compound include triethylamine, diisopropylethylamine, and tributylamine.

Examples of the ketone compound include acetone, methyl ethyl ketone, methyl isobutyl ketone (MIBK), cyclopentanone, cyclohexanone, cycloheptanone, dipropyl ketone, dibutyl ketone, diisopropyl ketone, diisobutyl ketone (DIBK), isobutyl propyl ketone, sec-butyl propyl ketone, pentyl propyl ketone, and butyl propyl ketone.

Examples of the aromatic compound include benzene, toluene, xylene, and perfluorotoluene.

Examples of the aliphatic compound include hexane, heptane, octane, nonane, decane, dodecane, cyclohexane, methylcyclohexane, ethylcyclohexane, cycloheptane, cyclooctane, decalin, paraffin, gasoline, naphtha, kerosene, and light oil.

Examples of the nitrile compound include acetonitrile, propionitrile, and isobutyronitrile.

Examples of the ester compound include ethyl acetate, propyl acetate, propyl butyrate, butyl acetate, ethyl butyrate, isopropyl butyrate, butyl butyrate, isobutyl butyrate, butyl pentanoate, pentyl pentanoate, ethyl isobutyrate, propyl isobutyrate, isopropyl isobutyrate, isobutyl isobutyrate, propyl pivalate, isopropyl pivalate, butyl pivalate, and isobutyl pivalate.

In the present invention, among them, an ether compound, a ketone compound, an aromatic compound, an aliphatic compound, or an ester compound is preferable, and an ester compound, a ketone compound, an aromatic compound, or an ether compound is more preferable.

The number of carbon atoms of the compound that constitutes the dispersion medium is not particularly limited, and it is preferably 2 to 30, more preferably 4 to 20, still more preferably 6 to 15, and particularly preferably 7 to 12.

In terms of the dispersion stability of the solid particles, the dispersion medium preferably has an SP value (unit: $MPa^{1/2}$) of 14 to 24, more preferably 15 to 22, and still more preferably 16 to 20. The difference (in terms of absolute value) in SP value between the dispersion medium and the polymer having the constitutional component AB is not particularly limited; however, it is preferably 3 or less, more preferably 0 to 2, and still more preferably 0 to 1, in that the molecular chain of the polymer having the constitutional component AB is spread in the dispersion medium to improve the dispersibility thereof, whereby the dispersion stability of the solid particles can be further improved.

The SP value of the dispersion medium is defined as a value obtained by converting the SP value calculated according to the Hoy method described above into the unit of $MPa^{1/2}$. In a case where the inorganic solid electrolyte-containing composition contains two or more kinds of dispersion media, the SP value of the dispersion medium means the SP value of the entire dispersion media, and it is the sum of the products of the SP values and the mass fractions of the respective dispersion media. Specifically, the calculation is carried out in the same manner as the above-described method of calculating the SP value of the polymer, except that the SP value of each of the dispersion media is used instead of the SP value of the constitutional component.

The SP values (the units are omitted) of the main dispersion media are shown below.

MIBK (18.4), diisopropyl ether (16.8), dibutyl ether (17.9), diisopropyl ketone (17.9), DIBK (17.9), butyl butyrate (18.6), butyl acetate (18.9), toluene (18.5), ethylcyclohexane (17.1), cyclooctane (18.8), isobutyl ethyl ether (15.3), N-methylpyrrolidone (NMP, SP value: 25.4), perfluorotoluene (SP value: 13.4)

The dispersion medium preferably has a boiling point of 50° C. or higher and more preferably 70° C. or higher at normal pressure (1 atm). The upper limit thereof is preferably 250° C. or lower and more preferably 220° C. or lower.

The inorganic solid electrolyte-containing composition may contain one kind or two or more kinds of dispersion media. Examples of the example thereof in which two or more kinds of dispersion media are contained include mixed xylene (a mixture of o-xylene, p-xylene, m-xylene, and ethylbenzene).

In the present invention, the content of the dispersion medium in the inorganic solid electrolyte-containing composition is not particularly limited and can be appropriately set. For example, in the inorganic solid electrolyte-containing composition, it is preferably 20% to 80% by mass, more preferably 30% to 70% by mass, and particularly preferably 40% to 60% by mass.

<Active Material>

The inorganic solid electrolyte-containing composition according to the embodiment of the present invention can also contain an active material capable of intercalating and deintercalating an ion of a metal belonging to Group 1 or Group 2 of the periodic table. Examples of such active materials include a positive electrode active material and a negative electrode active material, which will be described later.

In the present invention, the inorganic solid electrolyte-containing composition containing an active material (a positive electrode active material or a negative electrode active material) may be referred to as an electrode composition (a positive electrode composition or a negative electrode composition).

(Positive Electrode Active Material)

The positive electrode active material is an active material capable of intercalating and deintercalating an ion of a metal belonging to Group 1 or Group 2 of the periodic table, and it is preferably one capable of reversibly intercalating and deintercalating a lithium ion. The above-described material is not particularly limited as long as the material has the above-described characteristics and may be a transition metal oxide, an organic substance, or an element, which is capable of being complexed with Li, such as sulfur or the like by disassembling the battery.

Among the above, as the positive electrode active material, transition metal oxides are preferably used, and transition metal oxides having a transition metal element $M^a$ (one or more elements selected from Co, Ni, Fe, Mn, Cu, and V) are more preferable. In addition, an element $M^b$ (an element of Group 1 (Ia) of the metal periodic table other than lithium, an element of Group 2 (IIa), or an element such as Al, Ga, In, Ge, Sn, Pb, Sb, Bi, Si, P, or B) may be mixed into this transition metal oxide. The mixing amount thereof is preferably 0% to 30% by mole of the amount (100% by mole) of the transition metal element $M^a$. It is more preferable that the transition metal oxide is synthesized by mixing the above components such that a molar ratio $Li/M^a$ is 0.3 to 2.2.

Specific examples of the transition metal oxides include transition metal oxides having a bedded salt-type structure (MA), transition metal oxides having a spinel-type structure (MB), lithium-containing transition metal phosphoric acid compounds (MC), lithium-containing transition metal halogenated phosphoric acid compounds (MD), and lithium-containing transition metal silicate compounds (ME).

Specific examples of the transition metal oxides having a bedded salt-type structure (MA) include $LiCoO_2$ (lithium cobalt oxide [LCO]), $LiNi_2O_2$(lithium nickelate), $LiNi_{0.85}Co_{0.10}Al_{0.05}O_2$ (lithium nickel cobalt aluminum oxide [NCA]), $LiNi_{1/3}Co_{1/3}Mn_{1/3}O_2$ (lithium nickel manganese cobalt oxide [NMC]), and $LiNi_{0.5}Mn_{0.5}O_2$ (lithium manganese nickelate).

Specific examples of the transition metal oxides having a spinel-type structure (MB) include $LiMn_2O_4$(LMO), $LiCoMnO_4$, $Li_2FeMn_3O_8$, $Li_2CuMn_3O_8$, $Li_2CrMn_3O_8$, and $Li_2NiMn_3O_8$.

Examples of the lithium-containing transition metal phosphoric acid compound (MC) include olivine-type iron phosphate salts such as $LiFePO_4$ and $Li_3Fe_2(PO_4)_3$, iron pyrophosphates such as $LiFeP_2O_7$, and cobalt phosphates such as $LiCoPO_4$, and a monoclinic NASICON type vanadium phosphate salt such as $Li_3V_2(PO_4)_3$ (lithium vanadium phosphate).

Examples of the lithium-containing transition metal halogenated phosphoric acid compound (MD) include iron fluorophosphates such as $Li_2FePO_4F$, manganese fluorophosphates such as $Li_2MnPO_4F$, cobalt fluorophosphates such as $Li_2CoPO_4F$.

Examples of the lithium-containing transition metal silicate compounds (ME) include $Li_2FeSiO_4$, $Li_2MnSiO_4$, and $Li_2CoSiO_4$.

In the present invention, the transition metal oxide having a bedded salt-type structure (MA) is preferable, and LCO or NMC is more preferable.

The shape of the positive electrode active material is not particularly limited but is preferably a particle shape. The particle diameter (the volume average particle diameter) of the positive electrode active material is not particularly limited. For example, it can be set to 0.1 to 50 μm. The particle diameter of the positive electrode active material particle can be measured using the same method as that of the particle diameter of the inorganic solid electrolyte. In order to allow the positive electrode active material to have a predetermined particle diameter, a general pulverizer or classifier is used. For example, a mortar, a ball mill, a sand mill, a vibration ball mill, a satellite ball mill, a planetary ball mill, a swirling air flow jet mill, or a sieve is preferably used. During pulverization, it is also possible to carry out wet-type pulverization in which water or a dispersion medium such as methanol is made to be present together. In order to provide the desired particle diameter, classification is preferably carried out. The classification is not particularly limited and can be carried out using a sieve, a wind power classifier, or the like. Both the dry-type classification and the wet-type classification can be carried out.

A positive electrode active material obtained using a baking method may be used after being washed with water, an acidic aqueous solution, an alkaline aqueous solution, or an organic solvent.

The positive electrode active material may be used singly, or two or more thereof may be used in combination.

The content of the positive electrode active material in the inorganic solid electrolyte-containing composition is not particularly limited; however, it is preferably 10% to 97% by mass, more preferably 30% to 95% by mass, still more preferably 40% to 93% by mass, and particularly preferably 50% to 90% by mass, in 100% by mass of the solid content.

(Negative Electrode Active Material)

The negative electrode active material is an active material capable of intercalating and deintercalating an ion of a metal belonging to Group 1 or Group 2 of the periodic table, and it is preferably one capable of reversibly intercalating and deintercalating a lithium ion. The material is not particularly limited as long as it has the above-described characteristics, and examples thereof include a carbonaceous material, a metal oxide, a metal composite oxide, a lithium single body, a lithium alloy, and a negative electrode active material that is capable of an alloy (capable of being alloyed) with lithium. Among the above, a carbonaceous material, a metal composite oxide, or a lithium single body is preferably used from the viewpoint of reliability. An active material that is capable of being alloyed with lithium is preferable since the capacity of the all-solid state secondary battery can be increased.

The carbonaceous material that is used as the negative electrode active material is a material substantially consisting of carbon. Examples thereof include petroleum pitch, carbon black such as acetylene black (AB), graphite (natural graphite, artificial graphite such as vapor-grown graphite), and carbonaceous material obtained by baking a variety of synthetic resins such as polyacrylonitrile (PAN)-based resins or furfuryl alcohol resins. Furthermore, examples thereof also include a variety of carbon fibers such as PAN-based carbon fibers, cellulose-based carbon fibers, pitch-based carbon fibers, vapor-grown carbon fibers, dehydrated polyvinyl alcohol (PVA)-based carbon fibers, lignin carbon fibers, vitreous carbon fibers, and activated carbon fibers, mesophase microspheres, graphite whisker, and tabular graphite.

These carbonaceous materials can be classified into non-graphitizable carbonaceous materials (also referred to as "hard carbon") and graphitizable carbonaceous materials based on the graphitization degree. In addition, it is preferable that the carbonaceous material has the lattice spacing, density, and crystallite size described in JP1987-22066A (JP-S62-22066A), JP1990-6856A (JP-112-6856A), and JP1991-45473A (JP-H3-45473A). The carbonaceous material is not necessarily a single material and, for example, may be a mixture of natural graphite and artificial graphite described in JP1993-90844A (JP-H5-90844A) or graphite having a coating layer described in JP1994-4516A (JP-H6-4516A).

As the carbonaceous material, hard carbon or graphite is preferably used, and graphite is more preferably used.

The oxide of a metal or a metalloid element that can be used as the negative electrode active material is not particularly limited as long as it is an oxide capable of intercalating and deintercalating lithium, and examples thereof include an oxide of a metal element (metal oxide), a composite oxide of a metal element or a composite oxide of a metal element and a metalloid element (collectively referred to as "metal composite oxide), and an oxide of a metalloid element (a metalloid oxide). The oxides are more preferably amorphous oxides, and preferred examples thereof include chalcogenides which are reaction products between metal elements and elements in Group 16 of the periodic table). In the present invention, the metalloid element refers to an element having intermediate properties between those of a metal element and a non-metal element. Typically, the metalloid elements include six elements including boron, silicon, germanium, arsenic, antimony, and tellurium, and further include three elements including selenium, polonium, and astatine. In addition, "amorphous" represents an oxide having a broad scattering band with an apex in a range of 20° to 40° in terms of 2θvalue in case of being measured by an X-ray diffraction method using CuKα rays, and the oxide may have a crystalline diffraction line. The highest intensity in a crystalline diffraction line observed in a range of 400 to 700 in terms of 2θvalue is preferably 100 times or less and more preferably 5 times or less with respect to the intensity of a diffraction line at the apex in a broad scattering band observed in a range of 20° to 40° in terms of 2θvalue, and it is still more preferable that the oxide does not have a crystalline diffraction line.

In the compound group consisting of the amorphous oxides and the chalcogenides, amorphous oxides of metalloid elements and chalcogenides are more preferable, and (composite) oxides consisting of one element or a combination of two or more elements selected from elements (for example, Al, Ga, Si, Sn, Ge, Pb, Sb, and Bi) belonging to Groups 13 (IIIB) to 15 (VB) in the periodic table or chalcogenides are more preferable. Specific examples of the preferred amorphous oxide and chalcogenide preferably include $Ga_2O_3$, GeO, PbO, $PbO_2$, $Pb_2O_3$, $Pb_2O_4$, $Pb_3O_4$, $Sb_2O_3$, $Sb_2O_4$, $Sb_2O_8Bi_2O_3$, $Sb_2O_8Si_2O_3$, $Sb_2O_5$, $Bi_2O_3$, $Bi_2O_4$, GeS, PbS, $PbS_2$, $Sb_2S_3$, and $Sb_2S_5$.

Preferred examples of the negative electrode active material which can be used in combination with a amorphous oxide containing Sn, Si, or Ge as a major component include a carbonaceous material capable of intercalating and/or deintercalating lithium ions or lithium metal, a lithium single body, a lithium alloy, and a negative electrode active material that is capable of being alloyed with lithium.

It is preferable that an oxide of a metal or a metalloid element, in particular, a metal (composite) oxide and the chalcogenide contain at least one of titanium or lithium as the constitutional component from the viewpoint of high current density charging and discharging characteristics. Examples of the metal composite oxide (lithium composite metal oxide) including lithium include a composite oxide of lithium oxide and the above metal (composite) oxide or the above chalcogenide, and specifically, $Li_2SnO_2$.

As the negative electrode active material, for example, a metal oxide (titanium oxide) having a titanium element is also preferable. Specifically, $Li_4Ti_5O_{12}$ (lithium titanium oxide [LTO]) is preferable since the volume variation during the intercalation and deintercalation of lithium ions is small, and thus the high-speed charging and discharging characteristics are excellent, and the deterioration of electrodes is suppressed, whereby it becomes possible to improve the life of the lithium ion secondary battery.

The lithium alloy as the negative electrode active material is not particularly limited as long as it is any alloy that is generally used as a negative electrode active material for a secondary battery, and examples thereof include a lithium aluminum alloy, and specifically, a lithium aluminum alloy, using lithium as a base metal, to which 10% by mass of aluminum is added.

The negative electrode active material capable of forming an alloy with lithium is not particularly limited as long as it is typically used as a negative electrode active material for a secondary battery. Such an active material has a large expansion and contraction due to charging and discharging of the all-solid state secondary battery and accelerates the deterioration of the cycle characteristics. However, since the inorganic solid electrolyte-containing composition according to the embodiment of the present invention contains the polymer binder described above, and thus it is possible to suppress the deterioration of the cycle characteristics. Examples of such an active material include a (negative electrode) active material (an alloy or the like) having a silicon element or a tin element and a metal such as Al or In, a negative electrode active material (a silicon element-containing active material) having a silicon element capable of exhibiting high battery capacity is preferable, and a silicon element-containing active material in which the content of the silicon element is 50% by mole or more with respect to all the constitutional elements is more preferable.

In general, a negative electrode including the negative electrode active material (for example, a Si negative electrode including a silicon-containing active material or an Sn negative electrode containing an active material containing a tin element) can intercalate a larger amount of Li ions than a carbon negative electrode (for example, graphite or acetylene black). That is, the amount of Li ions intercalated per unit mass increases. As a result, the battery capacity (the energy density) can be increased. As a result, there is an advantage in that the battery driving duration can be extended.

Examples of the silicon-containing active material include a silicon-containing alloy (for example, $LaSi_2$, $VSi_2$, La—Si, Gd—Si, or Ni—Si) including a silicon material such as Si or SiOx ($0<x\leq1$) and titanium, vanadium, chromium, manganese, nickel, copper, lanthanum, or the like or a structured active material thereof (for example, $LaSi_2$/Si), and an active material such as $SnSiO_3$ or $SnSiS_3$ including silicon element and tin element. In addition, since SiOx itself can be used as a negative electrode active material (a metalloid oxide) and Si is produced along with the operation of an all-solid state secondary battery, SiOx can be used as a negative electrode active material (or a precursor material thereof) capable of being alloyed with lithium.

Examples of the negative electrode active material including the tin element include Sn, SnO, $SnO_2$, SnS, $SnS_2$, and the above-described active material including silicon element and tin element. In addition, a composite oxide with lithium oxide, for example, $Li_2SnO_2$ can also be used.

In the present invention, the above-described negative electrode active material can be used without any particular limitation. From the viewpoint of battery capacity, a preferred aspect as the negative electrode active material is a negative electrode active material that is capable of being alloyed with lithium. Among them, the silicon material or the silicon-containing alloy (the alloy containing a silicon element) described above is more preferable, and it is more preferable to include a negative electrode active material containing silicon (Si) or a silicon-containing alloy.

The chemical formulae of the compounds obtained by the above baking method can be calculated using an inductively coupled plasma (ICP) emission spectroscopy as a measuring method from the mass difference of powder before and after baking as a convenient method.

The shape of the negative electrode active material is not particularly limited but is preferably a particle shape. The particle diameter (the volume average particle diameter) of the negative electrode active material is not particularly limited; however, it is preferably 0.1 to 60 μm. The particle diameter (the volume average particle diameter) of the negative electrode active material particles can be measured using the same method as that of the particle diameter of the inorganic solid electrolyte. In order to obtain the predetermined particle diameter, a typical pulverizer or classifier is used as in the case of the positive electrode active material.

The negative electrode active material may be used singly, or two or more negative electrode active materials may be used in combination.

The content of the negative electrode active material in the inorganic solid electrolyte-containing composition is not particularly limited, and it is preferably 10% to 90% by mass, more preferably 20% to 85% by mass, still more preferably 30% to 80% by mass, and even still more preferably 40% to 75% by mass, in 100% by mass of the solid content.

In the present invention, in a case where a negative electrode active material layer is formed by charging a secondary battery, ions of a metal belonging to Group 1 or Group 2 in the periodic table produced in the all-solid state secondary battery can be used instead of the negative electrode active material. By binding the ions to electrons and precipitating a metal, a negative electrode active material layer can be formed.

(Coating of Active Material)

The surfaces of the positive electrode active material and the negative electrode active material may be subjected to surface coating with another metal oxide. Examples of the surface coating agent include metal oxides and the like containing Ti, Nb, Ta, W, Zr, Al, Si, or Li. Specific examples thereof include titanium oxide spinel, tantalum-based oxides, niobium-based oxides, and lithium niobate-based compounds, and specific examples thereof include $Li_4Ti_5O_{12}$, $Li_2Ti_2O_5$, $LiTaO_3$, $LiNbO_3$, $LiAlO_2$, $Li_2ZrO_3$, $Li_2WO_4$, $Li_2TiO_3$, $Li_2B_4O_7$, $Li_3PO_4$, $Li_2MoO_4$, $Li_3BO_3$, $LiBO_2$, $Li_2CO_3$, $Li_2SiO_3$, $SiO_2$, $TiO_2$, $ZrO_2$, $Al_2O_3$, and $B_2O_3$.

In addition, the surface of the electrode containing the positive electrode active material or negative electrode active material may be subjected to a surface treatment with sulfur or phosphorus.

Furthermore, the particle surfaces of the positive electrode active material or the negative electrode active material may be treated with an actinic ray or an active gas (plasma or the like) before and after the coating of the surfaces.

<Conductive Auxiliary Agent>

The inorganic solid electrolyte-containing composition according to the embodiment of the present invention preferably contains a conductive auxiliary agent, and for example, it is preferable that the silicon atom-containing active material as the negative electrode active material is used in combination with a conductive auxiliary agent.

The conductive auxiliary agent is not particularly limited, and conductive auxiliary agents that are known as ordinary conductive auxiliary agents can be used. It may be, for example, graphite such as natural graphite and artificial graphite, carbon black such as acetylene black, Ketjen black, and furnace black, amorphous carbon such as needle cokes, carbon fibers such as a vapor-grown carbon fiber and a carbon nanotube, or a carbonaceous material such as graphene or fullerene, which are electron-conductive materials, and it may be also a metal powder or metal fiber of copper, nickel, or the like. A conductive polymer such as polyaniline, polypyrrole, polythiophene, polyacetylene, or a polyphenylene derivative may also be used.

In the present invention, in a case where the active material is used in combination with the conductive auxiliary agent, among the above-described conductive auxiliary agents, a conductive auxiliary agent that does not intercalate and deintercalate ions (preferably Li ions) of a metal belonging to Group 1 or Group 2 in the periodic table and does not function as an active material at the time of charging and discharging of the battery is classified as the conductive auxiliary agent. Therefore, among the conductive auxiliary agents, a conductive auxiliary agent that can function as the active material in the active material layer at the time of charging and discharging of the battery is classified as an active material but not as a conductive auxiliary agent. Whether or not the conductive auxiliary agent functions as the active material during charging and discharging of the battery is not uniquely determined but is determined based on a combination of the conductive auxiliary agent with the active material.

One kind of conductive auxiliary agent may be contained, or two or more kinds thereof may be contained.

The shape of the conductive auxiliary agent is not particularly limited but is preferably a particle shape.

In a case where the inorganic solid electrolyte-containing composition according to the embodiment of the present invention contains a conductive auxiliary agent, the content of the conductive auxiliary agent in the inorganic solid electrolyte-containing composition is preferably 0% to 10% by mass in the solid content of 100% by mass.

<Lithium Salt>

The inorganic solid electrolyte-containing composition according to the embodiment of the present invention preferably contains a lithium salt (a supporting electrolyte) as well.

Generally, the lithium salt is preferably a lithium salt that is used for this kind of product and is not particularly limited. For example, lithium salts described in paragraphs 0082 to 0085 of JP2015-088486A are preferable.

In a case where the inorganic solid electrolyte-containing composition according to the embodiment of the present invention contains a lithium salt, the content of the lithium salt is preferably 0.1 part by mass or more and more preferably 5 parts by mass or more with respect to 100 parts by mass of the solid electrolyte. The upper limit thereof is preferably 50 parts by mass or less and more preferably 20 parts by mass or less.

<Dispersing Agent>

Since the above-described polymer binder functions as a dispersing agent as well, the inorganic solid electrolyte-containing composition according to the embodiment of the present invention may not contain a dispersing agent other than this polymer binder; however, it may contain a dispersing agent. As the dispersing agent, a dispersing agent that is generally used for an all-solid state secondary battery can be appropriately selected and used. Generally, a compound intended for particle adsorption and steric repulsion and/or electrostatic repulsion is suitably used.

<Other Additives>

As components other than the respective components described above, the inorganic solid electrolyte-containing composition according to the embodiment of the present invention may appropriately contain an ionic liquid, a thickener, a crosslinking agent (an agent causing a crosslinking reaction by radical polymerization, condensation polymerization, or ring-opening polymerization), a polymerization initiator (an agent that generates an acid or a radical by heat or light), an antifoaming agent, a leveling agent, a dehydrating agent, or an antioxidant. The ionic liquid is contained in order to further improve the ion conductivity, and the known one in the related art can be used without particular limitation. In addition, a polymer other than the binding forming polymer described above, a typically used binder, or the like may be contained.

(Preparation of Inorganic Solid Electrolyte-Containing Composition)

The inorganic solid electrolyte-containing composition according to the embodiment of the present invention can be prepared by mixing an inorganic solid electrolyte, the above-described polymer binder, a dispersion medium, preferably, a conductive auxiliary agent, and further appropriately a lithium salt, and any other optional components, as a mixture and preferably as a slurry by using, for example, various mixers that are used generally. In a case of an electrode composition, an active material is further mixed.

The mixing method is not particularly limited, and it can be carried out using a known mixer such as a ball mill, a beads mill, a planetary mixer, a blade mixer, a roll mill, a kneader, a disc mill, a self-rotation type mixer, or a narrow gap type disperser. Each component may be mixed collectively or may be mixed sequentially. A mixing environment is not particularly limited; however, examples thereof include a dry air environment and an inert gas environment.

In addition, the mixing conditions are not particularly limited and are appropriately set.

[Sheet for all-Solid State Secondary Battery]

A sheet for an all-solid state secondary battery according to the embodiment of the present invention is a sheet-shaped molded body with which a constitutional layer of an all-solid state secondary battery can be formed, and it includes various aspects depending on use applications thereof. Examples of thereof include a sheet that is preferably used in a solid electrolyte layer (also referred to as a solid electrolyte sheet for an all-solid state secondary battery) and a sheet that is preferably used in an electrode or a laminate of an electrode and a solid electrolyte layer (an electrode sheet for an all-solid state secondary battery). In the present invention, the variety of sheets described above will be collectively referred to as a sheet for an all-solid state secondary battery.

In the present invention, each layer that constitutes a sheet for an all-solid state secondary battery may have a monolayer structure or a multilayer structure.

In the sheet for an all-solid state secondary battery, the solid electrolyte layer or the active material layer on the base material is formed of the inorganic solid electrolyte-containing composition according to the embodiment of the present invention. The sheet for an all-solid state secondary battery has a constitutional layer in which solid particles are firmly bound to each other, and furthermore, the constitutional layer (the solid particles) is (are) firmly bound to a base material. In particular, the sheet for an all-solid state secondary battery in which the constitutional layer and the base material are firmly bonded to each other is particularly effective as an electrode sheet for an all-solid state secondary battery in which a collector is used as the base material. As a result, in a case where this sheet for an all-solid state secondary battery is used as a solid electrolyte layer of an all-solid state secondary battery by appropriately peeling the base material therefrom or used as an electrode (a laminate of a collector and an active material layer) as it is, the cycle characteristics and the conductivity (the lower resistance) of the all-solid state secondary battery can be improved. In particular, in a case where an electrode sheet for an all-solid state secondary battery is incorporated into an all-solid state secondary battery as an electrode, the cycle characteristics can be further improved since an active material layer and a collector firmly adhere to each other.

It suffices that the solid electrolyte sheet for an all-solid state secondary battery according to the embodiment of the present invention is a sheet having a solid electrolyte layer, and it may be a sheet in which a solid electrolyte layer is formed on a base material or may be a sheet (a sheet from which the base material has been peeled off) that is formed of a solid electrolyte layer without including a base material. The solid electrolyte sheet for an all-solid state secondary battery may include another layer in addition to the solid electrolyte layer. Examples of the other layer include a protective layer (a stripping sheet), a collector, and a coating layer. Examples of the solid electrolyte sheet for an all-solid state secondary battery according to the embodiment of the present invention include a sheet including a layer formed of the inorganic solid electrolyte-containing composition according to the embodiment of the present invention, a typical solid electrolyte layer, and a protective layer on a base material in this order. The solid electrolyte layer included in the solid electrolyte sheet for an all-solid state secondary battery is preferably formed of the inorganic solid electrolyte-containing composition according to the embodiment of the present invention. The content of each component in the solid electrolyte layer is not particularly limited; however, it preferably has the same as the content of each component in the solid content of the inorganic solid electrolyte-containing composition according to the embodiment of the present invention. The layer thickness of each layer that constitutes the solid electrolyte sheet for an all-solid state secondary battery is the same as the layer thickness of each layer described later in the all-solid state secondary battery.

The base material is not particularly limited as long as it can support the solid electrolyte layer, and examples thereof include a sheet body (plate-shaped body) formed of materials described later regarding the collector, an organic material, an inorganic material, or the like. Examples of the organic material include various polymers, and specific examples thereof include polyethylene terephthalate, polypropylene, polyethylene, and cellulose. Examples of the inorganic material include glass and ceramic.

It suffices that an electrode sheet for an all-solid state secondary battery according to the embodiment of the present invention (simply also referred to as an "electrode sheet") is an electrode sheet including an active material layer, and it may be a sheet in which an active material layer is formed on a base material (collector) or may be a sheet (a sheet from which the base material has been peeled off) that is formed of an active material layer without including a base material. The electrode sheet is typically a sheet including the collector and the active material layer, and examples of an aspect thereof include an aspect including the collector, the active material layer, and the solid electrolyte layer in this order and an aspect including the collector, the active material layer, the solid electrolyte layer, and the active material layer in this order. The solid electrolyte layer and the active material layer included in the electrode sheet are preferably formed of the inorganic solid electrolyte-containing composition according to the embodiment of the present invention. The content of each component in this solid electrolyte layer or active material layer is not particularly limited; however, it preferably has the same meaning as the content of each component in the solid content of the inorganic solid electrolyte-containing composition (the electrode composition) according to the embodiment of the present invention. The thickness of each of the layers forming the electrode sheet according to the embodiment of the present invention is the same as the layer thickness of each of the layers described later regarding the all-solid state secondary battery. The electrode sheet according to the embodiment of the present invention may include the above-described other layer.

In the sheet for an all-solid state secondary battery according to the embodiment of the present invention, at least one layer of the solid electrolyte layer or the active material layer is formed of the inorganic solid electrolyte-containing composition according to the embodiment of the present invention. As a result, in a case where the sheet for an all-solid state secondary battery according to the embodiment of the present invention is used as a constitutional layer of the all-solid state secondary battery, it is possible to realize excellent cycle characteristics and low resistance (high conductivity) of the all-solid state secondary battery. In particular, in the electrode sheet for an all-solid state secondary battery and the all-solid state secondary battery, in which the active material layer is formed of the inorganic solid electrolyte-containing composition according to the embodiment of the present invention, the active material layer and the collector exhibit strong adhesiveness, and thus it is possible to realize further improvement of the cycle characteristics.

Even in a case of being manufactured by industrial manufacturing, for example, a roll-to-roll method having high productivity, the sheet for an all-solid state secondary battery according to the present invention includes a constitutional layer in which the occurrence of defects is suppressed, and furthermore a constitutional layer which has firmly adhered to a base material (in which the peeling from a base material is suppressed). Therefore, in a case of being used as a constitutional layer of an all-solid state secondary battery, the sheet for an all-solid state secondary battery according to the present invention contributes to the manufacturing of an all-solid state secondary battery having low resistance and excellent cycle characteristics, particularly to the application of industrial manufacturing. As a result, the sheet for an all-solid state secondary battery according to the embodiment of the present invention is suitably used as a sheet with which a constitutional layer of an all-solid state secondary battery can be formed. In a case where an all-solid state secondary battery is manufactured using the sheet for an all-solid state secondary battery according to the present invention, it is possible to realize low resistance and excellent cycle characteristics even with high productivity.

It is noted that in a case where the sheet for an all-solid state secondary battery has a layer other than the active material layer or the solid electrolyte layer, which is formed of the inorganic solid electrolyte-containing composition according to the embodiment of the present invention, a layer produced using a known material can be used as this layer.

[Manufacturing Method for Sheet for all-Solid State Secondary Battery]

The manufacturing method for a sheet for an all-solid state secondary battery according to the embodiment of the present invention is not particularly limited, and the sheet can be manufactured by forming each of the above layers using the inorganic solid electrolyte-containing composition according to the embodiment of the present invention. Examples thereof include a method in which the film formation (the coating and drying) is carried out preferably on a base material or a collector (another layer may be interposed) to form a layer (a coated and dried layer) consisting of an inorganic solid electrolyte-containing composition. As a result, the sheet for an all-solid state secondary battery including the base material or the collector, and the coated and dried layer can be produced. In particular, in a case where a film of the inorganic solid electrolyte-containing composition according to the embodiment of the present invention is formed on a collector to produce a sheet for an all-solid state secondary battery, it is possible to strengthen the adhesion between the collector and the active material layer. Here, the coated and dried layer refers to a layer formed by carrying out coating with the inorganic solid electrolyte-containing composition according to the embodiment of the present invention and drying the dispersion medium (that is, a layer formed using the inorganic solid electrolyte-containing composition according to the embodiment of the present invention and consisting of a composition obtained by removing the dispersion medium from the inorganic solid electrolyte-containing composition according to the embodiment of the present invention). In the active material layer and the coated and dried layer, the dispersion medium may remain within a range where the effect of the present invention is not impaired, and the residual amount thereof, for example, in each of the layers may be 3% by mass or lower.

In the manufacturing method for a sheet for an all-solid state secondary battery according to the embodiment of the present invention, each of the steps such as coating and drying will be described in the following manufacturing method for an all-solid state secondary battery.

In the manufacturing method for a sheet for an all-solid state secondary battery according to the embodiment of the present invention, the coated and dried layer obtained as described above can be pressurized. The pressurizing condition and the like will be described later in the section of the manufacturing method for an all-solid state secondary battery.

In addition, in the manufacturing method for a sheet for an all-solid state secondary battery according to the embodiment of the present invention, the base material, the protective layer (particularly stripping sheet), or the like can also be stripped.

[All-Solid State Secondary Battery]

The all-solid state secondary battery according to the embodiment of the present invention includes a positive electrode active material layer, a negative electrode active material layer facing the positive electrode active material layer, and a solid electrolyte layer disposed between the positive electrode active material layer and the negative electrode active material layer. The all-solid state secondary battery according to the embodiment of the present invention is not particularly limited in the configuration as long as it has a solid electrolyte layer between the positive electrode active material layer and the negative electrode active material layer, and for example, a known configuration for an all-solid state secondary battery can be employed. The positive electrode active material layer is preferably formed on a positive electrode collector to configure a positive electrode. The negative electrode active material layer is preferably formed on a negative electrode collector to configure a negative electrode.

At least one layer of the negative electrode active material layer, the positive electrode active material layer, or the solid electrolyte layer is formed of the inorganic solid electrolyte-containing composition according to the embodiment of the present invention, and at least one of the solid electrolyte layer, the negative electrode active material layer, or the positive electrode active material layer is preferably formed of the inorganic solid electrolyte-containing composition according to the embodiment of the present invention. The all-solid state secondary battery according to the embodiment of the present invention, in which at least one of the constitutional layers is formed of the inorganic solid electrolyte-containing composition according to the embodiment of the present invention exhibits excellent cycle characteristics and low resistance (high conductivity) even in a case of being manufactured by a roll-to-roll method which is advantageous industrially.

In the present invention, an aspect in which all of the layers are formed of the inorganic solid electrolyte-containing composition according to the aspect of the present invention is also one of the preferred aspects. In the present invention, forming the constitutional layer of the all-solid state secondary battery by using the inorganic solid electrolyte-containing composition according to the embodiment of the present invention includes an aspect in which the constitutional layer is formed by using the sheet for an all-solid state secondary battery according to the embodiment of the present invention (however, in a case where a layer other than the layer formed of the inorganic solid electrolyte-containing composition according to the embodiment of the present invention is provided, a sheet from which this layer is removed).

In a case where the active material layer or the solid electrolyte layer is not formed of the inorganic solid electrolyte-containing composition according to the embodiment of the present invention, a known material in the related art can be used.

In the present invention, each constitutional layer (including a collector and the like) that constitutes an all-solid state secondary battery may have a monolayer structure or a multilayer structure.

<Positive Electrode Active Material Layer, Solid Electrolyte Layer, and Negative Electrode Active Material Layer>

In the active material layer or the solid electrolyte layer formed of the inorganic solid electrolyte-containing composition according to the embodiment of the present invention, the kinds of components to be contained and the contents thereof are preferably the same as the solid content of the inorganic solid electrolyte-containing composition according to the embodiment of the present invention.

The thickness of each of the negative electrode active material layer, the solid electrolyte layer, and the positive electrode active material layer is not particularly limited. In case of taking a dimension of a general all-solid state secondary battery into account, the thickness of each of the layers is preferably 10 to 1,000 μm and more preferably 20 μm or more and less than 500 m. In the all-solid state secondary battery according to the embodiment of the present invention, the thickness of at least one layer of the positive electrode active material layer or the negative electrode active material layer is still more preferably 50 pin or more and less than 500 μm.

Each of the positive electrode active material layer and the negative electrode active material layer may include a collector on the side opposite to the solid electrolyte layer.

<Collector>

The positive electrode collector and the negative electrode collector are preferably an electron conductor.

In the present invention, either or both of the positive electrode collector and the negative electrode collector will also be simply referred to as the collector.

As a material that forms the positive electrode collector, not only aluminum, an aluminum alloy, stainless steel, nickel, or titanium but also a material (a material on which a thin film has been formed) obtained by treating the surface of aluminum or stainless steel with carbon, nickel, titanium, or silver is preferable. Among these, aluminum or an aluminum alloy is more preferable.

As a material that forms the negative electrode collector, aluminum, copper, a copper alloy, stainless steel, nickel, titanium, or the like, and further, a material obtained by treating the surface of aluminum, copper, a copper alloy, or stainless steel with carbon, nickel, titanium, or silver is preferable, and aluminum, copper, a copper alloy, or stainless steel is more preferable.

Regarding the shape of the collector, a film sheet shape is typically used; however, it is also possible to use shapes such as a net shape, a punched shape, a lath body, a porous body, a foaming body, and a molded body of a fiber group.

The thickness of the collector is not particularly limited; however, it is preferably 1 to 500 μm. In addition, protrusions and recesses are preferably provided on the surface of the collector by carrying out a surface treatment.

<Other Configurations>

In the present invention, a functional layer, a functional member, or the like may be appropriately interposed or disposed between or on the outside of the respective layers of the negative electrode collector, the negative electrode active material layer, the solid electrolyte layer, the positive electrode active material layer, and the positive electrode collector.

<Housing>

Depending on the use application, the all-solid state secondary battery according to the embodiment of the present invention may be used as the all-solid state secondary battery having the above-described structure as it is but is preferably sealed in an appropriate housing to be used in the form of a dry cell. The housing may be a metallic housing or a resin (plastic) housing. In a case where a metallic housing is used, examples thereof include an aluminum alloy housing and a stainless steel housing. It is preferable that the metallic housing is classified into a positive electrode-side housing and a negative electrode-side housing and that the positive electrode-side housing and the negative electrode-side housing are electrically connected to the positive electrode collector and the negative electrode collector, respectively. The positive electrode-side housing and the negative electrode-side housing are preferably integrated by being joined together through a gasket for short circuit prevention.

Hereinafter, the all-solid state secondary battery according to the preferred embodiment of the present invention will be described with reference to FIG. 1; however, the present invention is not limited thereto.

FIG. 1 is a cross-sectional view schematically illustrating an all-solid state secondary battery (a lithium ion secondary battery) according to a preferred embodiment of the present invention. In a case of being seen from the negative electrode side, an all-solid state secondary battery 10 of the present embodiment includes a negative electrode collector 1, a negative electrode active material layer 2, a solid electrolyte layer 3, a positive electrode active material layer 4, and a positive electrode collector 5 in this order. The respective layers are in contact with each other, and thus structures thereof are adjacent. In a case in which the above-described structure is employed, during charging, electrons ($e^-$) are supplied to the negative electrode side, and lithium ions ($Li^+$) are accumulated on the negative electrode side. On the other hand, during discharging, the lithium ions ($Li^+$) accumulated in the negative electrode return to the positive electrode side, and electrons are supplied to an operation portion 6. In an example illustrated in the drawing, an electric bulb is employed as a model at the operation portion 6 and is lit by discharging.

Figure 2:
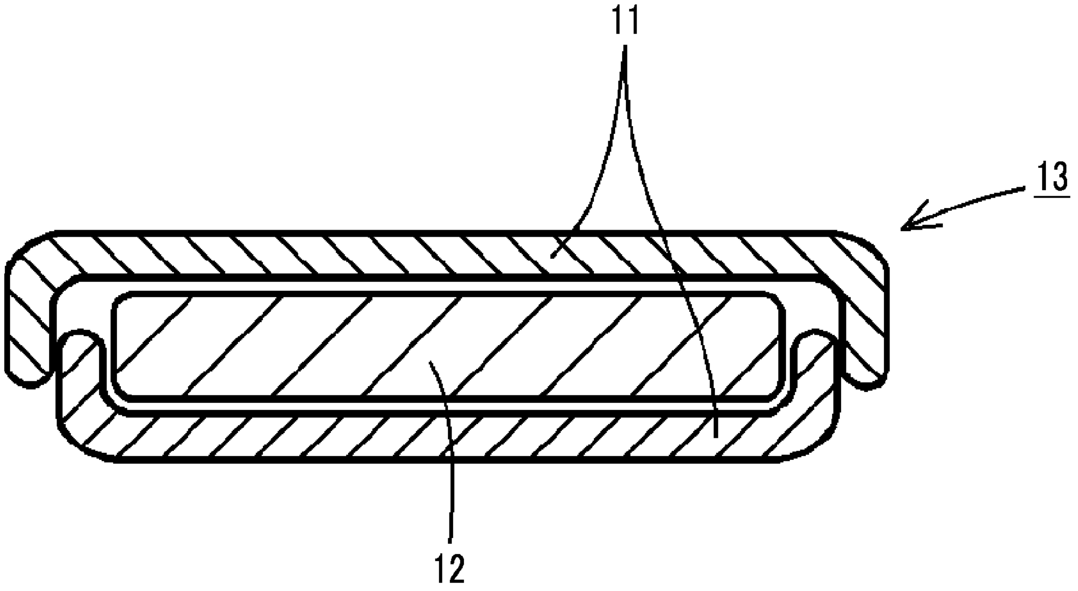
FIG. 2 is a vertical cross-sectional view schematically illustrating a coin-type all-solid state secondary battery prepared in Examples.

In a case where the all-solid state secondary battery having a layer configuration illustrated in FIG. 1 is placed in a 2032-type coin case, the all-solid state secondary battery will be referred to as a laminate 12 for an all-solid state secondary battery, and a battery produced by placing this laminate 12 for an all-solid state secondary battery into a 2032-type coin case 11 (for example, a coin-type all-solid state secondary battery illustrated in FIG. 2) will be referred to as an all-solid state secondary battery 13, whereby both batteries may be distinctively referred to in some cases.

(Positive Electrode Active Material Layer, Solid Electrolyte Layer, and Negative Electrode Active Material Layer)

In the all-solid state secondary battery 10, all of the positive electrode active material layer, the solid electrolyte layer, and the negative electrode active material layer are formed of the inorganic solid electrolyte-containing composition of the embodiment of the present invention. This all-solid state secondary battery 10 exhibits excellent battery performance. The kinds of the inorganic solid electrolyte and the polymer binder which are contained in the positive electrode active material layer 4, the solid electrolyte layer 3, and the negative electrode active material layer 2 may be identical to or different from each other.

In the present invention, any one of the positive electrode active material layer and the negative electrode active material layer, or collectively both of them may be simply referred to as an active material layer or an electrode active material layer. In addition, in the present invention, any one of the positive electrode active material and the negative electrode active material, or collectively both of them may be simply referred to as an active material or an electrode active material.

The solid electrolyte layer contains an inorganic solid electrolyte having an ion conductivity of a metal belonging to Group 1 or Group 2 in the periodic table, any component described above, and the like within a range where the effect of the present invention is not impaired, and it generally does not contain a positive electrode active material and/or a negative electrode active material.

The positive electrode active material layer contains an inorganic solid electrolyte having an ion conductivity of a metal belonging to Group 1 or Group 2 in the periodic table, a positive electrode active material, any component described above, and the like within a range where the effect of the present invention is not impaired.

The negative electrode active material layer contains an inorganic solid electrolyte having an ion conductivity of a metal belonging to Group 1 or Group 2 in the periodic table, a negative electrode active material, any component described above, and the like within a range where the effect of the present invention is not impaired.

In the all-solid state secondary battery 10, the negative electrode active material layer can be a lithium metal layer. Examples of the lithium metal layer include a layer formed by depositing or molding a lithium metal powder, a lithium foil, and a lithium vapor deposition film. The thickness of the lithium metal layer can be, for example, 1 to 500 μm regardless of the above thickness of the above negative electrode active material layer.

In the present invention, in a case where a constitutional layer is formed of the inorganic solid electrolyte-containing composition according to the embodiment of the present invention, it is possible to realize an all-solid state secondary battery having excellent cycle characteristics and having low resistance even in a case of being manufactured by a roll-to-roll method which is advantageous industrially.

(Collector)

The positive electrode collector 5 and the negative electrode collector 1 are as described above.

[Manufacture of all-Solid State Secondary Battery]

The all-solid state secondary battery can be manufactured by a conventional method. Specifically, the all-solid state secondary battery can be manufactured by forming each of the layers described above using the inorganic solid electrolyte-containing composition of the embodiment of the present invention or the like. Hereinafter, the manufacturing method therefor will be described in detail.

The all-solid state secondary battery according to the embodiment of the present invention can be manufactured by carrying out a method (a manufacturing method for a sheet for an all-solid state secondary battery according to the embodiment of the present invention) which includes (is carried out through) a step of coating an appropriate base material (for example, a metal foil which serves as a collector) with the inorganic solid electrolyte-containing composition according to the embodiment of the present invention and forming a coating film (forming a film).

For example, an inorganic solid electrolyte-containing composition containing a positive electrode active material is applied as a material for a positive electrode (a positive electrode composition) onto a metal foil which is a positive electrode collector, to form a positive electrode active material layer, thereby producing a positive electrode sheet for an all-solid state secondary battery. Next, the inorganic solid electrolyte-containing composition for forming a solid electrolyte layer is applied onto the positive electrode active material layer to form the solid electrolyte layer. Furthermore, an inorganic solid electrolyte-containing composition containing a negative electrode active material is applied as a material for a negative electrode (a negative electrode composition) onto the solid electrolyte layer, to form a negative electrode active material layer. A negative electrode collector (a metal foil) is overlaid on the negative electrode active material layer, whereby it is possible to obtain an all-solid state secondary battery having a structure in which the solid electrolyte layer is sandwiched between the positive electrode active material layer and the negative electrode active material layer. A desired all-solid state secondary battery can also be manufactured by enclosing the all-solid state secondary battery in a housing.

In addition, it is also possible to manufacture an all-solid state secondary battery by carrying out the forming method for each layer in reverse order to form a negative electrode active material layer, a solid electrolyte layer, and a positive electrode active material layer on a negative electrode collector as a base material and superposing a positive electrode collector thereon.

Examples of the other method include the following method. That is, the positive electrode sheet for an all-solid state secondary battery is produced as described above. In addition, an inorganic solid electrolyte-containing composition containing a negative electrode active material is applied as a material for a negative electrode (a negative electrode composition) onto a metal foil which is a negative electrode collector, to form a negative electrode active material layer, thereby producing a negative electrode sheet for an all-solid state secondary battery. Next, a solid electrolyte layer is formed on the active material layer in any one of these sheets as described above. Furthermore, the other one of the positive electrode sheet for an all-solid state secondary battery and the negative electrode sheet for an all-solid state secondary battery is laminated on the solid electrolyte layer such that the solid electrolyte layer and the active material layer come into contact with each other. In this manner, an all-solid state secondary battery can be manufactured.

As still another method, for example, the following method can be used. That is, a positive electrode sheet for an all-solid state secondary battery and a negative electrode sheet for an all-solid state secondary battery are produced as described above. In addition, separately from the positive electrode sheet for an all-solid state secondary battery and the negative electrode sheet for an all-solid state secondary battery, an inorganic solid electrolyte-containing composition is applied onto a base material, thereby producing a solid electrolyte sheet for an all-solid state secondary battery consisting of a solid electrolyte layer. Furthermore, the positive electrode sheet for an all-solid state secondary battery and the negative electrode sheet for an all-solid state secondary battery are laminated with each other to sandwich the solid electrolyte layer that has been peeled off from the base material. In this manner, an all-solid state secondary battery can be manufactured.

Further, a positive electrode sheet for an all-solid state secondary battery, a negative electrode sheet for an all-solid state secondary battery, and a solid electrolyte sheet for an all-solid state secondary battery are produced as described above. Next, the positive electrode sheet for an all-solid state secondary battery or negative electrode sheet for an all-solid state secondary battery, and the solid electrolyte sheet for an all-solid state secondary battery are overlaid and pressurized into a state where the positive electrode active material layer or the negative electrode active material layer is brought into contact with the solid electrolyte layer. In this manner, the solid electrolyte layer is transferred to the positive electrode sheet for an all-solid state secondary battery or the negative electrode sheet for an all-solid state secondary battery. Then, the solid electrolyte layer from which the base material of the solid electrolyte sheet for an all-solid state secondary battery has been peeled off and the negative electrode sheet for an all-solid state secondary battery or positive electrode sheet for an all-solid state secondary battery are overlaid and pressurized (into a state where the negative electrode active material layer or positive electrode active material layer is brought into contact with the solid electrolyte layer). In this manner, an all-solid state secondary battery can be manufactured. The pressurizing method and the pressurizing conditions in this method are not particularly limited, and a method and pressurizing conditions described in the pressurization step, which will be described later, can be applied.

The solid electrolyte layer or the like can also be formed on the base material or the active material layer, for example, by pressure-molding the inorganic solid electrolyte-containing composition or the like under a pressurizing condition described later, or the solid electrolyte or a sheet molded body of the active material.

In the above production method, it suffices that the inorganic solid electrolyte-containing composition according to the embodiment of the present invention is used in any one of the positive electrode composition, the inorganic solid electrolyte-containing composition, or the negative electrode composition. The inorganic solid electrolyte-containing composition according to the embodiment of the present invention is preferably used in the inorganic solid electrolyte-containing composition or at least one of the positive electrode composition or the negative electrode composition, or the inorganic solid electrolyte-containing composition according to the embodiment of the present invention can be used in any of the compositions.

In a case where the solid electrolyte layer or the active material layer is formed of a composition other than the inorganic solid electrolyte-containing composition according to the embodiment of the present invention, examples of the material thereof include a typically used composition. In addition, the negative electrode active material layer can also be formed by binding ions of a metal belonging to Group 1 or Group 2 in the periodic table, which are accumulated on a negative electrode collector during initialization described later or during charging for use, without forming the negative electrode active material layer during the manufacturing of the all-solid state secondary battery to electrons and precipitating the ions on a negative electrode collector the like as a metal.

<Formation of Individual Layer (Film Formation)>

The method of applying the inorganic solid electrolyte-containing composition is not particularly limited and can be appropriately selected. Examples thereof include coating (preferably wet-type coating), spray coating, spin coating, dip coating, slit coating, stripe coating, and bar coating.

In this case, the inorganic solid electrolyte-containing composition may be dried after being applied each time or may be dried after being applied multiple times. The drying temperature is not particularly limited. The lower limit is preferably 30° C. or higher, more preferably 60° C. or higher, and still more preferably 80° C. or higher. The upper limit thereof is preferably 300° C. or lower, more preferably 250° C. or lower, and still more preferably 200° C. or lower. In a case where the solid electrolyte composition is heated in the above-described temperature range, the dispersion medium can be removed to make the composition enter a solid state (coated and dried layer). This temperature range is preferable since the temperature is not excessively increased and each member of the all-solid state secondary battery is not impaired. As a result, excellent overall performance is exhibited in the all-solid state secondary battery, and it is possible to obtain a good binding property and a good ion conductivity.

After applying the inorganic solid electrolyte-containing composition, it is preferable to pressurize each layer or the all-solid state secondary battery after superimposing the constitutional layers or producing the all-solid state secondary battery. Examples of the pressurizing methods include a method using a hydraulic cylinder press machine. The pressurizing force is not particularly limited; however, it is generally preferably in a range of 5 to 1,500 MPa.

In addition, the applied inorganic solid electrolyte-containing composition may be heated at the same time with the pressurization. The heating temperature is not particularly limited but is generally in a range of 30° C. to 300° C. The press can also be applied at a temperature higher than the glass transition temperature of the inorganic solid electrolyte. It is also possible to carry out the press at a temperature higher than the glass transition temperature of the polymer contained in the polymer binder. However, in general, the temperature does not exceed the melting point of this polymer.

The pressurization may be carried out in a state where the coating solvent or dispersion medium has been dried in advance or in a state where the solvent or the dispersion medium remains.

The respective compositions may be applied at the same time, and the application, the drying, and the pressing may be carried out simultaneously and/or sequentially. Each of the compositions may be applied onto each of the separate base materials and then laminated by carrying out the transfer.

The atmosphere in the film forming method (coating, drying, and pressurization (under heating) is not particularly limited and may be any one of the atmospheres such as an atmosphere of dried air (the dew point: −20° C. or lower) and an atmosphere of inert gas (for example, an argon gas, a helium gas, or a nitrogen gas).

The pressurization time may be a short time (for example, within several hours) under the application of a high pressure or a long time (one day or longer) under the application of an intermediate pressure. In case of members other than the sheet for an all-solid state secondary battery, for example, the all-solid state secondary battery, it is also possible to use a restraining device (screw fastening pressure or the like) of the all-solid state secondary battery in order to continuously apply an intermediate pressure.

The pressing pressure may be a pressure that is constant or varies with respect to a portion under pressure such as a sheet surface.

The pressing pressure may be variable depending on the area or the film thickness of the portion under pressure. In addition, the pressure may also be variable stepwise for the same portion.

A pressing surface may be flat or roughened.

In the present invention, the formation (the formation of a film) of each layer described above, particularly the application and drying of the inorganic solid electrolyte-containing composition according to the present invention can be carried out using a sheet-like base material in a so-called batch system; however, a roll-to-roll method, which has high productivity among the industrial manufacturing methods, can also be used.

In addition, even in a case where the constitutional layer that is used for manufacturing an all-solid state secondary battery is prepared, for example, by cutting out or punching a sheet for an all-solid state secondary battery, the occurrence of defects and the peeling from the base material are suppressed.

<Initialization>

The all-solid state secondary battery manufactured as described above is preferably initialized after the manufacturing or before use. The initialization is not particularly limited, and it is possible to initialize the all-solid state secondary battery by, for example, carrying out initial charging and discharging in a state where the pressing pressure is increased and then releasing the pressure up to a pressure at which the all-solid state secondary battery is ordinarily used.

[Use Application of all-Solid State Secondary Battery]

The all-solid state secondary battery according to the embodiment of the present invention can be applied to a variety of usages. The application aspect thereof is not particularly limited, and in a case of being mounted in an electronic apparatus, examples thereof include a notebook computer, a pen-based input personal computer, a mobile personal computer, an e-book player, a mobile phone, a cordless phone handset, a pager, a handy terminal, a portable fax, a mobile copier, a portable printer, a headphone stereo, a video movie, a liquid crystal television, a handy cleaner, a portable CD, a mini disc, an electric shaver, a transceiver, an electronic notebook, a calculator, a memory card, a portable tape recorder, a radio, and a backup power supply. Additionally, examples of consumer usages include automobiles (electric vehicles and the like), electric vehicles, motors, lighting equipment, toys, game devices, road conditioners, watches, strobes, cameras, medical devices (pacemakers, hearing aids, and shoulder massage devices, and the like). Furthermore, the all-solid state secondary battery can be used for a variety of military usages and universe usages. In addition, the all-solid state secondary battery can also be combined with a solar battery.

EXAMPLES

Hereinafter, the present invention will be described in more detail based on Examples; however, the present invention is not limited thereto be interpreted. "Parts" and "%" that represent compositions in the following Examples are based on the mass unless particularly otherwise described. In the present invention, "room temperature" means 25° C.

1. Polymer Synthesis and Preparation of Binder Solution or Dispersion Liquid

Each polymer having a chemical formula described below and the constitutional component AB shown in Table 1 was synthesized as follows.

Synthesis Example S-1: Synthesis of Polymer S-1 and Preparation of Binder Solution S-1

To a 100 mL graduated cylinder, 23.4 g of phenyl methacrylate (manufactured by Tokyo Chemical Industry Co., Ltd.), 12.6 g of hexyl acrylate (manufactured by Tokyo Chemical Industry Co., Ltd.), and 0.36 g of a polymerization initiator V-601 (product name, manufactured by FUJIFILM Wako Pure Chemical Corporation) were added and dissolved in 36.0 g of butyl butyrate to prepare a monomer solution.

To a 300 mL three-necked flask, 18.0 g of butyl butyrate was added and stirred at 80° C., and then the above monomer solution was added dropwise thereto over 2 hours. After completion of the dropwise addition, the temperature was raised to 90° C., and stirring was carried out for 2 hours to synthesize a polymer S-1 (a (meth)acrylic polymer as a random copolymer), whereby a binder solution S-1 (concentration of polymer: 40% by mass) consisting of the polymer S-1 was obtained.

Synthesis Examples S-2, S-4 to S-7, and S-9: Synthesis of Polymers S-2, S-4 to S-7, and S-9, and Preparation of Binder Solutions S-2, S-4 to S-7, and S-9

Polymers S-2, S-4 to S-7, and S-9 ((meth)acrylic polymers) were synthesized in the same manner as in Synthesis Example S-1 to respectively obtain binder solutions S-2, S-4 to S-7, and S-9, consisting of the respective polymers, except that in Synthesis Example S-1, a compound from which each constitutional component is derived was adjusted so that each of the polymers S-2, S-4 to S-7, and S-9 had the composition (the kind and the content of the constitutional component) shown in Table 1 and the following chemical formula.

Synthesis Example S-3: Synthesis of Polymer S-3 and Preparation of Binder Solution S-3

To a 100 mL graduated cylinder, 24.8 g of 4-methoxystyrene (manufactured by Tokyo Chemical Industry Co., Ltd.), 11.2 g of hexyl acrylate (manufactured by Tokyo Chemical Industry Co., Ltd.), and 0.36 g of a polymerization initiator V-601 (product name, manufactured by FUJIFILM Wako Pure Chemical Corporation) were added and dissolved in 36.0 g of butyl butyrate to prepare a monomer solution.

To a 300 mL three-necked flask, 18.0 g of butyl butyrate was added and stirred at 80° C., and then the above monomer solution was added dropwise thereto over 2 hours. After the completion of the dropwise addition, the solution was heated to 90° C. and stirred for 2 hours. The obtained polymerization solution was poured into 480 g of methanol, stirred for 10 minutes, and allowed to stand for 10 minutes. The precipitate obtained after removing the supernatant was dissolved in 100 g of butyl butyrate and heated at 30 hPa and 60° C. for 1 hour to distill off methanol, thereby synthesizing a polymer S-3 (a vinyl polymer as a random copolymer) and then obtaining a binder solution S-3 (concentration: 12% by mass) consisting of the polymer S-3.

Synthesis Example S-8: Synthesis of Polymer S-8 and Preparation of Binder Solution S-8)

A polymer S-8 (a vinyl polymer) was synthesized in the same manner as in Synthesis Example S-3 to obtain a binder solution S-8 consisting of this polymer, except that in Synthesis Example S-3, a compound from which each constitutional component is derived was adjusted so that the polymer S-8 had the composition (the kind and the content of the constitutional component) shown in Table 1 and the following chemical formula.

Synthesis Example T-1: Synthesis of Polymer T-1 and Preparation of Binder Solution T-1)

A polymer T-1 (a vinyl polymer) was synthesized in the same manner as in Synthesis Example S-3 to obtain a binder solution T-1 consisting of this polymer, except that in Synthesis Example S-3, a compound from which each constitutional component is derived was adjusted so that the polymers T-1 had the composition (the kind and the content of the constitutional component) shown in Table 1 and the following chemical formula.

Synthesis Examples T-2 and T-5: Synthesis of Polymers T-2 and T-5 and Preparation of Binder Solution T-2 and T-5)

Polymers T-2 and T-5 ((meth)acrylic polymers) were synthesized in the same manner as in Synthesis Example S-1 to obtain binder solutions T-2 and T-5 consisting of these polymers, respectively, except that in Synthesis Example S-1, a compound from which each constitutional component is derived was adjusted so that each of the polymers T-2 and T-5 had the composition (the kind and the content of the constitutional component) shown in Table 1 and the following chemical formula.

Synthesis Example T-3: Synthesis of Polymer T-3 and Preparation of Binder Dispersion Solution T-3)

A polymer T-3 (a (meth)acrylic polymer) was synthesized in the same manner as in Synthesis Example S-1, except that in Synthesis Example S-1, a compound from which each constitutional component is derived was adjusted so that the polymer T-3 had the composition (the kind and the content of the constitutional component) shown in Table 1 and the following chemical formula. This polymer T-3 was not dissolved in butyl butyrate, and thus a binder consisting of the polymer T-3 was obtained as a dispersion liquid T-3 (concentration: 40% by mass). The average particle diameter of the binder in this dispersion liquid was 180 nm.

Synthesis Example T-4: Synthesis of Polymer T-4 and Preparation of Binder Solution T-4)

A polymer T-4 (a (meth)acrylic polymer) was synthesized in the same manner as in Synthesis Example S-3 to obtain a binder solution T-4 consisting of this polymer, except that in Synthesis Example S-3, a compound from which each constitutional component is derived was adjusted so that the polymers T-4 had the composition (the kind and the content of the constitutional component) shown in Table 1 and the following chemical formula.

Table 1 shows the composition, the glass transition temperature $Tg^B$ (° C.), the SP value ($MPa^{1/2}$), and the mass average molecular weight of each synthesized polymer. Table 1 shows the glass transition temperature (° C.) and the SP value ($MPa^{1/2}$) of each component. Further, a difference (absolute value) in the glass transition temperature between a constitutional component C1 (the constitutional component AB) and constitutional component C2 or C3 (the other constitutional component) was calculated and shown in the column of "Tg difference" of Table 1. The glass transition temperature $Tg^B$, the SP value, and the mass average molecular weight of the polymer, as well as the glass transition temperature and the SP value of the constitutional component were respectively measured according to the above-described methods.

It is noted that in Table 1, the glass transition temperature is denoted as "Tg", and the units of the glass transition temperature, the SP value, and the difference (absolute value) between SP values are omitted. In the polymer T-3, the difference (absolute value) in the glass transition temperature is also described together using "/". In addition, regarding the constitutional component C2 in the polymer T-5, the kinds, SP values, and contents of the ethyl acrylate and the hexyl acrylate are also described together using "/".

Each of the polymers synthesized is shown below. The content (% by mass) of each constitutional component is shown in Table 1. In the polymer S-3, Me represents a methyl group.

S-1

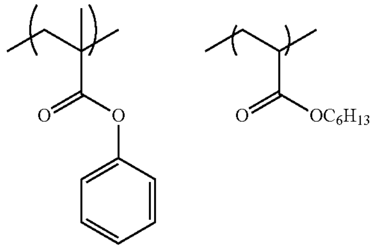

S-2

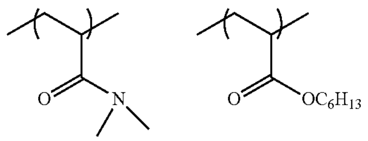

S-3

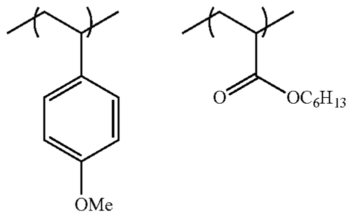

S-4

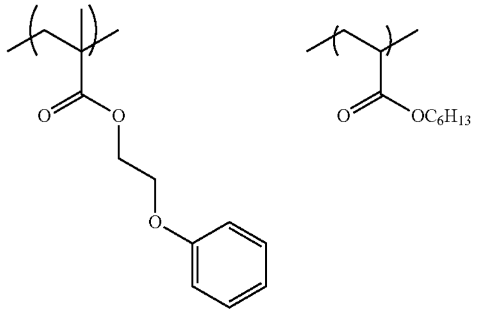

-continued

S-5

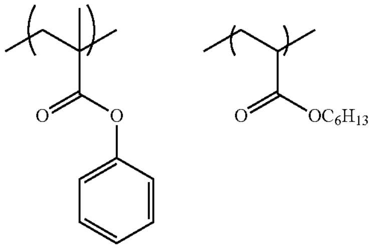

S-6

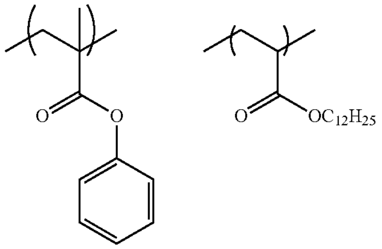

S-7

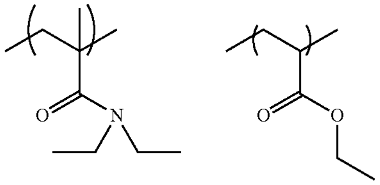

S-8

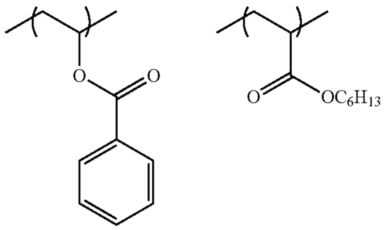

S-9

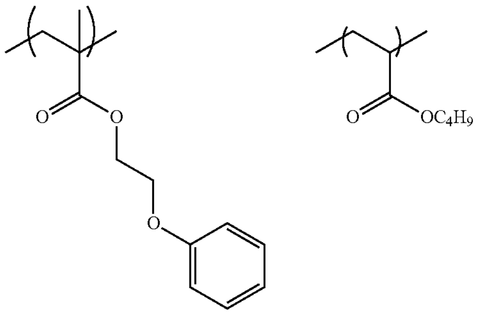

-continued

T-1

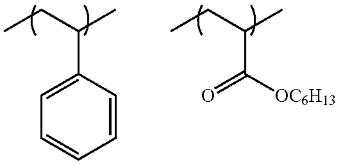

T-2

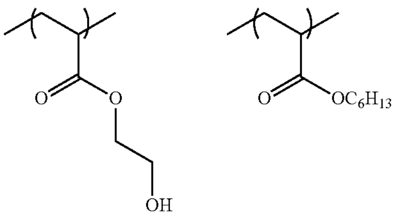

T-3

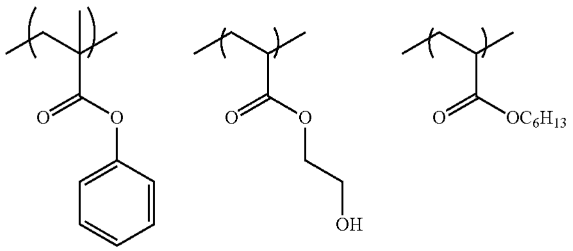

T-4

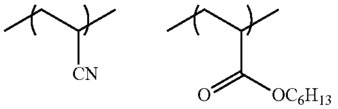

T-5

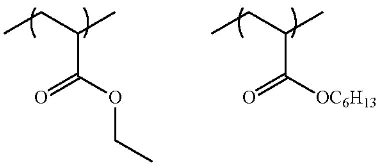

TABLE 1

| | Constitutional composition C1 | | | | Constitutional composition C2 | | | | Constitutional composition C3 | | | | | Polymer | | |
|---|---|---|---|---|---|---|---|---|---|---|---|---|---|---|---|---|
| No. | | $Tg^{HP}$ | SP value | Content (% by mass) | | Tg | SP value | Content (% by mass) | | Tg | SP value | Content (% by mass) | Tg difference | $Tg^{B}$ | SP value | Average molecular weight |
| S-1 | PhMA | 110 | 20.3 | 65 | HA | −55 | 19.2 | 35 | — | — | — | — | 165 | 30 | 19.9 | 70000 |
| S-2 | DMAA | 119 | 24.2 | 55 | HA | −55 | 19.2 | 45 | — | — | — | — | 174 | 14 | 22.1 | 42000 |
| S-3 | MSt | 104 | 20.3 | 69 | HA | −55 | 19.2 | 31 | — | — | — | — | 159 | 22 | 20.0 | 66000 |
| S-4 | PEMA | 54 | 20.5 | 91 | HA | −55 | 19.2 | 9 | — | — | — | — | 109 | 40 | 20.4 | 65000 |
| S-5 | PhMA | 110 | 20.3 | 93 | HA | −55 | 19.2 | 7 | — | — | — | — | 165 | 93 | 20.2 | 89000 |
| S-6 | PhMA | 110 | 20.3 | 62 | LA | −50 | 18.8 | 38 | — | — | — | — | 160 | 32 | 19.7 | 91000 |
| S-7 | DEAA | 105 | 23.0 | 20 | EA | −20 | 20.1 | 80 | — | — | — | — | 125 | −3 | 20.7 | 86000 |
| S-8 | VB | 74 | 21.0 | 65 | HA | −55 | 19.2 | 35 | — | — | — | — | 129 | 14 | 20.4 | 41000 |

TABLE 1-continued

| | Constitutional composition C1 | | | | Constitutional composition C2 | | | | Constitutional composition C3 | | | | | Polymer | | |
|---|---|---|---|---|---|---|---|---|---|---|---|---|---|---|---|---|
| No. | | $Tg^{HP}$ | SP value | Content (% by mass) | | Tg | SP value | Content (% by mass) | | Tg | SP value | Content (% by mass) | Tg difference | $Tg^{B}$ | SP value | Average molecular weight |
| S-9 | PEMA | 54 | 20.5 | 91 | BA | −55 | 19.5 | 9 | — | — | — | — | 109 | 40 | 20.4 | 62000 |
| T-1 | — | — | — | — | HA | −55 | 19.2 | 30 | St | 100 | 19.3 | 70 | — | 24 | 19.3 | 67000 |
| T-2 | — | — | — | — | HA | −55 | 19.2 | 85 | HEA | −25 | 25.9 | 15 | — | −45 | 20.3 | 32000 |
| T-3 | PhMA | 110 | 20.3 | 10 | HA | −55 | 19.2 | 50 | HEA | −25 | 25.9 | 40 | 165/135 | −29 | 22.2 | 180000 |
| T-4 | — | — | — | — | HA | −55 | 19.2 | 79 | AN | 104 | 25.2 | 21 | — | −32 | 20.6 | 55000 |
| T-5 | — | — | — | — | HA/EA | −55/−20 | 19.2/20.1 | 2/98 | — | — | — | — | — | −22 | 20.0 | 45000 |

Abbreviations in Table

In the table, "-" in the column of the constitutional component indicates that the constitutional component does not have a corresponding constitutional component.

—Constitutional Component C1—

The constitutional component C1 represents the above-described component AB.

PhMA: Phenyl methacrylate
DMAA: Dimethyl acrylamide
MSt: 4-methoxystyrene
PEMA: Phenoxyethyl methacrylate
DEAA: Diethyl acrylamide
VB: Vinyl benzoate —Constitutional Components C2 and C3—

Constitutional components C2 and C3 represent constitutional components other than the constitutional components AB.

HA: Hexyl acrylate
LA: Dodecyl acrylate
EA: Ethyl acrylate
BA: Butyl acrylate
St: Styrene
HEA: 2-hydroxyethyl acrylate
AN: Acrylonitrile 2. Synthesis of Sulfide-Based Inorganic Solid Electrolyte Synthesis Example A A sulfide-based inorganic solid electrolyte was synthesized with reference to a non-patent document of T. Ohtomo, A. Hayashi, M. Tatsumisago, Y. Tsuchida, S. Hama, K. Kawamoto, Journal of Power Sources, 233, (2013), pp. 231 to 235 and A. Hayashi, S. Hama, H. Morimoto, M. Tatsumisago, T. Minami, Chem. Lett., (2001), pp. 872 and 873.

Specifically, in a globe box in an argon atmosphere (dew point: −70° C.), lithium sulfide ($Li_2S$, manufactured by Sigma-Aldrich Co., LLC Co., LLC Co., LLC, purity: >99.98%) (2.42 g) and diphosphorus pentasulfide ($P_2S_5$, manufactured by Sigma-Aldrich Co., LLC Co., LLC Co., LLC, purity: >99%) (3.90 g) each were weighed, put into an agate mortar, and mixed using an agate pestle for five minutes. The mixing ratio between $Li_2S$ and $P_2S_5$($Li_2S$:$P_2S_5$) was set to 75:25 in terms of molar ratio.

Next, 66 g of zirconia beads having a diameter of 5 mm were put into a 45 mL container made of zirconia (manufactured by FRITSCH), the entire amount of the mixture of the above lithium sulfide and the diphosphorus pentasulfide was put thereinto, and the container was completely sealed in an argon atmosphere. The container was set in a planetary ball mill P-7 (product name, manufactured by FRITSCH), mechanical milling was carried out at a temperature of 25° C. and a rotation speed of 510 rpm for 20 hours, thereby obtaining yellow powder (6.20 g) of a sulfide-based inorganic solid electrolyte (Li—P—S-based glass, hereinafter, may be denoted as LPS). The particle diameter of the Li—P—S-based glass was 15 μm.

Example 1

Each of the compositions shown in Tables 2-1 and 2-2 (collectively referred to as Table 2) was prepared as follows.

<Preparation of Inorganic Solid Electrolyte-Containing Composition>

60 g of zirconia beads having a diameter of 5 mm was put into a 45 mL container made of zirconia (manufactured by FRITSCH), and 7.9 g of the LPS synthesized in the above Synthesis Example A, 0.06 g (solid content mass) of the binder solution or the dispersion liquid shown in Table 2-1, and 12 g of butyl butyrate as the dispersion medium were put thereinto. Then, this container was set in a planetary ball mill P-7 (product name) manufactured by FRITSCH. Mixing was carried out at a temperature of 25° C. and a rotation speed of 150 rpm for 10 minutes to prepare each of inorganic solid electrolyte-containing compositions (slurries) K-1 to K-9 and Kc11 to Kc15.

<Preparation of Positive Electrode Composition>

60 g of zirconia beads having a diameter of 5 mm were put into a 45 mL container made of zirconia (manufactured by FRITSCH), and then 4.1 g of LPS synthesized in Synthesis Example A, and 5.2 g (total amount) of butyl butyrate as a dispersion medium were put into the above container. The container was set in a planetary ball mill P-7 (product name, manufactured by FRITSCH), and stirring was carried out for 30 minutes at 25° C. and a rotation speed of 200 rpm. Then, into this container, 10.4 g of NMC (manufactured by Sigma-Aldrich Co., LLC) as the positive electrode active material, 0.3 g of acetylene black (AB) as the conductive auxiliary agent, and 0.07 g (solid content mass) of the binder solution or the dispersion liquid shown in Table 2-2 were put. The container was set in a planetary ball mill P-7, and mixing was continued for 30 minutes at a temperature of 25° C. and a rotation speed of 200 rpm to prepare each of positive electrode compositions (slurries) PK-1 to PK-9.

<Preparation of Negative Electrode Composition>

60 g of zirconia beads having a diameter of 5 mm was put into a 45 mL container made of zirconia (manufactured by FRITSCH), and 4.6 g of LPS synthesized in the above Synthesis Example A, 0.05 g (solid content mass) of the binder solution or dispersion liquid shown in Table 2-2, and 10.0 g (total amount) of butyl butyrate were put thereinto. The container was set in a planetary ball mill P-7 (product name, manufactured by FRITSCH), and mixing was carried out for 60 minutes at a temperature of 25° C. and a rotation speed of 300 rpm. Then, 5.0 g of silicon (Si, manufactured by Sigma-Aldrich Co., LLC) as the negative electrode active material and 0.4 g of VGCF (manufactured by Showa Denko K.K.) as the conductive auxiliary agent were put into the container. Similarly, the container was subsequently set in a planetary ball mill P-7, and mixing was carried out at 25° C. for 10 minutes at a rotation speed of 100 rpm to prepare each of negative electrode compositions (slurries) NK-1 to NK-9 and NKc21 to NKc25.

Regarding the respective prepared compositions, the differences (absolute value) between the SP value of the polymers S-1 to S-9 and T-1 to T-5, which form a binder, and the SP values of the dispersion media were respectively calculated and are shown are shown in the column of "SP value difference" of Table. 2.

In Table 2, the composition content is the content (% by mass) with respect to the total mass of the composition, and the solid content is the content (% by mass) with respect to 100% by mass of the solid content of the composition. The unit is omitted in the table. In addition, Table 2 shows the SP values of the polymers S-1 to S-9 and T-1 to T-5, which form a binder, and the SP values of the dispersion media. The unit of the SP value is $MPa^{1/2}$; however, the description thereof is omitted in Table 2.

In the column of "State" of Table 2, the state (dissolved or dispersed in a particle shape) of the binder in each composition is indicated.

TABLE 2

| | No. | Inorganic solid electrolyte | | | Binder solution or dispersion liquid | | | |
|---|---|---|---|---|---|---|---|---|
| | | | Composition content | Solid content concentration | | SP value | Composition content | Solid content concentration |
| Inorganic solid electrolyte-containing composition | K-1 | LPS | 39.7 | 99.2 | S-1 | 19.9 | 0.3 | 0.8 |
| | K-2 | LPS | 39.7 | 99.2 | S-2 | 22.1 | 0.3 | 0.8 |
| | K-3 | LPS | 39.7 | 99.2 | S-3 | 20.0 | 0.3 | 0.8 |
| | K-4 | LPS | 39.7 | 99.2 | S-4 | 20.4 | 0.3 | 0.8 |
| | K-5 | LPS | 39.7 | 99.2 | S-5 | 20.2 | 0.3 | 0.8 |
| | K-6 | LPS | 39.7 | 99.2 | S-6 | 19.7 | 0.3 | 0.8 |
| | K-7 | LPS | 39.7 | 99.2 | S-7 | 20.7 | 0.3 | 0.8 |
| | K-8 | LPS | 39.7 | 99.2 | S-8 | 20.4 | 0.3 | 0.8 |
| | K-9 | LPS | 39.7 | 99.2 | S-9 | 20.4 | 0.3 | 0.8 |
| | Kc11 | LPS | 39.7 | 99.2 | T-1 | 19.3 | 0.3 | 0.8 |
| | Kc12 | LPS | 39.7 | 99.2 | T-2 | 20.3 | 0.3 | 0.8 |
| | Kc13 | LPS | 39.7 | 99.2 | T-3 | 22.2 | 0.3 | 0.8 |
| | Kc14 | LPS | 39.7 | 99.2 | T-4 | 20.6 | 0.3 | 0.8 |
| | Kc15 | LPS | 39.7 | 99.2 | T-5 | 20.0 | 0.3 | 0.8 |

| | No. | Dispersion medium | | | Difference in SP value | State | Note |
|---|---|---|---|---|---|---|---|
| | | | SP value | Composition content | | | |
| Inorganic solid electrolyte-containing composition | K-1 | Butyl butyrate | 18.6 | 6.0 | 1.3 | Dissolved | Present invention |
| | K-2 | Butyl butyrate | 18.6 | 60.0 | 3.5 | Dissolved | Present invention |
| | K-3 | Butyl butyrate | 18.6 | 60.0 | 1.4 | Dissolved | Present invention |
| | K-4 | Butyl butyrate | 18.6 | 60.0 | 1.8 | Dissolved | Present invention |
| | K-5 | Butyl butyrate | 18.6 | 60.0 | 1.6 | Dissolved | Present invention |
| | K-6 | Butyl butyrate | 18.6 | 60.0 | 1.1 | Dissolved | Present invention |
| | K-7 | Butyl butyrate | 18.6 | 60.0 | 2.1 | Dissolved | Present invention |
| | K-8 | Butyl butyrate | 18.6 | 60.0 | 1.8 | Dissolved | Present invention |
| | K-9 | Butyl butyrate | 18.6 | 60.0 | 1.8 | Dissolved | Present invention |
| | Kc11 | Butyl butyrate | 18.6 | 60.0 | 0.7 | Dissolved | Comparative Example |
| | Kc12 | Butyl butyrate | 18.6 | 60.0 | 1.7 | Dissolved | Comparative Example |
| | Kc13 | Butyl butyrate | 18.6 | 60.0 | 3.6 | Particulate | Comparative Example |
| | Kc14 | Butyl butyrate | 18.6 | 60.0 | 2.0 | Dissolved | Comparative Example |
| | Kc15 | Butyl butyrate | 18.6 | 60.0 | 1.4 | Dissolved | Comparative Example |

TABLE 2-continued

| | No. | Inorganic solid electrolyte | | | Binder solution or dispersion liquid | | | | Dispersion medium | | |
|---|---|---|---|---|---|---|---|---|---|---|---|
| | | | Composition content | Solid content concentration | | SP value | Composition content | Solid content concentration | | SP value | Composition content |
| Positive electrode composition | PK-1 | LPS | 20.3 | 27.5 | S-1 | 19.9 | 0.4 | 0.5 | Butyl butyrate | 18.6 | 26.0 |
| | PK-2 | LPS | 20.3 | 27.5 | S-2 | 22.1 | 0.4 | 0.5 | Butyl butyrate | 18.6 | 26.0 |
| | PK-3 | LPS | 20.3 | 27.5 | S-3 | 20.0 | 0.4 | 0.5 | Butyl butyrate | 18.6 | 26.0 |
| | PK-4 | LPS | 20.3 | 27.5 | S-4 | 20.4 | 0.4 | 0.5 | Butyl butyrate | 18.6 | 26.0 |
| | PK-5 | LPS | 20.3 | 27.5 | S-5 | 20.2 | 0.4 | 0.5 | Butyl butyrate | 18.6 | 26.0 |
| | PK-6 | LPS | 20.3 | 27.5 | S-6 | 19.7 | 0.4 | 0.5 | Butyl butyrate | 18.6 | 26.0 |
| | PK-7 | LPS | 20.3 | 27.5 | S-7 | 20.7 | 0.4 | 0.5 | Butyl butyrate | 18.6 | 26.0 |
| | PK-8 | LPS | 20.3 | 27.5 | S-8 | 20.4 | 0.4 | 0.5 | Butyl butyrate | 18.6 | 26.0 |
| | PK-9 | LPS | 20.3 | 27.5 | S-9 | 20.4 | 0.4 | 0.5 | Butyl butyrate | 18.6 | 26.0 |
| Negative electrode composition | NK-1 | LPS | 22.7 | 45.5 | S-1 | 19.9 | 0.3 | 0.5 | Butyl butyrate | 18.6 | 50.0 |
| | NK-2 | LPS | 22.7 | 45.5 | S-2 | 22.1 | 0.3 | 0.5 | Butyl butyrate | 18.6 | 50.0 |
| | NK-3 | LPS | 22.7 | 45.5 | S-3 | 20.0 | 0.3 | 0.5 | Butyl butyrate | 18.6 | 50.0 |
| | NK-4 | LPS | 22.7 | 45.5 | S-4 | 20.4 | 0.3 | 0.5 | Butyl butyrate | 18.6 | 50.0 |
| | NK-3 | LPS | 22.7 | 45.5 | S-5 | 20.2 | 0.3 | 0.5 | Butyl butyrate | 18.6 | 50.0 |
| | NK-6 | LPS | 22.7 | 45.5 | S-6 | 19.7 | 0.3 | 0.5 | Butyl butyrate | 18.6 | 50.0 |
| | NK-7 | LPS | 22.7 | 45.5 | S-7 | 20.7 | 0.3 | 0.5 | Butyl butyrate | 18.6 | 50.0 |
| | NK-8 | LPS | 22.7 | 45.5 | S-8 | 20.4 | 0.3 | 0.5 | Butyl butyrate | 18.6 | 50.0 |
| | NK-9 | LPS | 22.7 | 45.5 | S-9 | 20.4 | 0.3 | 0.5 | Butyl butyrate | 18.6 | 50.0 |
| | NKc21 | LPS | 22.7 | 455 | T-1 | 19.3 | 0.3 | 0.5 | Butyl butyrate | 18.6 | 50.0 |
| | NKc22 | LPS | 22.7 | 45.5 | T-2 | 20.3 | 0.3 | 0.5 | Butyl butyrate | 18.6 | 50.0 |
| | NKc23 | LPS | 22.7 | 45.5 | T-3 | 22.2 | 0.3 | 0.5 | Butyl butyrate | 18.6 | 50.0 |
| | Nkc24 | LPS | 22.7 | 45.5 | T-4 | 20.6 | 0.3 | 0.5 | Butyl butyrate | 18.6 | 50.0 |
| | NKc25 | LPS | 22.7 | 45.5 | T-5 | 20.0 | 0.3 | 0.5 | Butyl butyrate | 18.6 | 50.0 |

| | No. | Active material | | | Conductive auxiliary agent | | | SP value | State | Note |
|---|---|---|---|---|---|---|---|---|---|---|
| | | | Composition content | Solid content concentration | | Composition content | Solid content concentration | | | |
| Positive electrode composition | PK-1 | NMC | 51.8 | 70.0 | AB | 1.5 | 2.0 | 1.3 | Dissolved | Present invention |
| | PK-2 | NMC | 51.8 | 70.0 | AB | 1.5 | 2.0 | 3.5 | Dissolved | Present invention |
| | PK-3 | NMC | 51.8 | 70.0 | AB | 1.5 | 2.0 | 1.4 | Dissolved | Present invention |
| | PK-4 | NMC | 51.8 | 70.0 | AB | 1.5 | 2.0 | 1.8 | Dissolved | Present invention |
| | PK-5 | NMC | 51.8 | 70.0 | AB | 1.5 | 2.0 | 1.6 | Dissolved | Present invention |
| | PK-6 | NMC | 51.8 | 70.0 | AB | 1.5 | 2.0 | 1.1 | Dissolved | Present invention |
| | PK-7 | NMC | 51.8 | 70.0 | AB | 1.5 | 2.0 | 2.1 | Dissolved | Present invention |
| | PK-8 | NMC | 51.8 | 70.0 | AB | 1.5 | 2.0 | 1.8 | Dissolved | Present invention |
| | PK-9 | NMC | 51.8 | 70.0 | AB | 1.5 | 2.0 | 1.8 | Dissolved | Present invention |

TABLE 2-continued

| | | | | | | | | | | |
|---|---|---|---|---|---|---|---|---|---|---|
| Negative electrode composition | NK-1 | Si | 25.0 | 50.0 | VGCF | 2.0 | 4.0 | 1.3 | Dissolved | Present invention |
| | NK-2 | Si | 25.0 | 50.0 | VGCF | 2.0 | 4.0 | 3.5 | Dissolved | Present invention |
| | NK-3 | Si | 25.0 | 50.0 | VGCF | 2.0 | 4.0 | 1.4 | Dissolved | Present invention |
| | NK-4 | Si | 25.0 | 50.0 | VGCF | 2.0 | 4.0 | 1.8 | Dissolved | Present invention |
| | NK-3 | Si | 25.0 | 50.0 | VGCF | 2.0 | 4.0 | 1.6 | Dissolved | Present invention |
| | NK-6 | Si | 25.0 | 50.0 | VGCF | 2.0 | 4.0 | 1.1 | Dissolved | Present invention |
| | NK-7 | Si | 25.0 | 50.0 | VGCF | 2.0 | 4.0 | 2.1 | Dissolved | Present invention |
| | NK-8 | Si | 25.0 | 50.0 | VGCF | 2.0 | 4.0 | 1.8 | Dissolved | Present invention |
| | NK-9 | Si | 25.0 | 50.0 | VGCF | 2.0 | 4.0 | 1.8 | Dissolved | Present invention |
| | NKc21 | Si | 25.0 | 50.0 | VGCF | 2.0 | 4.0 | 0.7 | Dissolved | Comparative Example |
| | NKc22 | Si | 25.0 | 50.0 | VGCF | 2.0 | 4.0 | 1.7 | Dissolved | Comparative Example |
| | NKc23 | Si | 25.0 | 50.0 | VGCF | 2.0 | 4.0 | 3.6 | Dissolved | Comparative Example |
| | Nkc24 | Si | 25.0 | 50.0 | VGCF | 2.0 | 4.0 | 2.0 | Dissolved | Comparative Example |
| | NKc25 | Si | 25.0 | 50.0 | VGCF | 2.0 | 4.0 | 1.4 | Dissolved | Comparative Example |

Abbreviations in Table

LPS: LPS synthesized in Synthesis Example A
NMC: $LiNi_{1/3}Co_{1/3}Mn_{1/3}O_2$
Si: Silicon
AB: Acetylene black
VGCF: Carbon nanotube <Production of Solid Electrolyte Sheet for all-Solid State Secondary Battery>

Each of the inorganic solid electrolyte-containing compositions shown in the column of "Solid electrolyte composition No." of Table 3 obtained as described above was applied onto an aluminum foil having a thickness of 20 m using a baker type applicator (product name: SA-201, manufactured by Tester Sangyo Co., Ltd.) and heated at 80° C. for 2 hours to dry (to remove the dispersion medium) the inorganic solid electrolyte-containing composition. Then, using a heat press machine, the inorganic solid electrolyte-containing composition dried at a temperature of 120° C. and a pressure of 40 MPa for 10 seconds was heated and pressurized to produce each of solid electrolyte sheets 101 to 109 and c11 to c15 for an all-solid state secondary battery (in Table 3, it is denoted as "Solid electrolyte sheet"). The film thickness of the solid electrolyte layer was 40 μm.

<Production of Positive Electrode Sheet for all-Solid State Secondary Battery>

Each of the positive electrode compositions obtained as described above, which is shown in the column of "Electrode composition No." in Table 3, was applied onto an aluminum foil having a thickness of 20 m by using a baker type applicator (product name: SA-201), heating was carried out at 80° C. for 1 hour, and then heating was further carried out at 110° C. for 1 hour to dry (to remove the dispersion medium) the positive electrode composition. Then, using a heat press machine, the dried positive electrode composition was pressurized (10 MPa, 1 minute) at 25° C. to produce each of positive electrode sheets 110 to 118 for an all-solid state secondary battery, having a positive electrode active material layer having a film thickness of 70 μm (in Table 3, it is denoted as "Positive electrode sheet").

<Production of Negative Electrode Sheet for all-Solid State Secondary Battery>

Each of the negative electrode compositions obtained as described above, which is shown in the column of "Electrode composition No." in Table 3, was applied onto a copper foil having a thickness of 20 m by using a baker type applicator (product name: SA-201), heating was carried out at 80° C. for 1 hour, and then heating was further carried out at 110° C. for 1 hour to dry (to remove the dispersion medium) the negative electrode composition. Then, using a heat press machine, the dried negative electrode composition was pressurized (10 MPa, 1 minute) at 25° C. to produce each of negative electrode sheets 119 to 127 and c21 to c25 for an all-solid state secondary battery, having a negative electrode active material layer having a film thickness of 60 μm (in Table 3, it is denoted as "Negative electrode sheet").

<Evaluation 1: Dispersion stability (sedimentary property)>

Each of the prepared compositions (slurries) was put into a glass test tube having a diameter of 10 mm and a height of 4 cm up to a height of 4 cm and allowed to stand at 25° C. for 72 hours. The solid content ratio between the solid contents before and after allowing the standing was calculated the slurry within 1 cm from the slurry liquid surface. Specifically, immediately after allowing the standing, the liquid down to 1 cm below the slurry liquid surface was taken out and dried by heating in an aluminum cup at 120° C. for 2 hours. Then, the mass of the solid content in the cup was measured to determine the solid content before and after allowing standing. The solid content obtained in this manner was used to determine the solid content ratio [WA/WB] of the solid content WA after allowing standing to the solid content WB before allowing standing.

The ease of sedimentation (sedimentary property) of the inorganic solid electrolyte was evaluated as the dispersion stability of the solid electrolyte composition by determining where the above solid content ratio is included in any of the following evaluation standards. In this test, it is indicated that the closer the solid content ratio is to 1, the better the dispersion stability is, and the evaluation standard "D" or higher is the pass level. The results are shown in Table 3.

—Evaluation Standards—

A: 0.9≤solid content ratio≤1.0

B: 0.7≤solid content ratio<0.9

C: 0.5≤solid content ratio<0.7

D: 0.3≤solid content ratio<0.5

E: 0.1≤solid content ratio<0.3

F: solid content ratio<0.1

<Evaluation 2: Adhesiveness>

A test piece having a length of 20 mm and a width of 20 mm was cut out from each of the prepared sheets (the sheet for an all-solid state secondary battery, the solid electrolyte sheet for an all-solid state secondary battery, the positive electrode sheet for an all-solid state secondary battery, and the negative electrode sheet for each all-solid state secondary battery). 11 cuts were made in the test piece using a utility knife so that the cuts reached the base material (the aluminum foil or the copper foil) at 1 mm intervals parallel to one side. In addition, 11 cuts were made so that the cuts reached the base material at 1 mm intervals in the direction perpendicular to the cuts. In this manner, 100 squares were formed on the test piece.

A Cellophane tape (registered trade name) having a length of 15 mm and a width of 18 mm was attached to the surface of the solid electrolyte layer or the electrode active material layer to cover all of the 100 squares. The surface of the Cellophane tape (registered trade name) was rubbed with an eraser and pressed against the solid electrolyte layer or the electrode active material layer to adhere thereto. Two minutes after the Cellophane tape (registered trade name) was attached, the end of the Cellophane tape (registered trade name) was held and pulled upward vertically with respect to the sheet, to be peeled off. After peeling off the Cellophane tape (registered trade name), the surface of the solid electrolyte layer or the electrode active material layer was visually observed to count squares in which defects (chipping, breakage, cracking, peeling, and the like) are not present at all, and furthermore, regarding the electrode sheet, squares in which the peeling from the collector (the base material) does not occur at all, which were denoted as X and Y, respectively. The adhesiveness of the solid particles and furthermore, the adhesiveness of the electrode active material layer to the collector were evaluated by determining where the number X of squares in which defects are not present or the number Y of squares in which the peeling does not occur is included in any of the following evaluation standards.

In this test, it is indicated that the larger the number of squares X counted or the number of squares Y counted, the more excellent the adhesiveness of the solid particles and furthermore, the adhesiveness of the collector. In a case where the evaluation standard is "D" or higher, which shall be the pass level of the present invention, the adhesion of the solid particles is firm, and furthermore, the adhesion between the base material (the collector) and the constitutional layer (the active material layer or the solid electrolyte layer) is also firm in the electrode sheet, and thus the occurrence of defects in the constitutional layer and furthermore, the occurrence of the peeling from the base material can be suppressed even in a case where the manufacture is carried out by the roll-to-roll method. The results are shown in Table 3.

—Evaluation Standards for Solid Electrolyte Layer—

A: X≥90

B: 90>X≥80

C: 80>X≥70

D: 70>X≥60

E: 60>X≥50

F: 50>X

—Evaluation Standards for Electrode Active Material Layer—

A: Y≥80 and X≥90

B: 80>Y≥70 and 90>X≥80

C: 70>Y≥60

D: 60>Y≥50

E: 50>Y≥40

F: 40>Y

TABLE 3

| Sheet No. | Solid electrolyte composition No. | Polymer binder No. | Electrode composition No. | Polymer binder No. | Dispersion stability | Adhesiveness | Note 1 | Note 2 |
|---|---|---|---|---|---|---|---|---|
| 101 | K-1 | S-1 | — | — | A | B | Solid | Present invention |
| 102 | K-2 | S-2 | — | — | B | C | electrolyte | Present invention |
| 103 | K-3 | S-3 | — | — | A | B | sheet | Present invention |
| 104 | K-4 | S-4 | — | — | A | C | | Present invention |
| 105 | K-5 | S-5 | — | — | A | C | | Present invention |
| 106 | K-6 | S-6 | — | — | A | B | | Present invention |
| 107 | K-7 | S-7 | — | — | D | D | | Present invention |
| 108 | K-8 | S-8 | — | — | A | C | | Present invention |
| 109 | K-9 | S-9 | — | — | A | C | | Present invention |
| 110 | — | — | PK-1 | S-1 | A | A | Positive | Present invention |
| 111 | — | — | PK-2 | S-2 | B | B | electrode | Present invention |
| 112 | — | — | PK-3 | S-3 | A | A | sheet | Present invention |
| 113 | — | — | PK-4 | S-4 | A | B | | Present invention |
| 114 | — | — | PK-5 | S-5 | A | B | | Present invention |
| 115 | — | — | PK-6 | S-6 | A | A | | Present invention |
| 116 | — | — | PK-7 | S-7 | C | C | | Present invention |
| 117 | — | — | PK-8 | S-8 | A | B | | Present invention |
| 118 | — | — | PK-9 | S-9 | A | B | | Present invention |
| 119 | — | — | NK-1 | S-1 | A | A | Negative | Present invention |
| 120 | — | — | NK-2 | S-2 | B | B | electrode | Present invention |
| 121 | — | — | NK-3 | S-3 | A | A | sheet | Present invention |
| 122 | — | — | NK-4 | S-4 | A | B | | Present invention |
| 123 | — | — | NK-5 | S-5 | A | B | | Present invention |
| 124 | — | — | NK-6 | S-6 | A | A | | Present invention |
| 125 | — | — | NK-7 | S-7 | C | C | | Present invention |
| 126 | — | — | NK-8 | S-8 | A | B | | Present invention |
| 127 | — | — | NK-9 | S-9 | A | B | | Present invention |

TABLE 3-continued

| Sheet No. | Solid electrolyte composition No. | Polymer binder No. | Electrode composition No. | Polymer binder No. | Dispersion stability | Adhesiveness | Note 1 | Note 2 |
|---|---|---|---|---|---|---|---|---|
| c11 | Kc11 | T-1 | — | — | E | E | Solid electrolyte sheet | Comparative Example |
| c12 | Kc12 | T-2 | — | — | F | F | | Comparative Example |
| c13 | Kc13 | T-3 | — | — | E | E | | Comparative Example |
| c14 | Kc14 | T-4 | — | — | E | E | | Comparative Example |
| c15 | Kc15 | T-5 | — | — | E | E | | Comparative Example |
| c21 | — | — | NKc21 | T-1 | E | E | Negative electrode sheet | Comparative Example |
| c22 | — | — | NKc22 | T-2 | F | F | | Comparative Example |
| c23 | — | — | NKc23 | T-3 | E | E | | Comparative Example |
| c24 | — | — | NKc24 | T-4 | E | E | | Comparative Example |
| c25 | — | — | NKc25 | T-5 | E | E | | Comparative Example |

<Manufacturing of all-Solid State Secondary Battery>

First, a positive electrode sheet for an all-solid state secondary battery, including a solid electrolyte layer, and a negative electrode sheet for an all-solid state secondary battery, including a solid electrolyte layer, which would be used for manufacturing an all-solid state secondary battery, were prepared.

—Production of Positive Electrode Sheet for all-Solid State Secondary Battery, which has Solid Electrolyte Layer—

The solid electrolyte sheet shown in the column of "Solid electrolyte layer (sheet No.)" of Table 4, prepared as described above, was overlaid on the positive electrode active material layer of each of the positive electrode sheets for an all-solid state secondary battery shown in the column of "Electrode active material layer (sheet No.)" of Table 4 so that the solid electrolyte layer came into contact with the positive electrode active material layer, transferred (laminated) by being pressurized at 50 MPa and 25° C. using a press machine, and then pressurized at 600 MPa and at 25° C., whereby each of positive electrode sheets 110 to 118 for an all-solid state secondary battery, including an solid electrolyte layer having a thickness of 25 μm (thickness of positive electrode active material layer: 50 μm), was produced.

—Production of Negative Electrode Sheet for all-Solid State Secondary Battery, which has Solid Electrolyte Layer—

Next, the solid electrolyte sheet shown in the column of "Solid electrolyte layer (sheet No.)" of Table 4, prepared as described above, was overlaid on the negative electrode active material layer of each of the negative electrode sheets for an all-solid state secondary battery shown in the column of "Electrode active material layer (sheet No.)" of Table 4 so that the solid electrolyte layer came into contact with the negative electrode active material layer, transferred (laminated) by being pressurized at 50 MPa and 25° C. using a press machine, and then pressurized at 600 MPa and at 25° C., whereby each of negative electrode sheets 119 to 127 and c21 to c25 for an all-solid state secondary battery, including a solid electrolyte layer having a thickness of 25 μm (thickness of negative electrode active material layer: 40 μm), was produced.

An all-solid state secondary battery No. 101 having a layer configuration illustrated in FIG. 1 was manufactured as follows.

The positive electrode sheet No. 110 for an all-solid state secondary battery (the aluminum foil of the solid electrolyte-containing sheet had been peeled off), which included the solid electrolyte layer obtained above, was cut out into a disk shape having a diameter of 14.5 mm and placed, as illustrated in FIG. 2, in a stainless 2032-type coin case 11 into which a spacer and a washer (not illustrated in FIG. 2) had been incorporated. Next, a lithium foil cut out in a disk shape having a diameter of 15 mm was overlaid on the solid electrolyte layer. After further overlaying a stainless steel foil thereon, the 2032-type coin case 11 was crimped to manufacture an all-solid state secondary battery 13 (No. 101), illustrated in FIG. 2.

The all-solid state secondary battery manufactured in this manner has a layer configuration illustrated in FIG. 1 (however, the lithium foil corresponds to a negative electrode active material layer 2 and a negative electrode collector 1).

Each of all-solid state secondary batteries Nos. 102 to 109 was manufactured in the same manner as in the manufacturing of the all-solid state secondary battery No. 101, except that in the manufacturing of the all-solid state secondary battery No. 101, a positive electrode sheet for an all-solid state secondary battery, which has a solid electrolyte layer and is indicated by No. shown in the column of "Electrode active material layer (sheet No.)" of Table 4 was used instead of the positive electrode No. 110 for a secondary battery, which has a solid electrolyte layer.

An all-solid state secondary battery No. 110 having a layer configuration illustrated in FIG. 1 was manufactured as follows.

The negative electrode sheet No. 119 for an all-solid state secondary battery (the aluminum foil of the solid electrolyte-containing sheet had been peeled off), which included the solid electrolyte obtained above, was cut out into a disk shape having a diameter of 14.5 mm and placed, as illustrated in FIG. 2, in a stainless 2032-type coin case 11 into which a spacer and a washer (not illustrated in FIG. 2) had been incorporated. Next, a positive electrode sheet (a positive electrode active material layer) punched out from the positive electrode sheet for an all-solid state secondary battery produced below into a disk shape having a diameter of 14.0 mm was overlaid on the solid electrolyte layer. A stainless steel foil (a positive electrode collector) was further layered thereon to form a laminate 12 for an all-solid state secondary battery (a laminate consisting of stainless steel foil—aluminum foil—positive electrode active material layer—solid electrolyte layer—negative electrode active material layer—copper foil). Then, the 2032-type coin case 11 was crimped to manufacture an all-solid state secondary battery No. 110 illustrated in FIG. 2.

A positive electrode sheet for an all-solid state secondary battery to be used in the manufacturing of the all-solid state secondary battery No. 110 was prepared as follows.

—Preparation of Positive Electrode Composition—

180 beads of zirconia beads having a diameter of 5 mm were put into a 45 mL container made of zirconia (manufactured by FRITSCH), 2.7 g of the LPS synthesized in the above Synthesis Example A, and 0.3 g of KYNAR FLEX 2500-20 (product name, PVdF-HFP: polyvinylidene fluoride—hexafluoropropylene copolymer, manufactured by Arkema S.A.) in terms of a solid content mass and 22 g of butyl butyrate were put into the above container. The container was set in a planetary ball mill P-7 (product name, manufactured by FRITSCH), and stirring was carried out for 60 minutes at 25° C. and a rotation speed of 300 rpm. Then, 7.0 g of $LiNi_{1/3}Co_{1/3}Mn_{1/3}O_2$(NMC) was put into the container as the positive electrode active material, and similarly, the container was set in a planetary ball mill P-7, mixing was continued at 25° C. and a rotation speed of 100 rpm for 5 minutes to prepare a positive electrode composition.

—Production of Positive Electrode Sheet for all-Solid State Secondary Battery—

The positive electrode composition obtained as described above was applied onto an aluminum foil (a positive electrode collector) having a thickness of 20 μm with a baker type applicator (product name: SA-201, manufactured by Tester Sangyo Co., Ltd.), heating was carried out at 100° C. for 2 hours to dry (to remove the dispersion medium) the positive electrode composition. Then, using a heat press machine, the dried positive electrode composition was pressurized (10 MPa, 1 minute) at 25° C. to produce each of positive electrode sheets for an all-solid state secondary battery, having a positive electrode active material layer having a film thickness of 80 μm.

Each of all-solid state secondary batteries Nos. 111 to 118 and c101 to c105 was manufactured in the same manner as in the manufacturing of the all-solid state secondary battery No. 110, except that in the manufacturing of the all-solid state secondary battery No. 110, a negative electrode sheet for an all-solid state secondary battery, which has a solid electrolyte layer and is indicated by No. shown in the column of "Electrode active material layer (sheet No.)" of Table 4 was used instead of the negative electrode sheet No. 119 for a secondary battery, which has a solid electrolyte layer.

<Evaluation 3: Ion Conductivity Measurement>

The ion conductivity of each of the manufactured all-solid state secondary batteries was measured. Specifically, the alternating-current impedance of each of the all-solid state secondary batteries was measured in a constant-temperature tank (25° C.) using a 1255B FREQUENCY RESPONSE ANALYZER (product name, manufactured by SOLARTRON Analytical) at a voltage magnitude of 5 mV and a frequency of 1 MHz to 1 Hz. From the measurement result, the resistance of the sample for measuring ion conductivity in the layer thickness direction was determined, and the ion conductivity was determined by the calculation according to Expression (1).

$$\text{Ion conductivity } \sigma(\text{mS/cm})=1{,}000\times\text{sample layer thickness(cm)}/[\text{resistance}(\Omega)\times\text{sample area(cm}^2)] \quad \text{Expression (1):}$$

In Expression (1), the sample layer thickness is a value obtained by measuring the thickness before placing the laminate 12 in the 2032-type coin case 11 and subtracting the thickness of the collector (the total layer thickness of the solid electrolyte layer and the electrode active material layer). The sample area is the area of the disk-shaped sheet having a diameter of 14.5 mm.

It was determined where the obtained ion conductivity a was included in any of the following evaluation standards.

In this test, in a case where the evaluation standard is "D" or higher, the ion conductivity a is the pass level.

—Evaluation Standards—

A: $0.60\le\sigma$

B: $0.50\le\sigma<0.60$

C: $0.40\le\sigma<0.50$

D: $0.30\le\sigma<0.40$

E: $0.20\le\sigma<0.30$

F: $\sigma<0.20$

<Evaluation 4: Cycle Characteristics>

The discharge capacity retention rate of each of the all-solid state secondary batteries manufactured as described above was measured using a charging and discharging evaluation device TOSCAT-3000 (product name, manufactured by Toyo System Corporation).

Specifically, each of the all-solid state secondary batteries was charged in an environment of 25° C. at a current density of 0.1 mA/cm$^2$ until the battery voltage reached 3.6 V. Then, the battery was discharged at a current density of 0.1 mA/cm$^2$ until the battery voltage reached 2.5 V. One charging operation and one discharging operation were set as one cycle of charging and discharging, and 3 cycles of charging and discharging were repeated under the same conditions to carry out initialization. Then, the above charging and discharging cycle was repeated, and the discharge capacity of each of the all-solid state secondary batteries was measured at each time after the charging and discharging cycle was carried out with a charging and discharging evaluation device: TOSCAT-3000 (product name).

In a case where the discharge capacity (the initial discharge capacity) of the first charging and discharging cycle after initialization is set to 100%, the battery performance (the cycle characteristics) was evaluated by determining where the number of charging and discharging cycles in a case where the discharge capacity retention rate (the discharge capacity with respect to the initial discharge capacity) reaches 80% is included in any of the following evaluation standards. In this test, the higher the evaluation standard is, the better the battery performance (the cycle characteristics) is, and the initial battery performance can be maintained even in a case where a plurality of times of charging and discharging are repeated (even in a case of the long-term use). Regarding the cycle characteristics in this test, the evaluation standard "D" or higher is the pass level.

All of the all-solid state secondary batteries Nos. 101 to 118 exhibited initial discharge capacity values sufficient for functioning as an all-solid state secondary battery.

—Evaluation Standards—

A: 600 cycles or more

B: 450 cycles or more and less than 600 cycles

C: 300 cycles or more and less than 450 cycles

D: 150 cycles or more and less than 300 cycles

E: 80 cycles or more and less than 150 cycles

F: 40 cycles or more and less than 80 cycles

TABLE 4

| No. | Layer configuration: Electrode active material layer (sheet No.) | Layer configuration: Solid electrolyte layer (sheet No.) | Ion conductivity | Cycle characteristics | Note |
|---|---|---|---|---|---|
| 101 | 110 | 101 | A | A | Present invention |
| 102 | 111 | 102 | D | B | Present invention |
| 103 | 112 | 103 | A | A | Present invention |
| 104 | 113 | 104 | B | B | Present invention |
| 105 | 114 | 105 | B | B | Present invention |
| 106 | 115 | 106 | A | A | Present invention |
| 107 | 116 | 107 | D | D | Present invention |
| 108 | 117 | 108 | B | B | Present invention |
| 109 | 118 | 109 | B | B | Present invention |
| 110 | 119 | 101 | A | A | Present invention |
| 111 | 120 | 102 | D | B | Present invention |
| 112 | 121 | 103 | A | A | Present invention |
| 113 | 122 | 104 | B | B | Present invention |
| 114 | 123 | 105 | B | B | Present invention |
| 115 | 124 | 106 | A | A | Present invention |
| 116 | 125 | 107 | D | D | Present invention |
| 117 | 126 | 108 | B | B | Present invention |
| 118 | 127 | 109 | B | B | Present invention |
| c101 | c21 | c11 | E | E | Comparative Example |
| c102 | c22 | c12 | F | F | Comparative Example |
| c103 | c23 | c13 | E | E | Comparative Example |
| c104 | c24 | c14 | E | E | Comparative Example |
| c105 | c25 | c15 | E | E | Comparative Example |

The following findings can be seen from the results of Table 3 and Table 4.

All of the inorganic solid electrolyte-containing compositions of Comparative Examples shown in Nos. Kc11 to Kc15 and NKc21 to NKc25, which do not contain the polymer binder defined in the present invention, are inferior in dispersion stability and furthermore, the adhesiveness of the solid particles in the constitutional layer is not sufficient. The all-solid state secondary batteries of Comparative Examples Nos. c101 to c105 using these compositions are inferior in cycle characteristics and do exhibit sufficient ion conductivity.

On the other hand, the inorganic solid electrolyte-containing compositions containing the polymer binder defined in the present invention, which are shown in Nos. K-1 to K-9, PK-1 to PK-9, and NK-1 to NK-9, have at a high level both the dispersion stability and the adhesiveness of the solid particles in the constitutional layer (the adhesiveness between the solid particles and furthermore, the adhesiveness to the collector). It can be seen that by using these inorganic solid electrolyte-containing compositions in the formation of the constitutional layer of the all-solid state secondary battery, it is possible to realize high ion conductivity (low resistance) and the excellent cycle characteristics in the obtained all-solid state secondary batteries Nos. 101 to 118.

The present invention has been described together with the embodiments of the present invention. However, the inventors of the present invention do not intend to limit the present invention in any part of the details of the description unless otherwise designated, and it is conceived that the present invention should be broadly construed without departing from the spirit and scope of the invention shown in the attached "WHAT IS CLAIMED IS".

EXPLANATION OF REFERENCES

1: negative electrode collector
2: negative electrode active material layer
3: solid electrolyte layer
4: positive electrode active material layer
5: positive electrode collector
6: operation portion
10: all-solid state secondary battery
11: 2032-type coin case
12: laminate for an all-solid state secondary battery
13: coin-type all-solid state secondary battery

The invention claimed is:

1. An inorganic solid electrolyte-containing composition comprising:

an inorganic solid electrolyte having an ion conductivity of a metal belonging to Group 1 or Group 2 in the periodic table;

a polymer binder; and a dispersion medium, wherein the polymer binder contains a polymer having a constitutional component satisfying the following (A) and (B) and is dissolved in the dispersion medium, (A) a glass transition temperature ($Tg^{HP}$) in a case where the constitutional component is formed into a homopolymer is 50° C. or higher, and (B) an SP value in a case where the constitutional component is formed into a homopolymer is 20.0 $MPa^{1/2}$ or more and 25.0 $MPa^{1/2}$ or less.

2. The inorganic solid electrolyte-containing composition according to claim 1, wherein a glass transition temperature ($Tg^{B}$) of the polymer is 0 to 90° C.

3. The inorganic solid electrolyte-containing composition according to claim 1, wherein the polymer has an additional constitutional component exhibiting a glass transition temperature at which a difference (absolute value) from the glass transition temperature ($Tg^{HP}$) of the constitutional component satisfying the (A) and the (B) is 130° C. or higher.

4. The inorganic solid electrolyte-containing composition according to claim 1, wherein the constitutional component satisfying the (A) and the (B) has an aromatic ring as a partial structure.

5. The inorganic solid electrolyte-containing composition according to claim 4, wherein the aromatic ring is an aromatic hydrocarbon ring.

6. The inorganic solid electrolyte-containing composition according to claim 1, wherein the constitutional component satisfying the (A) and the (B) is represented by Formula (HC), Formula (HC)

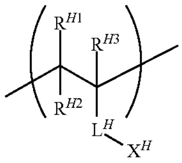

In Formula (HC), $R^{H1}$ to $R^{H3}$ represent a hydrogen atom or a substituent, $L^H$ represents a single bond or a linking group, and $X^H$ represents a monocyclic or polycyclic aromatic ring.

7. The inorganic solid electrolyte-containing composition according to claim 1, wherein the dispersion medium has an SP value of 14 to 24 $MPa^{1/2}$.

8. The inorganic solid electrolyte-containing composition according to claim 1, further comprising an active material.

9. The inorganic solid electrolyte-containing composition according to claim 1, further comprising a conductive auxiliary agent.

10. The inorganic solid electrolyte-containing composition according to claim 1, wherein the inorganic solid electrolyte is a sulfide-based inorganic solid electrolyte.

11. A sheet for an all-solid state secondary battery, comprising a layer formed of the inorganic solid electrolyte-containing composition according to claim 1.

12. An all-solid state secondary battery comprising, in the following order:

a positive electrode active material layer;

a solid electrolyte layer; and a negative electrode active material layer, wherein at least one of the positive electrode active material layer, the solid electrolyte layer, or the negative electrode active material layer is a layer formed of the inorganic solid electrolyte-containing composition according to claim 1.

13. A manufacturing method for a sheet for an all-solid state secondary battery, the manufacturing method comprising forming a film of the inorganic solid electrolyte-containing composition according to claim 1.

14. A manufacturing method for an all-solid state secondary battery, the manufacturing method comprising manufacturing an all-solid state secondary battery through the manufacturing method according to claim 13.

* * * * *